(12) United States Patent
Chamdani et al.

(10) Patent No.: US 6,311,261 B1
(45) Date of Patent: *Oct. 30, 2001

(54) APPARATUS AND METHOD FOR IMPROVING SUPERSCALAR PROCESSORS

(75) Inventors: Joseph I. Chamdani, Marietta; Cecil O. Alford, Lawrenceville, both of GA (US)

(73) Assignee: Georgia Tech Research Corporation, Atlanta, GA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/932,068

(22) Filed: Sep. 15, 1997

Related U.S. Application Data

(62) Division of application No. 08/489,509, filed on Jun. 12, 1995, now Pat. No. 6,112,019.

(51) Int. Cl.$^7$ ........................................................ G06F 9/38
(52) U.S. Cl. ........................................................ 712/23
(58) Field of Search .................................... 712/23, 216

(56) References Cited

U.S. PATENT DOCUMENTS

| | | | |
|---|---|---|---|
| 4,780,810 | * 10/1988 | Tori et al. | 364/200 |
| 5,497,499 | * 3/1996 | Garg et al. | 395/800 |
| 5,584,037 | * 12/1996 | Papworth et al. | 395/800 |
| 5,867,679 | * 2/1999 | Tnaaka et al. | 395/377 |
| 5,867,682 | * 2/1999 | Witt et al. | 395/386 |

* cited by examiner

*Primary Examiner*—David Y. Eng
(74) *Attorney, Agent, or Firm*—Thomas, Kayden, Horstemeyer & Risley LLP

(57) ABSTRACT

The invention involves new microarchitecture apparatus and methods for superscalar microprocessors that support multi-instruction issue, decoupled dataflow scheduling, out-of-order execution, register renaming, multi-level speculative execution, and precise interrupts. These are the Distributed Instruction Queue (DIQ) and the Modified Reorder Buffer (MRB). The DIQ is a new distributed instruction shelving technique that is an alternative to the reservation station (RS) technique and offers a more efficient (improved performance/cost) implementation. The Modified Reorder Buffer (MRB) is an improved reorder buffer (RB) result shelving technique eliminates the slow and expensive prioritized associative lookup, shared global buses, and dummy branch entries (to reduce entry usage). The MRB has an associateive key unit which uses a unique associative key.

14 Claims, 40 Drawing Sheets

Modified Reorder Buffer (MRB)

Register Mapping Table in IBM RS/6000 Floating-Point Unit (a) Before Issue

| tag | opcode | S1 | α(S1) | S2 | α(S2) | D | α(D) | β(D) | I² |
|---|---|---|---|---|---|---|---|---|---|
| I6 | fadd | R0 | 2 | R4 | 2 | R0 | 2 | 2 | 8 |
| I5 | fadd | R4 | 1 | R6 | 1 | R4 | 1 | 1 | 4 |
| I4 | fadd | R6 | 0 | R7 | 0 | R6 | 0 | 0 | 0 |
| I3 | fadd | R4 | 0 | R5 | 0 | R4 | 0 | 0 | 0 |
| I2 | fadd | R0 | 1 | R2 | 1 | R0 | 1 | 1 | 4 |
| I1 | fadd | R2 | 0 | R3 | 0 | R2 | 0 | 0 | 0 |
| I0 | fadd | R0 | 0 | R1 | 0 | R0 | 0 | 0 | 0 | top ... bottom (b) After Issue and Completion

| tag | opcode | S1 | α(S1) | S2 | α(S2) | D | α(D) | β(D) | I² |
|---|---|---|---|---|---|---|---|---|---|
|  |  |  | empty spaces ready for | | | | | | |
|  |  |  | subsequent instructions | | | | | | |
| I6 | fadd | R0 | 1 | R4 | 1 | R0 | 1 | 1 | 4 |
| I5 | fadd | R4 | 0 | R6 | 0 | R4 | 0 | 0 | 0 |
| I2 | fadd | R0 | 0 | R2 | 0 | R0 | 0 | 0 | 0 | top ... bottom

8-Entry Dispatch Stack

Fig. 4

Note: S1/S2 = first/second source register identifier,     D = destination register identifier,
α(X) = # of times register X is designated as a destination register in preceding inst (below it),
β(X) = # of times register X is designated as a source register in preceding instruction (below it),
I² = issue index = α(S1) + α(S2) + α(D) + β(D).

| cycle → | 1 | 2 | 3 | 4 | 5 | 6 | 7 | 8 | 9 | 10 | 11 | 12 | 13 | 14 | 15 | 11 | 12 | 13 | 14 | 15 |
|---|---|---|---|---|---|---|---|---|---|---|---|---|---|---|---|---|---|---|---|---|
| allocate → | I0 | I1 | I2 | I3 | I4 | I5 | I6 | | | | | | | | | | | | | |
| issue → | | I0 | I1 | I3 | I4 | | | | | I2 | | I5 | I6 | | | | | | | |
| writeback → | | | | | | | | I0 | I1 | I3 | I4 | | | | | | I2 | | I5 | I6 |
| retire → | | | | | | | | | I0 | I1 | I3 | I4 | | | | | | I2 | I5 | I6 |

(a) Instruction Timing    Note: "float add" takes 6 cycles to complete after issued.

| Entry Number | PC | Opcode | Source Operand 1 ready | tag | content | Source Operand 2 ready | tag | content | Destination tag | content | Executed | Exceptions | |
|---|---|---|---|---|---|---|---|---|---|---|---|---|---|
| tail → 7 | | | | | | | | | | | | | |
| 6 | I6 | fadd | 0 | 0.2 | - | 0 | 4.2 | - | 0.3 | - | 0 | - | ← alloc |
| 5 | I5 | fadd | 0 | 4.1 | - | 0 | 6.1 | - | 4.2 | - | 0 | - | ← not rdy |
| 4 | I4 | fadd | 1 | - | $R6^0$ | 1 | - | $R7^0$ | 6.1 | - | 0 | - | ← 4th issue |
| 3 | I3 | fadd | 1 | - | $R4^0$ | 1 | - | $R5^0$ | 4.1 | - | 0 | - | ← 3rd issue |
| 2 | I2 | fadd | 0 | 0.1 | - | 0 | 2.1 | - | 0.2 | - | 0 | - | ← not rdy |
| 1 | I1 | fadd | 1 | - | $R2^0$ | 1 | - | $R3^0$ | 2.1 | - | 0 | - | ← 2nd issue |
| head → 0 | I0 | fadd | 1 | - | $R0^0$ | 1 | - | $R1^0$ | 0.1 | - | 0 | - | ← 1st issue |

(b) RUU Snapshot at Cycle 7    Note: $Ri^k$ means the $k^{th}$ instance of register Ri (register renaming)

| Entry Number | PC | Opcode | Source Operand 1 ready | tag | content | Source Operand 2 ready | tag | content | Destination tag | content | Executed | Exceptions | |
|---|---|---|---|---|---|---|---|---|---|---|---|---|---|
| tail → 7 | | | | | | | | | | | | | |
| 6 | I6 | fadd | 0 | 0.2 | - | 0 | 4.2 | - | 0.3 | - | 0 | - | ← not rdy |
| 5 | I5 | fadd | 0 | 4.1 | - | 0 | 6.1 | - | 4.2 | - | 0 | - | ← not rdy |
| 4 | I4 | fadd | 1 | - | $R6^0$ | 1 | - | $R7^0$ | 6.1 | - | 0 | - | ← in exec |
| 3 | I3 | fadd | 1 | - | $R4^0$ | 1 | - | $R5^0$ | 4.1 | - | 0 | - | ← in exec |
| 2 | I2 | fadd | 1 | 0.1 | $R0^1$ | 1 | 2.1 | $R2^1$ | 0.2 | - | 0 | - | ← ready |
| 1 | I1 | fadd | 1 | - | $R2^0$ | 1 | - | $R3^0$ | 2.1 | $R2^1$ | 1 | none | ← wrtback |
| head → 0 | I0 | fadd | 1 | - | $R0^0$ | 1 | - | $R1^0$ | 0.1 | $R0^1$ | 1 | none | ← retire |

(c) RUU Snapshot at Cycle 9
Register Update Unit

*Fig. 5*

Metaflow Architecture

(a) Instruction Timing

| cycle → | 1 | 2 | 3 | 4 | 5 | 6 | 7 | 8 | 9 | 10 | 11 |
|---|---|---|---|---|---|---|---|---|---|---|---|
| allocate → | I0,I1,I2,I3 | I4,I5,I6 | | | | | | | | | |
| issue → | | I0,I1 | I3,I4 | | | I2 | I5 | | | | |
| writeback → | | | | | I0,I1 | I3,I4 | I5 | | I2 | | I6 |
| retire → | | | | | | I0,I1 | I3,I4 | | | I5 | I2 I3 |

Note: Assume there are 4 allocate ports, 4 retire ports,
2 floating-point add FUs (class num 2) with 3-cycle latency.

(b) DRIS Snapshot at Cycle 2

| Index | Source Operand 1 | | | Source Operand 2 | | | Destination | | | Disp. | FU class | Exec. | Opcode | PC | |
|---|---|---|---|---|---|---|---|---|---|---|---|---|---|---|---|
| | Locked | R num | ID | Locked | R num | ID | latest | R num | content | | | | | | |
| 7 | | | | | | | | | | | | | | | |
| 6 | 1 | 0 | 0.2 | 1 | 4 | 0.5 | 1 | 0 | — | 0 | 2 | 0 | fadd | I6 | ← alloc |
| 5 | 1 | 4 | 0.3 | 1 | 6 | 0.4 | 1 | 4 | — | 0 | 2 | 0 | fadd | I5 | ← alloc |
| 4 | 0 | 6 | — | 0 | 7 | — | 1 | 6 | — | 0 | 2 | 0 | fadd | I4 | ← alloc |
| 3 | 1 | 4 | — | 0 | 5 | — | 0 | 4 | — | 0 | 2 | 0 | fadd | I3 | ← ready |
| 2 | 1 | 0 | 0.0 | 1 | 2 | 0.1 | 1 | 2 | — | 0 | 2 | 0 | fadd | I2 | ← not rdy |
| 1 | 0 | 2 | — | 0 | 3 | — | 0 | 0 | — | 1 | 2 | 0 | fadd | I1 | ← 1st iss |
| 0 | 0 | 0 | — | 0 | 1 | — | 0 | 0 | — | 1 | 2 | 0 | fadd | I0 | ← 1st iss |

Note: Ri^k means the k^th instance of register Ri (register renaming)

(c) DRIS Snapshot at Cycle 6

| Index | Source Operand 1 | | | Source Operand 2 | | | Destination | | | Disp. | FU class | Exec. | Opcode | PC | |
|---|---|---|---|---|---|---|---|---|---|---|---|---|---|---|---|
| | Locked | R num | ID | Locked | R num | ID | latest | R num | content | | | | | | |
| 7 | | | | | | | | | | | | | | | |
| 6 | 1 | 0 | 0.2 | 1 | 4 | 0.5 | 1 | 0 | — | 0 | 2 | 0 | fadd | I6 | ← not rdy |
| 5 | 0 | 4 | 0.3 | 0 | 6 | 0.4 | 1 | 4 | — | 0 | 2 | 0 | fadd | I5 | ← ready |
| 4 | 0 | 6 | — | 0 | 7 | — | 0 | 6 | R6¹ | 1 | 2 | 1 | fadd | I4 | ← wrtbk |
| 3 | 0 | 4 | — | 0 | 5 | — | 0 | 4 | R4¹ | 1 | 2 | 1 | fadd | I3 | ← wrtbk |
| 2 | 0 | 0 | 0.0 | 0 | 2 | 0.1 | 1 | 0 | — | 1 | 2 | 0 | fadd | I2 | ← issue |
| 1 | 0 | 2 | — | 0 | 3 | — | 1 | 2 | R2¹ | 1 | 2 | 1 | fadd | I1 | ← retire |
| 0 | 0 | 0 | — | 0 | 1 | — | 0 | 0 | R0¹ | 1 | 2 | 1 | fadd | I0 | ← retire |

DRIS (Deferred-scheduling, Register-Renaming Instruction Shelf)

Fig. 7

IBM RS/6000 Architecture

Fig. 11   Lightning SPARC Architecture

DEC Alpha 21064 Architecture

Intel Pentium Architecture

A Superscaler Processor w/ Reorder Buffer and Reservation Stations

Fig. 19  Reorder Buffer (RB) Implemented with True FIFO Array

Result-Forwarding Hazard

Fig. 21  Modified Reorder Buffer (MRB)

MRB Circuit Implementation

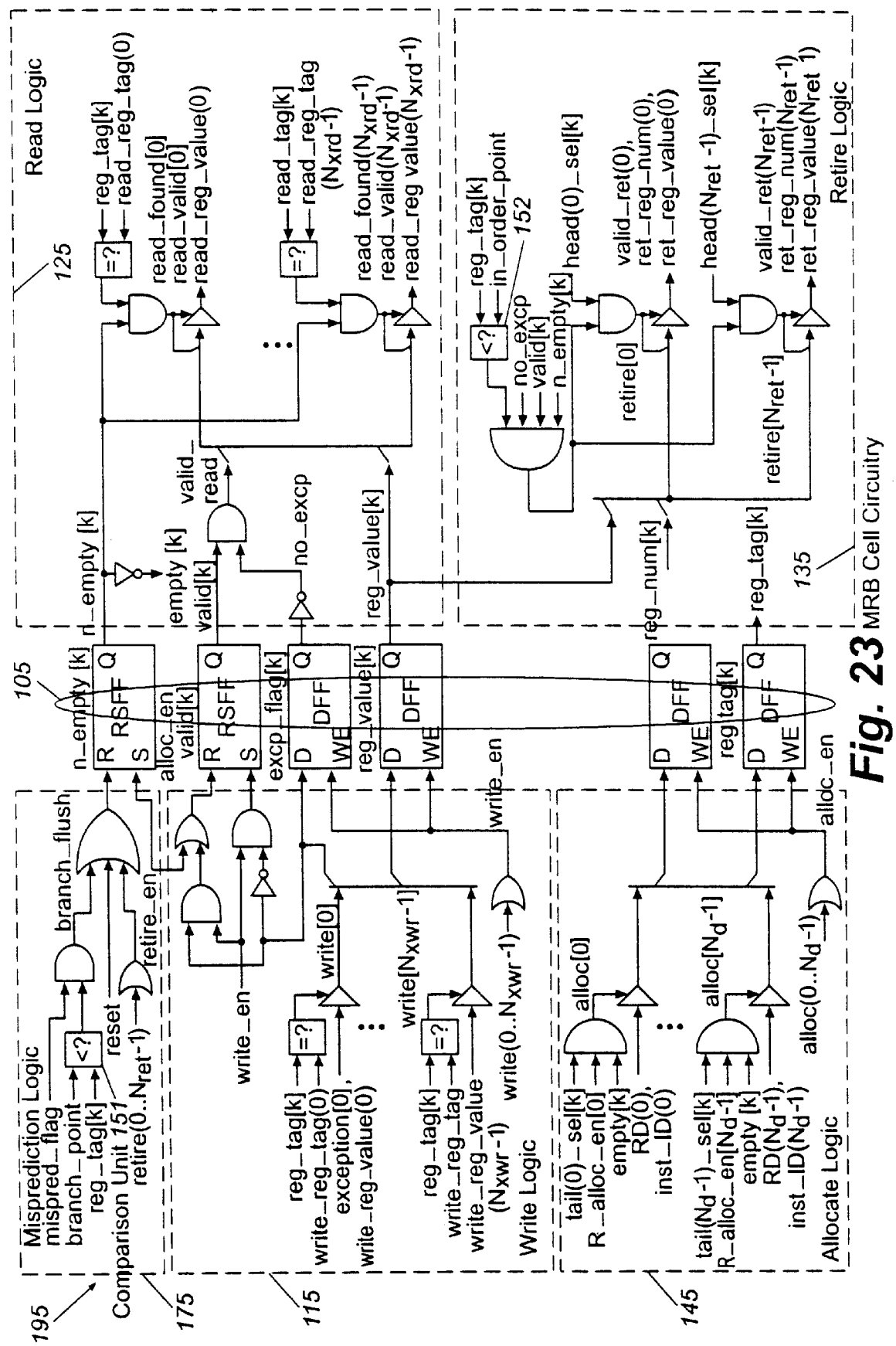
Fig. 23 MRB Cell Circuitry

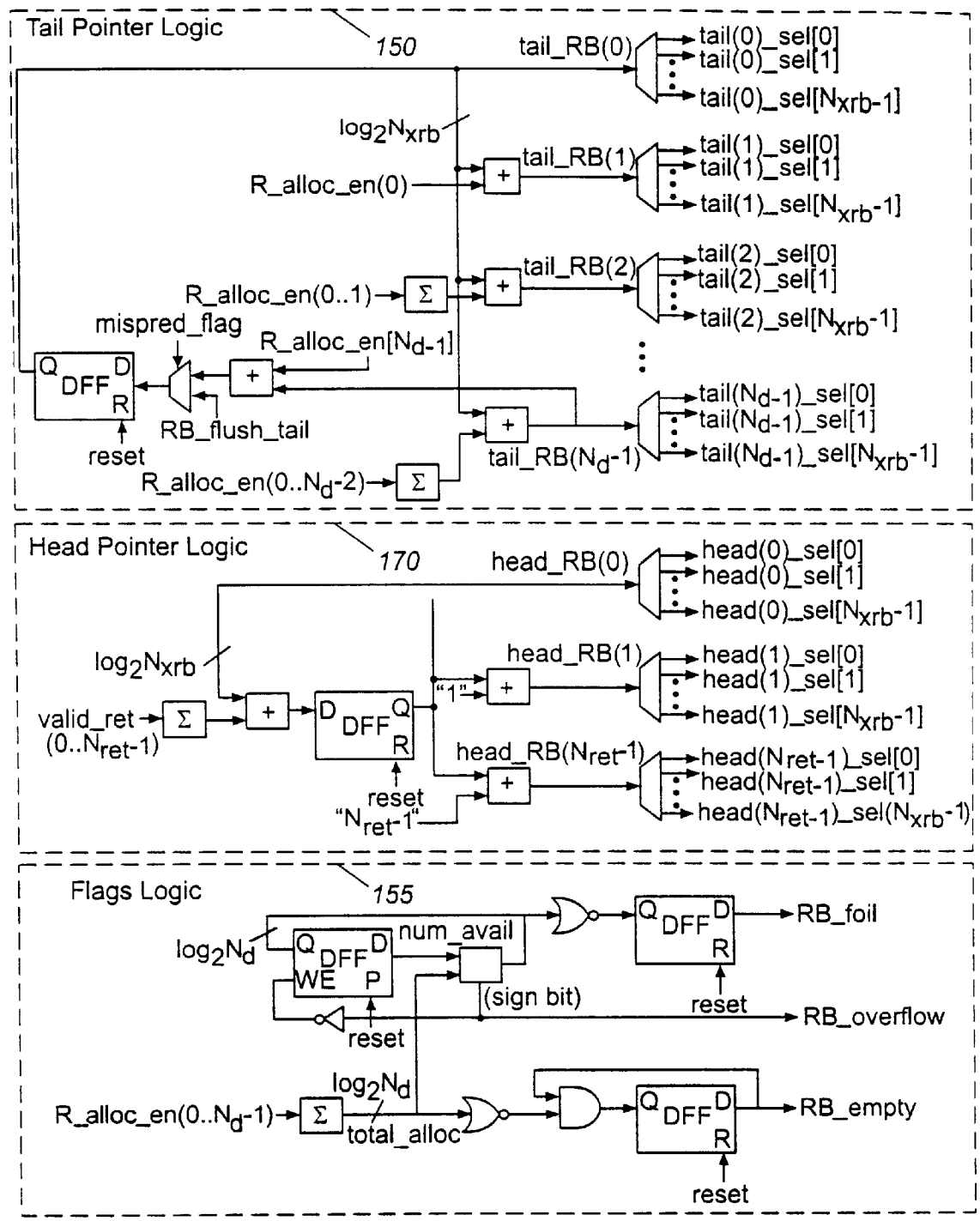

Note: $i \in [0, N_d-1]$, $j \in [0, N_{ret}-1]$, $k \in [0, N_{xrb}-1]$ tail(i)_sel[k]= 1 means that the dest reg num and tag from dispatch bus i is routed /allocated to MRB_Cell[k]

R_alloc_en[i]=1 means that there is an allocation to "R" MRB from inst dispatch bus i head(j)_sel[k]=1 means that MRB_Cell(k) is currently in the $j^{th}$ retire port valid_ret[j] = means that the $j^{th}$ retire port contains an MRB entry that is ready to retire Support Logic for the MRB

Fig. 24

RBFAQ Circuit Implementation

Support Logic for the RBFAQ

Fig. 27 In-order Issue Distributed Instruction Queue (DIQ)

In-Order Issue DIQ Circuit Implementation

Fig. 30 Out-of-Order Issue DIQ

Fig. 31 A Superscalar Processor w/ MRB and DIQ

*Fig. 33* Floating-Point Arithmetic Logic Unit (FALU)

Flowchart of Operations in Fetch and Decode Stages

Flowchart of Operations in Issue/Execute, Writeback, and Retire Stages

Fig. 37 Register Tag Unit (RTU)

RTRB ENTRY n_empty = set when entry is allocated, reset when entry is retired
last = set when entry is allocated, reset when there is a new assignment to register reg_num
reg_num = register number, corresponds to register file address/location
reg_tag = register tag, inst_ID of the producer instrucion

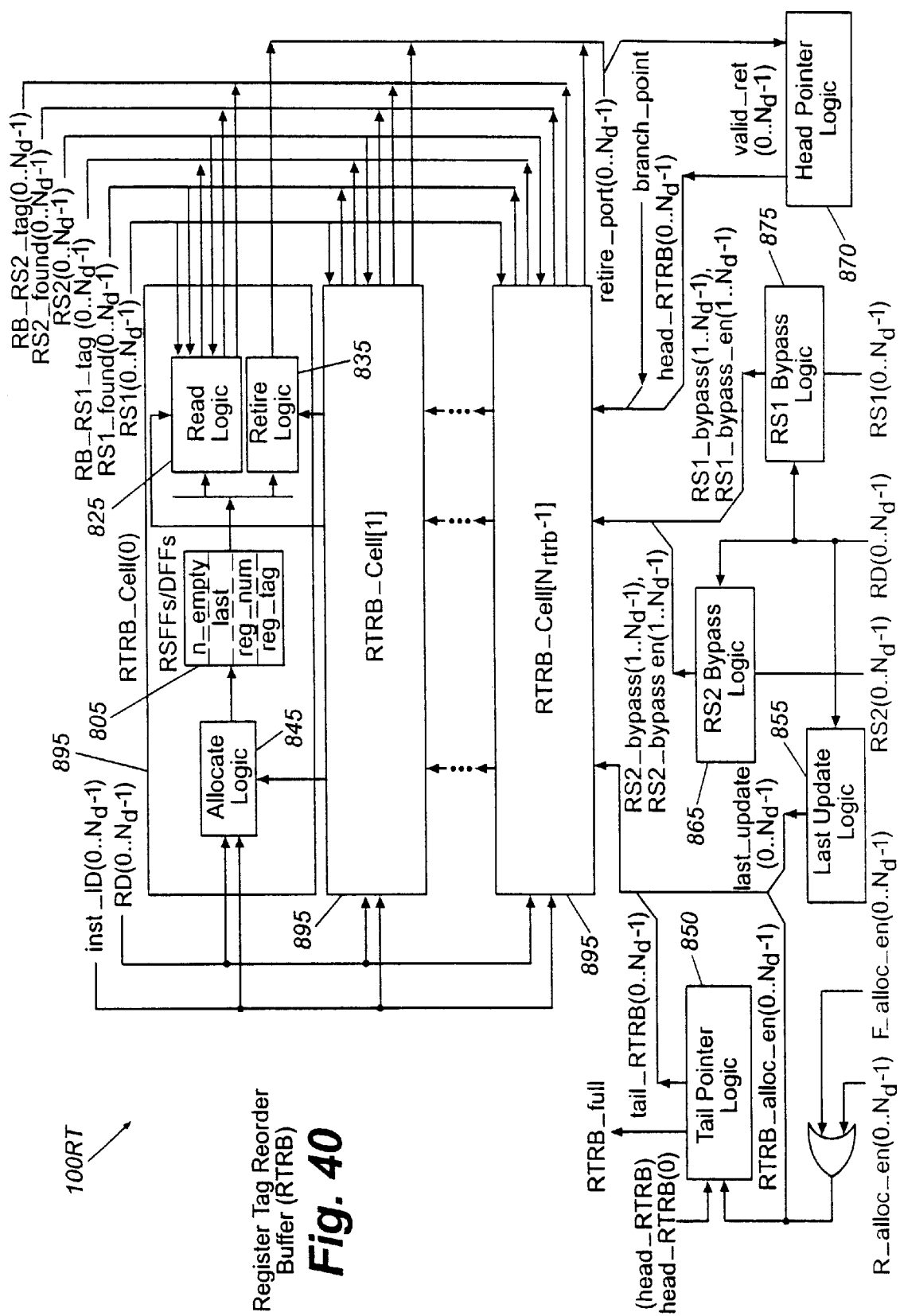

APPARATUS AND METHOD FOR IMPROVING SUPERSCALAR PROCESSORS

This application is a divisional application of and claims priority to copending U.S. patent application assigned Ser. No. 08/489,509 and filed on Jun. 12, 1995 now U.S. Pat. No. 6,112,019, issued Aug. 29, 2000.

BACKGROUND OF THE INVENTION
1. Field of the Invention

This invention relates generally to an apparatus and a method for improving processor microarchitecture in superscalar microprocessors. In particular, the invention relates to an apparatus and a method for a modified reorder buffer and a distributed instruction queue that increases the efficiency by reducing the hardware complexity, execution time, and the number of global wires in superscalar microprocessors that support multi-instruction issue, decoupled dataflow scheduling, out-of-order execution, register renaming, multi-level speculative execution, load bypassing, and precise interrupts.

2. Background of the Related Art

The main driving force in the research and development of microprocessor architectures is improving performance/unit cost. The true measure of performance is the time (seconds) required to execute a program. The execution time of a program is basically determined by three factors (see Patterson and Hennessey, *Computer Architecture: A Quantitative Approach*, Morgan Kaufmann Publishers, 1990); the number of instructions executed in the program (dynamic Inst_Count), the average number of clock cycles per instruction (CPI), and the processing cycle time (Clock_Period), or $$T_{program} = \text{Inst\_Count} \times \text{CPI} \times \text{Clock\_Period}. \quad (1)$$

To improve performance (reduce execution time), it is necessary to reduce one or more factors. The obvious one to reduce is Clock_Period, by means of semiconductor/VLSI technology improvements such as device scaling, faster circuit structures, better routing techniques, etc. A second approach to performance improvement is architecture design. CISC and VLIW architectures take the approach of reducing Inst_Count. RISC and superscalar architectures attempt to reduce the CPI. Superpipelined architectures increase the degree of pipelining to reduce the Clock_Period.

The true measure of cost is dollars/unit to implement and manufacture a microprocessor design in silicon. This hardware cost is driven by many factors such as die size, die yield, wafer cost, die testing cost, packaging cost, etc. The architectural choices made in a microprocessor design affect all these factors.

It is desirable to focus on finding microarchitecture techniques/alternatives to improve the design of superscalar microprocessors. The term microprocessor refers to a processor or CPU that is implemented in one or a small number of semiconductor chips. The term superscalar refers to a microprocessor implementation that increases performance by concurrent execution of scalar instructions, the type of instructions typically found in general-purpose microprocessors. It should be understood that hereinafter, the term "processor" also means "microprocessor".

A superscalar architecture can be generalized as a processor architecture that fetches and decodes multiple scalar instructions from a sequential, single-flow instruction stream, and executes them concurrently on different functional units. In general, there are seven basic processing steps in superscalar architectures; fetch, decode, dispatch, issue, execute, writeback, and retire. FIG. 1 illustrates these basic steps.

First, multiple scalar instructions are fetched simultaneously from an instruction cache/memory or other storage unit. Current state-of-the-art superscalar microprocessors fetch two or four instructions simultaneously. Valid fetched instructions (the ones that are not after a branch-taken instruction) are decoded concurrently, and dispatched into a central instruction window (FIG. 1a) or distributed instruction queues or windows (FIG. 1b). Shelving of these instructions is necessary because some instructions cannot execute immediately, and must wait until their data dependencies and/or resource conflicts are resolved. After an instruction is ready it is issued to the appropriate functional unit. Multiple ready instructions are issued simultaneously, achieving parallel execution within the processor. Execution results are written back to a result buffer first. Because instructions can complete out-of-order and speculatively, results must be retired to register file(s) in the original, sequential program order. An instruction and its result can retire safely if it completes without an exception and there are no exceptions or unresolved conditional branches in the preceding instructions. Memory stores wait at a store buffer until they can commit safely.

The parallel executions in superscalar processors demand high memory bandwidth for instructions and data. Efficient instruction bandwidth can be achieved by aligning and merging the decode group. Branching causes wasted decoder slots on the left side (due to unaligned branch target addresses) and on the right side (due to a branch-taken instruction that is not at the end slot). Aligning shifts branch target instructions to the left most slot to utilize all decoder slots. Merging fills the slots to the right of a branch-taken instruction with the branch target instructions, combining different instruction runs into one dynamic instruction stream. Efficient data bandwidth can be achieved by load bypassing and load forwarding (M. Johnson, *Superscalar Microprocessor Design*, Prentice-Hall, 1991), a relaxed or weak-memory ordering model. Relaxed ordering allows an out-of-order sequence of reads and writes, to optimize the use of the data bus. Stores to memory cannot commit until they are safe (retire step). Forcing loads and stores to commence in order will delay the loads significantly and stall other instructions that wait on the load data. Load bypassing allows a load to bypass stores in front of it (out-of-order execution), provided there is no read-after-write hazard. Load forwarding allows a load to be satisfied directly from the store buffer when there is a read-after-write dependency. Executing loads early is safe because load data is not written directly to the register file.

Classic superscalar architectures accomplish fine-grain parallel processing at the instruction level, which is limited to a single flow of control. They cannot execute independent regions of code concurrently (multiple flows of control). An instruction stream external to superscalar processors appears the same as in CISC or RISC uniprocessors; a sequential, single-flow instruction stream. It is internally that instructions are distributed to multiple processing units. There are complexities and limitations involved in parallelizing a sequential, single-flow instruction stream. The following six superscalar features—multi-instruction issue, decoupled dataflow scheduling, out-of-order execution, register renaming, speculative execution, and precise interrupts—are key in achieving this goal. They help improve performance and ensure correctness in superscalar processors.

Multi-instruction issue is made possible by widening a conventional, serial processing pipeline in the "horizontal" direction to have multiple pipeline streams. In this manner multiple instructions can be issued simultaneously per clock cycle. Thus, superscalar microprocessors must have multiple execution/functional units with independent pipeline streams. Also, to be able to sustain multi-instruction issue at every cycle, superscalar microprocessors fetch and decode multiple instructions at a time.

Decoupled dataflow scheduling is supported by buffering all decoded instructions into an instruction window(s), before they are scheduled for execution. The instruction window(s) essentially "decouples" the decode and execute stage. There are two primary objectives. The first is to maintain the flow of instruction fetching and decoding by not forcing a schedule of the decoded instructions right away. This reduces unnecessary stalls. Instructions are allowed to take time to resolve data dependencies and/or resource conflicts. The second is to improve the look-ahead capability of the processor. With the instruction window, a processor is now able to look ahead beyond the stalled instructions to discover others that are ready to execute. The issue logic includes a dependency check to allow an instruction to "fire" or execute as soon as its operands are available and its resource conflicts are resolved. Unlike sequential Von Neumann machines, the control hardware does not have to sequence each instruction and decide explicitly when it can execute. This is the essence of dataflow scheduling.

Out-of-order execution helps reduce instruction stalls due to data dependencies, bypassing the stalled or incomplete instructions. There are three types of out-of-order execution, categorized by their aggressiveness: (a) in-order issue with out-of-order completion, (b) partial out-of-order issue with out-of-order completion, and (c) full out-of-order issue with out-of-order completion. The first type always issues instructions sequentially, in the original program order, but they can complete out-of-order due to different latencies or stages in some functional units' pipelines. The second type restricts instruction issue to be in order only within a functional unit, but can be out of order amongst multiple functional units. The third type allows full out-of-order issue within a functional unit as well as amongst multiple functional units.

Register renaming is necessary to eliminate the side effects of out-of-order execution, i.e., artificial dependencies on registers—those dependencies other than true date dependency (read-after-write hazard). There are two types of artificial dependencies, anti dependency (write-after-read hazard) and output dependency (write-after-write hazard) (M. Johnson, *Superscalar Microprocessor Design*, Prentice-Hall, 1991). They are caused by register-set limitations. The compiler's register allocation process minimizes the register usage by reusing registers as much as possible. This action blurs the distinction between register and value. Register renaming effectively reintroduces the distinction by renaming the registers in hardware, creating a new instance of a register for each new register assignment.

Speculative execution avoids stalls and reduces the penalty due to control dependencies. For every conditional branch, a superscalar processor predicts the likely branch direction, with help from software (static branch prediction) or hardware (dynamic branch prediction). Instructions from the predicted path are fetched and executed speculatively, without waiting for the outcome of the branch test. By scheduling instructions across multiple, unresolved conditional branches (multi-level speculative execution), more instruction parallelism is potentially extracted, improving the processor's performance. Due to the speculative nature, some conditional branches may be incorrectly predicted. A mechanism to recover and restart must be provided so that correct results can still be produced in the event of mispredicted branches. Recovery cancels the effect of instructions processed under false predictions, and restart reestablishes the correct instruction sequence.

Precise interrupts are supported to guarantee the correct processor state before servicing the interrupt. Out-of-order execution complicates the restarting of an interrupted program. At the time an exception is detected, some instructions beyond the exception instruction might have been executed, as a result of allowing out-of-order execution. The effects on registers and memory by any instructions beyond the precise-repair point [?] must be nullified or repaired before going to the interrupt handler routine. The hardware support for precise interrupts should not be too costly if there is already hardware support for speculative execution.

There are two key microarchitecture elements in superscalar hardware that determine the success in achieving the above goal, result shelving and instruction shelving. Result shelving is the key to support register renaming, out-of-order execution, speculative execution, and precise interrupts. Instruction shelving is the key to support multi-instruction issue, decoupled dataflow scheduling, and out-of-order execution. Review of the literature suggests that the reorder buffer (RB) is the most complete result shelving technique (see, for example U.S. Pat. No. 5,136,697 to Johnson and U.S. Pat. No. 5,345,569 to Tran for discussions of conventional reorder buffers), and the reservation station (RS) is the best instruction shelving technique to give maximum machine parallelism. However, these two techniques have implementation drawbacks. The RB requires associative lookup that must be prioritized during each operand read. This results in relatively complex and slow circuit implementation. Also, the RB requires substantial shared-global buses for its operand and result buses, and the need to use dummy branch entries to support speculative execution which increases the RB entry usage. The RS requires tremendous amounts of shared (heavily-loaded), global (chip-wide) wires to support its operand value copying and result value forwarding. With increasingly smaller transistor sizes, the dominant factors in determining silicon area and propagation delays is not the transistor, but metal wire, especially the ones that run across or all over the chip.

With the many promises that lie ahead, the research challenges in superscalar architecture design are to find: an efficient utilization of the vast chip real-estate, the high-speed transistors, and the available instruction parallelism. The hardware improvements that lead to enhanced performance must be coupled with compiler/software scheduling improvements, however. There is a need for these improvements to be cost effective, or, at best, to actually reduce the cost of a superscalar microprocessor while increasing efficiency. In accordance with the above, we should avoid the tendency to design an overly complex superscalar architecture that produces mediocre gains which could have been easily achieved by compiler optimizations or that are cost limiting.

SUMMARY OF THE INVENTION

The present invention is discussed at length in the doctoral dissertation entitled "*Microarchitecture Techniques to Improve Design of Superscalar Microprocessors*," Copyright © 1995, Georgia Institute of Technology, of one of the co-inventors, Joseph I. Chamdani, the subject matter of which is incorporated herein by reference. Hereinafter, the above dissertation will be referred to as Chamdani's dissertation.

This invention addresses architectural improvements to the design of superscalar processors that support the six key superscalar features. The primary objective of the invention was to find a better design alternative to the reorder buffer (considered the most complete, known result shelving technique) and the reservation station (considered the best known instruction shelving technique to give maximum machine parallelism) techniques. The two superscalar techniques invented are:

(1) the Modified Reorder Buffer (MRB): which is an improved reorder buffer (RB) technique that eliminates the slow and expensive prioritized associative lookup, shared global buses, and dummy branch entries (to reduce entry usage); and (2) the Distributed Instruction Queue (DIQ): which is a new distributed instruction shelving technique that offers a significantly more efficient (i.e., better performance/cost) implementation than the reservation station (RS) technique by eliminating operand value/copying and result value forwarding.

The modified reorder buffer (MRB) result shelving technique eliminates the major implementation drawback in typical reorder buffer (RB) designs, the slow and expensive prioritized associative lookup. The MRB uses a unique associative key to allow a simpler implementation using a circularly addressed register array which results in smaller and faster operations (in particular, during operand reads). To support multi-level speculative execution without the need to enter dummy branch entries in the RB, a new circuit, the Flush Address Queue (FAQ), is added. The FAQ reduces decode stalls due to RB full (lower number of entry usage) and allows quick branch misprediction repair/recovery. A cost analysis was performed which suggests a major reduction in the MRB's use of multiplexers and global wires relative to the RB's usage (see Chamdani's dissertation). A performance analysis using cycle-by-cycle simulators confirms that the MRB technique does work, and retains all of the RB's good performance characteristics (see Chamdani's dissertation).

The distributed instruction queue (DIQ) shelving technique offers a more efficient (i.e., good performance/cost) implementation of distributed instruction windows by eliminating the two major implementation drawbacks in the reservation station (RS) technique, operand value copying and result forwarding. The DIQ can support in-order issue as well as out-of-order issue within its functional unit. The cost analysis suggests an improvement in almost every hardware component, with major reductions in the use of comparators, multiplexers, and global wires (see Chamdani's dissertation). The expensive shared-global wires are mostly replaced by private-local wires that are easier to route, have less propagation delay, and occupy much smaller silicon area. The DIQ's number of global wires remain the same as the number of DIQ entries and data size increase. A performance analysis using cycle-by-cycle simulators confirms that the good characteristics of the RS technique in achieving maximum machine parallelism have been maintained in the DIQ technique (see Chamdani's dissertation). The out-of-order DIQ technique is at par with the RS technique in terms of cycle-count performance, but higher in terms of overall performance if the improved clock frequency is factored in. The in-order issue DIQ sacrifices slightly on the cycle-count performance, which can easily be recovered through faster and simpler circuit implementation. In the end, the actual speed or performance of a processor using the DIQ technique is faster due to reduced cycle time or more operations executed per cycle.

One object of the invention is to provide an improved superscalar processor.

Another object of the invention is to provide a reorder buffer that uses a unique associative key.

A further object of the invention is to provide a distributed instruction queue that does not store register values.

Still a further object of the invention is to eliminate the need for operand value copying in a superscalar microprocessor.

Yet another object of the invention is to eliminate the need for result value forwarding in a superscalar processor.

One other object of the invention is to provide a processor having reduced global buses.

One advantage of the invention is that is that it can improve the speed of a superscalar processor.

Another advantage of the invention is that it can reduce the amount of global buses required in a superscalar processor.

A further advantage of the invention is that it can allow for issuing of instructions in any order.

Still another advantage of the invention is that it can support multi-level speculative execution.

One feature of the invention is that it includes local bus architecture between register units and functional units.

Another feature of the invention is that it includes a register tag unit to hold speculative register tags and flush them on branch misprediction.

A further feature of the invention is that it includes an instruction identification unit.

Still another feature of the invention is that it includes a register tag unit to maintain the most recent tag for each register number.

Yet another feature of the invention is that it includes a modified reorder buffer that avoids prioritized associative lookup.

One other feature of the invention is that it includes a flush address queue to support multi-level speculative execution.

An additional feature of the invention is that it includes a unique retire process.

Still a further feature of the invention is that it includes selective flushing of speculative entries.

These and other objects, advantages, and features are accomplished by the provision of an improved reorder buffer having at least one entry cell, at least one port connected to the at least one entry cell, and at least one pointer logic for adjusting at least one pointer to point to the at least one entry cell, the improvement comprising an associative key unit that provides a unique associative key for read operations of the reorder buffer through the at least one port.

These and other objects, advantages, and features are provided by a modified reorder buffer whose operation is timed by cycles of a clock, comprising: at least one entry cell for receiving at least one entry; at least one allocate port, each of the at least one allocate port connected to each of the at least one entry cells; at least one write port, each of the at least one write port connected to each of the at least one entry cell; at least one read port, each of the at least one read port connected to each of the at least one entry cell; at least one retire port, each of the at least one retire port connected to each of the at least one entry cell; a head pointer logic unit to generate retire locations and to adjust the position of a head pointer amongst the at least one entry cell; and a tail pointer logic unit to determine a correct tail pointer position of each of the at least one allocation port, wherein the modified reorder buffer uses a unique associative key for read operations through the at least one read port.

These and other objects, advantages, and features are provided by a distributed instruction queue, comprising: at least one entry cell having at least one entry field; at least one allocate port, each of the at least one allocate port connected to each of the at least one entry cell; an issue port connected to a predetermined one of the at least one entry cell, wherein instructions are issued in any order from one of the at least one entry cell and the distributed instruction queue stores no register value.

These and other objects, advantages, and features are accomplished by the provision of a method for performing arithmetic and load/store instructions in a processor, comprising the steps of: fetching at least one instruction simultaneously from at least one storage unit; decoding the at least one instruction fetched in the fetching step simultaneously; assigning a tag for each valid instruction of the at least one instruction decoded in the decoding step, the unique tag also used to tag a destination register for the each valid instruction; allocating an entry at a modified reorder buffer for each new register assignment of an instruction; reading a unique register tag of operands corresponding to the multiple instructions decoded in the decoding step during the decoding step; dispatching the each valid instruction to a distributed instruction queue of an appropriate functional unit disposed in the processor; and shelving the each valid instruction by the distributed instruction queue to allow time to resolve data dependencies.

These and other objects, advantages, and features are accomplished by the provision of a method of using a distributed instruction queue in a processor, comprising the steps of: receiving at least one instruction from a decoder; shelving the at least one instruction to allow time to resolve data dependencies; automatically issuing one of the at least one instruction from the distributed instruction queue as soon as operands of the one of the at least one instruction become available; and
operating the distributed instruction queue without operand value copying and without result value forwarding.

These and other objects, advantages, and features are accomplished by the provision of a method of using a modified reorder buffer in a processor, comprising the steps of: allocating a plurality of entries to the modified reorder buffer for each of a plurality of register assignments during a decode stage of the processor in a cycle of a clock associated with said processor; presenting a plurality of unique operand tags to the modified reorder buffer to read a corresponding plurality of register values during an issue/execute stage of the processor; writing result values to the register value fields of previously allocated modified reorder buffer entries during a writeback stage of the processor; and checking to see if all or some of predetermined ones of the plurality of previously allocated modified reorder buffer entries can retire to a register file during a retire stage of the processor.

These and other objects, advantages, and features are provided by a processor, comprising: a fetch and decode unit to receive a first information from at least one storage device; a plurality of functional units connected to the fetch and decoder unit by a global bus; at least one register unit having a modified reorder buffer connected to a corresponding at least one register file by a retire bus, the at least one register unit connected to the plurality of functional units by a local bus, wherein the modified reorder buffer retires a second information related to the first information to the at least one register file over the retire bus, and the at least one register unit receives a third information related to the first and second information from the plurality of functional units.

These and other objects, advantages, and features are provided by a processor, comprising: a fetch and decode unit for fetching and decoding information; a plurality of functional units connected to the fetch and decode unit by a global bus; and a plurality of distributed instruction queues, each of the plurality of distributed instruction queues located in a corresponding one of the functional units for receiving instructions from the fetch and decode unit over the global bus.

These and other objects, advantages, and features are provided by a processor, comprising: at least one register unit disposed in the processor having registers; a register file contained in each of the at least one register unit; and a corresponding modified reorder buffer contained in each of the at least one register unit connected to the register file, wherein the corresponding modified reorder buffer supports register renaming, out-of-order execution, multi-level speculative execution, and precise interrupts.

These above and other objects, advantages, and features of the invention will become more apparent from the following description thereof taken in conjunction with the accompanying drawings.

BRIEF DESCRIPTION OF THE DRAWINGS

FIG. 4 shows an 8-entry dispatch stack.

FIG. 5 depicts a register update unit.

FIG. 7 shows the DRIS (Deferred-Scheduling, Register-Renaming Instruction Shelf).

FIG. 23 illustrates an MRB_cell circuitry.

FIG. 24 shows a support logic for the MRB.

FIG. 40 shows a register tag reorder buffer (RTRB).

DETAILED DESCRIPTION OF THE PREFERRED EMBODIMENTS

Figure 1:
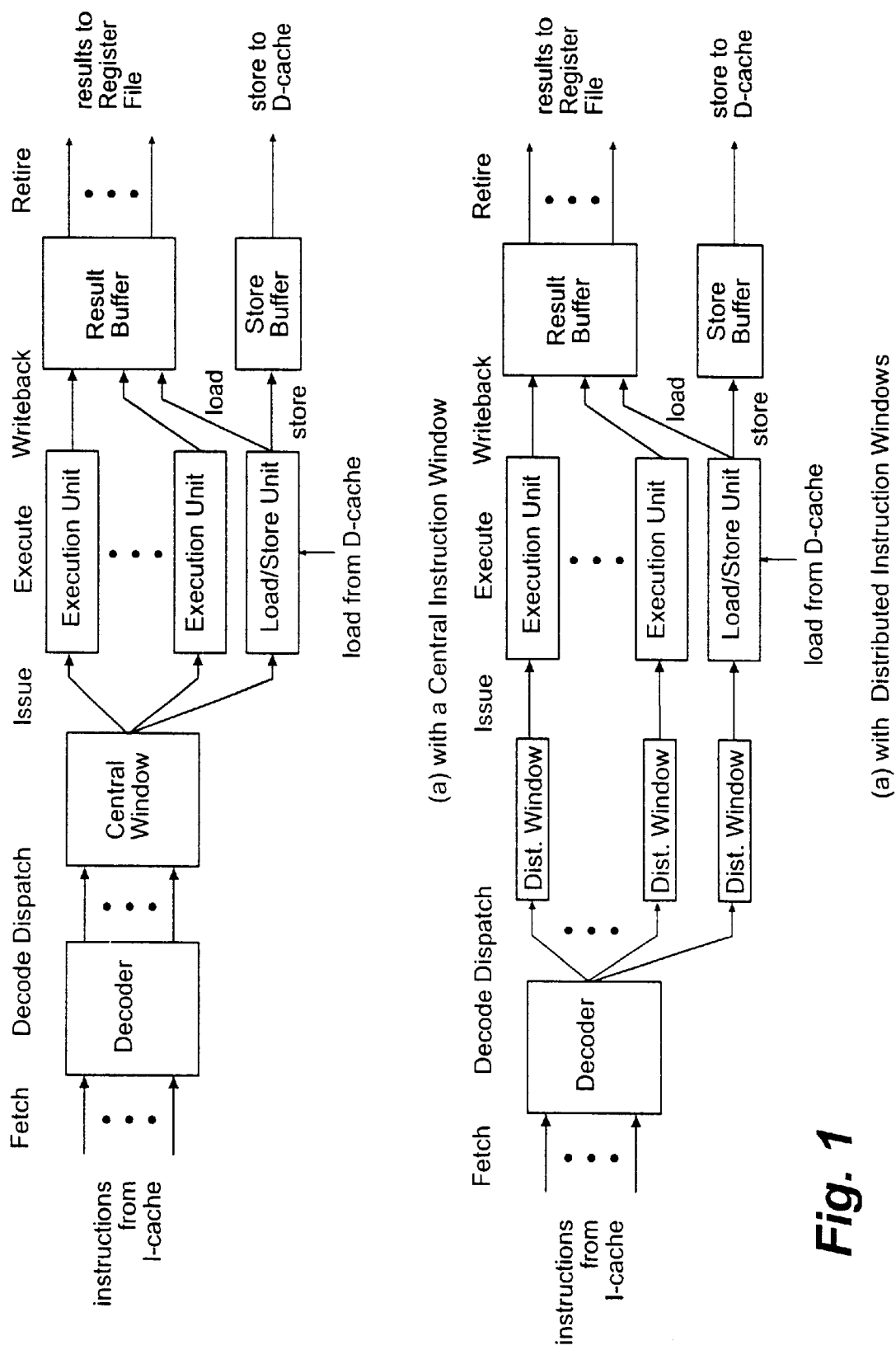
FIG. 1 shows basic steps in superscalar architectures.

The present invention is discussed at length in the above-cited Chamdani's dissertation, the subject of which is incorporated herein by reference.

To achieve the best result in parallelizing a sequential instruction stream, a superscalar microprocessor design typically supports multi-instruction issue, decoupled dataflow scheduling, out-of-order execution, register renaming, multi-level speculative execution, and precise interrupts. There are two key microarchitecture elements in superscalar hardware that determine the success in achieving the above goal, result shelving and instruction shelving. Result shelving is the key to support register renaming, out-of-order execution, speculative execution, and precise interrupts. Instruction shelving is the key to support multi-instruction issue, decoupled dataflow scheduling, and out-of-order execution.

The following sections discuss, analyze, and compare existing result shelving and instruction shelving techniques. A discussion and analysis of some current state-of-the-art commercial microprocessors are also given. All this information leads to the two superscalar techniques of the invention, the DIQ and MRB, which are described in detail.

Result Shelving Techniques

Result shelving is a technique to temporarily shelve register results before they can be safely retired to a register file. This usually involves buffering of multiple updates to the same register, thus allowing multiple copies/instances of a register to exist in a processor. Four result shelving techniques are discussed in the following sections: register scoreboarding, register-mapping table, checkpoint repair, and reorder buffer. These result shelving techniques are used to support certain superscalar features such as out-of-order execution, register renaming, speculative execution, and precise interrupts.

To support the above superscalar features, the complete processor state, which includes not only register file(s) but also software-visible memory, should be shelved. (It is assumed that a processor's register file(s) contains all architectural registers, including status/control registers.) Stores to the memory can be shelved separately into a store buffer. Each store instruction in the store buffer is committed only if it is safe, meaning: (a) the store instruction can be executed without an exception error (page fault, illegal address), (b) instructions prior to the store instruction are also exception-free, and (c) prior conditional branches have been resolved. These conditions guarantee in-order, non-speculative stores. Thus, despite possible out-of-order and speculative executions inside the processor, the memory is guaranteed to contain the same state as if the processor executed the code in the original, serial, sequential program order.

Register Scoreboarding

The register scoreboarding technique was originally introduced by Thornton in the CDC 6600 (see J. E. Thornton, *Design of a Computer-The Control Data 6600*, Scott, Foresman and Co., 1970, M. Johnson, *Superscalar Microprocessor Design*, Prentice-Hall, 1991). It is the simplest form of result shelving. There is only one level of result shelving, which is accomplished by copying operands and forwarding results to an instruction window. It only allows a maximum of one pending update to a register. Each register in the register file is associated with a scoreboard bit. A "0" indicates the register content is valid, and a "1" indicates there is a pending update. When a register is updated/written, its scoreboard bit is reset. The term "scoreboarding" used in typical commercial microprocessors, such as the Motorola 88100 and Intel i960CA, does not fit Thornton's definition because they are only used to detect and enforce dependencies (see Johnson, 1991). Instead of buffering to an instruction window, these microprocessors simply stall instruction decoding when data dependencies and resource conflicts are detected.

Thornton's scoreboarding algorithm can be summarized as follows. First, when an instruction is decoded, the scoreboard bit of the instruction's destination register is checked. If it is set, instruction decoding stalls until the destination register is updated by the pending instruction. However, if the destination register's scoreboard bit is clear, instruction decoding proceeds. The decoded instruction is shelved at an instruction window, together with the operand values (if the operand register's scoreboard bit is clear) or the operand register numbers (if the operand register's scoreboard bit is set). Thus, instruction decoding does not stall at data dependencies. The instruction waits at the instruction window until all of its operands become available. Any new instruction result is monitored. If its result register number matches the operand register number, the result value is taken as the operand value. Once all the instruction operands become available, it is ready for issue.

Register scoreboarding is a simple alternative to register renaming. Output dependencies are avoided by allowing only one pending update to a register. Anti dependencies are also avoided by copying of operands to the instruction window. Data dependencies are enforced by forwarding results to the instruction window, to free locked operands.

Register scoreboarding can support out-of-order execution because it preserves data dependencies while avoiding anti and output dependencies. However, it does not support speculative execution nor precise interrupts, because only the most recent updates of registers (architectural state) are maintained, without regard to speculative or out-of-order updates. For speculative execution and precise interrupts to work properly, there must be a mechanism to recover old values and restart at the in-order state prior to the speculative branching or exception instruction.

Register scoreboarding has a serious performance bottleneck. It stalls instruction decoding if there is a pending update to the instruction's destination register. Unlike scalar processors, superscalar processors fetch and decode instructions at a prodigious rate, at two, four, or maybe eight instructions at a time. The probability of an instruction decode stall becomes great. The available instruction parallelism is wasted if there are many register reuses, which is a common practice in most compiler register allocation algorithms.

Register-Mapping Table

Keller suggested implementing register renaming by literally renaming the registers (see R. M. Keller, "Look-Ahead Processors," *Computing Surveys*, Vol. 17, No. 4, pp. 177–195, 1975). A mapping table is used to maintain the mapping or association of an architectural register to its physical register. An architectural register is the register specified in an instruction, which can actually be viewed as the variable name representing a value. A physical register is the true hardware register. The mapping table effectively reintroduces the distinction between register (physical register) and value (architectural register), the essence of register renaming. To avoid anti and output dependencies there must be more physical registers than architectural registers.

Figure 2:
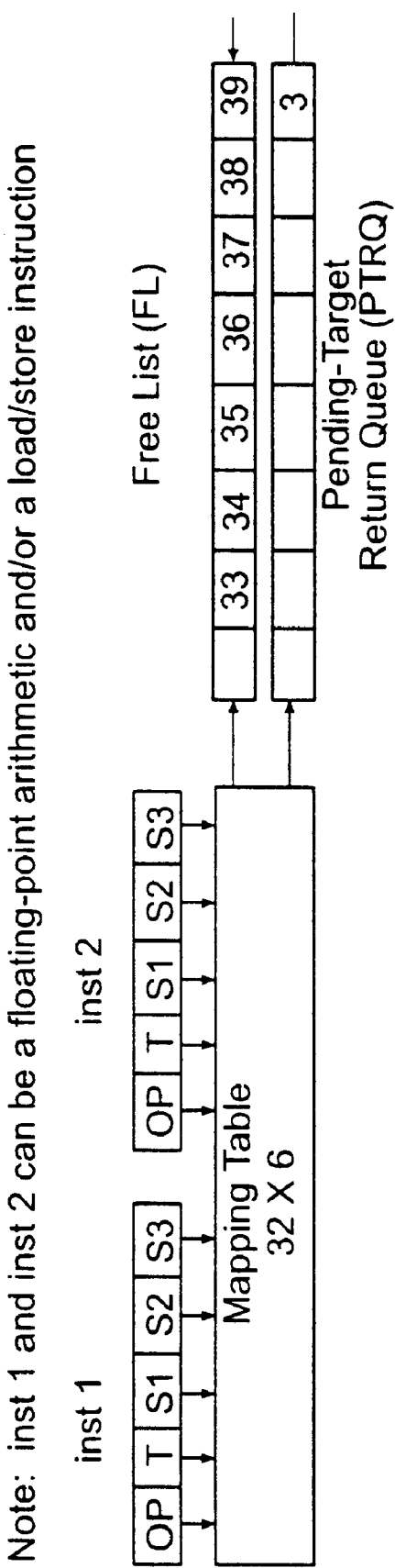
FIG. 2 shows a register mapping table in the IBM RS/6000 floating point unit.

The floating-point unit of the IBM RS/6000 (Trademark of IBM, Inc.) uses a 32-entry, 6-bit-wide register mapping table to implement register renaming, as shown in FIG. 2. There are 32 architectural registers and 40 physical registers. Some parts of the register-renaming structure are intentionally omitted from the original diagram to focus on the register mapping table. This register-renaming structure is implemented as a solution to the out-of-order completion problem of floating-point load/store and floating-point arithmetic instructions. In the IBM RS/6000, floating-point load/store instructions are performed independently at the fixed-point unit, which involve load/store address calculations. Without renaming, out-of-order completion can violate anti or output dependency. For example, in a floating-point load operation, the load data may return too early and overwrite a register that is still needed (i.e., it has not been read by an earlier floating-point arithmetic instruction).

The register renaming process is done as follows. For notational purpose, MP(i)=j (the contents of the mapping table at address i is j) indicates that architectural register Ri maps to physical register Rj. Initially, the mapping table (MP) is reset to identity mapping, MP(i)=i for i=0, . . . , 31. A remapping is performed for every floating-point load/store instruction decoded. Suppose a floating-point load to architectural register 3, FLD R3, arrives at MP. First, the old entry of MP(3), i.e., index 3, is pushed onto the pending-target return queue (PTRQ). Then, a new physical register index from the free list (FL), index 32, is entered to MP(3). This means R3 is now remapped to R32. Further instruction codes with source operand R3 will automatically be changed to R32. Index 3 in the PTRQ is returned to FL (for reuse) only when the last arithmetic or store instruction referencing R3, prior to the FLD R3 instruction, has been performed. This ensures that the current value in physical register R3 is not overwritten while still being used or referenced.

In terms of meeting superscalar objectives, the register-mapping table clearly supports register renaming and out-of-order execution. However, speculative execution and precise interrupt are not supported because shelving (register mapping) is done only if there are multiple updates to the same register. A speculative or out-of-order update to a register without pending update is not buffered or remapped. With out-of-order execution, recovery from branch mispredictions and exceptions would be impossible. In terms of performance, the register mapping table technique has a disadvantage. The access to the mapping table and the renaming process introduce at least one additional pipeline stage. In the case of the IBM RS/6000, two pipeline stages (PD and Remap) are actually dedicated to the register renaming process.

Reorder Buffer

Figure 3:
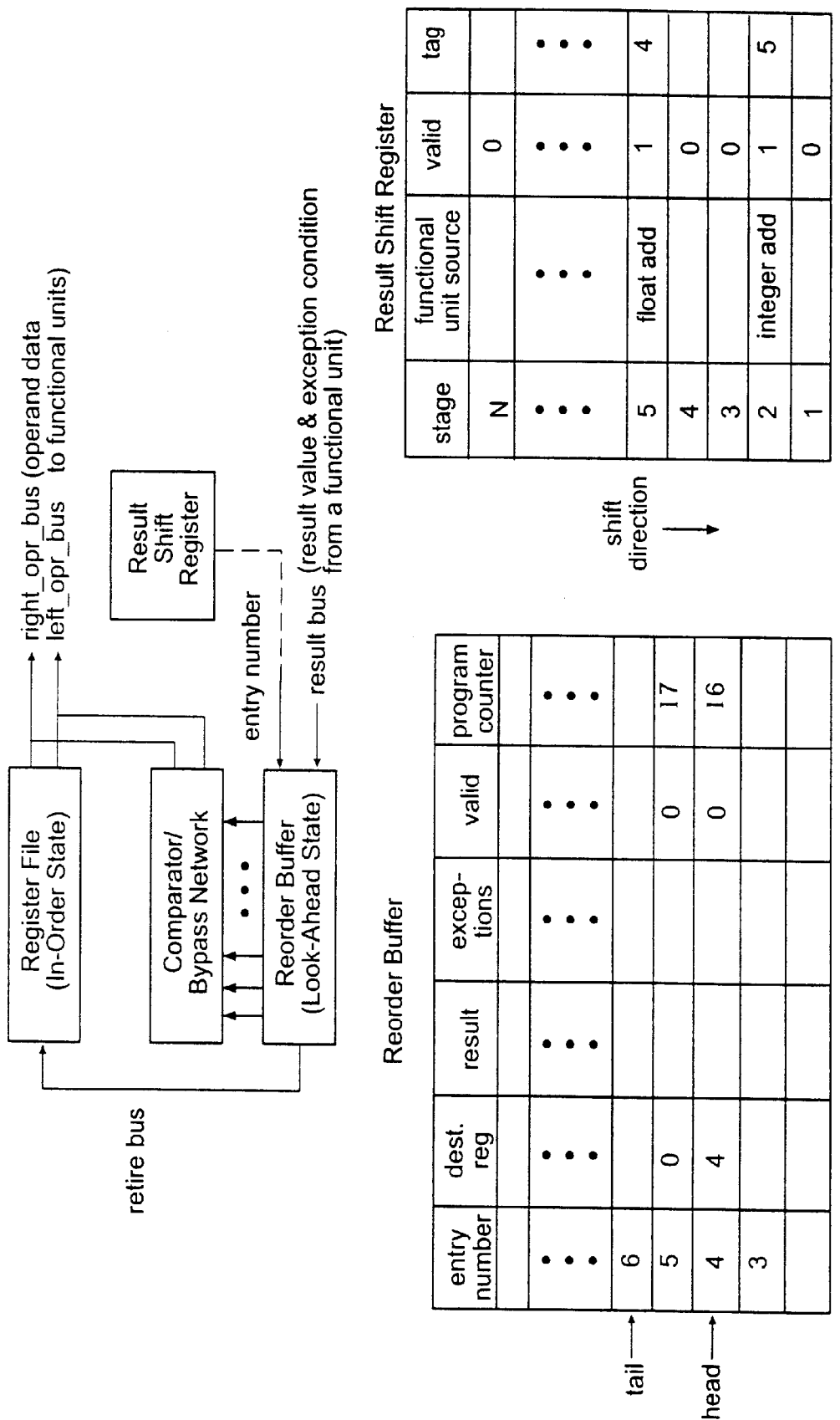
FIG. 3 illustrates reorder buffer organization.

The reorder buffer (RB) is a content-addressable, circular buffer with head and tail pointers. Entries are pushed in (allocate) and popped out (retire) in a FIFO (first-in-first-out) manner. It was originally proposed by Smith and Plezkun (see J. E. Smith and A. R. Pleszkun, "Implementation of Precise Interrupts in Pipelined Processors," *Proceedings of the 12th Annual Symposium on Computer Architecture*, pp. 36–44, 1985) as a hardware scheme to support precise interrupts in pipelined, scalar processors with out-of-order completion. FIG. 3 shows the RB organization. The RB contains the processor's look-ahead state, while the register file (RF) contains the in-order state. The result shift register (RSR) is used to control/reserve the single result bus. (In Smith and Plezkun's processor model, multiple functional units share one result bus.) When an instruction is issued, it reserves stage i of the RSR, where i is the instruction latency (in cycles). If stage i is already reserved, the instruction issue is stalled. The RSR shifts one position every cycle (toward a smaller stage number). When a valid RSR entry reaches stage 1, the result bus control is set such that in the next cycle the result from the entry's functional unit is gated to the RB.

There are four operations involving the RB: allocate (entry allocation), read (read operand), write (result write), and retire (entry retirement to RF). To best describe these operations, consider the instruction sequence shown below from (see Smith and Pleszkun).

| | PC | Instructions | Comments | Latency |
|---|---|---|---|---|
| I0: | 0 | R2 <- 0 | ;initialize loop index | |
| I1: | 1 | R0 <- 0 | ;initialize loop count | |
| I2: | 2 | R5 <- 1 | ;loop increment value | |
| I3: | 3 | R7 <- 100 | ;maximum loop count | |
| I4: | 4 | L1:R1 <- (R2 + A) | ;load A(I) | 11 cycles |
| I5: | 5 | R3 <- (R2 + B) | ;load B(I) | 11 cycles |
| I6: | 6 | R4 <- R1 +$_f$ R3 | ;floating-point add | 6 cycles |
| I7: | 7 | R0 <- R0 + R5 | ;increment loop count | 2 cycles |
| I8: | 8 | (R0 + C) <- R4 | ;store C(I) | |
| I9: | 9 | R2 <- R2 + R5 | ;increment loop index | 2 cycles |
| I10: | 10 | P = L1:R0! = R7 | ;cond. branch not equal | |

Program Example for Reorder Buffer

Smith and Plezkun state that the RB'S allocate operation is performed when an instruction is issued for execution to a functional unit. However, this will restrict the RB to support only out-of-order completion with in-order-issue. To also support out-of-order issue (full or partial), it is necessary to allocate entry when an instruction is decoded. This guarantees that instructions are allocated RB entries in the original program order. For example, FIG. 3 shows the contents of the RB after the RB allocations of I6 and I7. When I7 is decoded, an entry is allocated at the tail of RB (then at entry number 5), following I6's entry. The allocated entry is initialized with "dest. reg."=0 and "program counter"=7. The "valid" bit is also reset to indicate that the R0 value is being computed. The tail pointer is then incremented, modulo RB size. FIG. 3 also shows the RSR contents after I7 is issued (a cycle after I6 is issued). An entry is entered at stage 2 to reserve the result bus, because an integer add takes 2 cycles to complete. The previously allocated RB entry number/tag (5) is written to the RSR entry. The valid bit is set to validate entry.

The RB's read operation is performed prior to instruction issue. Reading an operand directly from the RB (bypassing, without waiting for the RB to retire it to the RF) requires an associative search based on the operand's register number. As an example, suppose I7 is about to be issued. I7's operand register numbers (0 and 5) are presented to both RB and RF. The comparators/bypass network compares 0 and 5 to the "dest. reg." field of all RB entries between head and tail pointers. If there is no match then the RF has the latest value. R0 (R5) from the RF is gated to the left opr_bus (right_opr_bus). If there is a match in RB with "valid"=1, then the "result" field is gated to the left or right operand bus. If the "valid" bit is not set (meaning the operand has not been produced), then I7 is not issued and must wait.

Multi-entry matching can occur in the RB because register number is not a unique associative-search key. Smith and Plezkun refer to this as the "multiple-bypass check" problem, which is also referred to as the "prioritized associative lookup" problem (see Johnson, 1991). Obviously, only the "latest" entry should generate a bypass path to the operand bus. For in-order instruction issue, the "latest" entry is simply the last allocated entry among the matched entries. For out-of-order instruction issue, the "latest" entry is the last allocated entry among the matched entries prior to the instruction's RB entry. This becomes the greatest implementation disadvantage for the RB. A significant amount of logic circuitry is required because matched entries can appear in any entry combinations.

The RB's write operation is performed when an instruction completes execution. The result value from the result bus is written to the instruction's RB entry ("result" field). The "tag" field in the RSR (stage 1) is used to guide the instruction to the correct RB entry. The exception conditions are written to the RB entry's "exceptions" field. To indicate that the result value has been generated, the "valid" bit is set.

The RB's retire operation is performed to retire completed result values to the RF (in-order state). Every cycle, the entry at the head of the RB is monitored for retiring. If the result value has already been generated ("valid"=1) and there is no exception ("exceptions"=0), then the head RB entry is retired to the RF. The result value in the "result" field is written based on its register number in "dest. reg.". The head pointer is then incremented, modulo RB size.

In terms of meeting superscalar objectives, it is obvious that the RB supports precise interrupts and out-of-order execution. Results are updated to the in-order state (RF) in the original, sequential program order, after checking their exception conditions. The RB also supports register renaming by creating a new instance/entry for every register assignment. Speculative execution is not readily supported. To support it, requires a mechanism to flush certain RB entries at a variable reset point (branch point). Johnson suggested allocating an entry in the RB for every conditional branch instruction, even though no result value is produced (see Johnson, 1991). When a conditional branch is mispredicted, the processor searches the corresponding "branch" entry in the RB. This entry becomes the reset point; all entries subsequent to it are flushed (tail pointer="branch" entry number). Or alternatively, we can let the "branch" entry reach the bottom (head) of the RB. However, this adds delay to the recovery and restart from a branch misprediction.

Smith and Plezkun presented two other methods for supporting precise interrupts: history buffer and future file. The history buffer does not fit in the result shelving category because results are written directly to the RF. Any out-of-order issue between two instructions with an identical destination register will cause a wrong register value to be written/read (violate output and anti dependencies). The future file provides a very limited, single-level result shelving and still requires an RB to recover from a branch misprediction or exception. The future file is actually a second RF that is used to store a processor's architectural state, in addition to the first, in-order state RF. only a single pending update to a register is allowed. Johnson studied these two hardware schemes in supporting speculative execution for superscalar processors (see Johnson, 1991). The history buffer requires excessive cycles to recover and restart from a branch misprediction. The future file also adds delay penalties to mispredicted branches, because the in-order state prior to the branch must be restored to the first RF.

SUMMARY OF COMPARISONS

Table 1 summarizes result shelving techniques, their features and shortcomings. Review of the literature suggests that the reorder buffer (RB) is the most complete result shelving technique (see Table 1). The closest contender to the RB is the register-mapping table, (also called "rename buffer", implemented as a multi-ported lookup table array), which is used in IBM POWERPCs, MIPS R10000 (Trademark of MIPS Technologies, Inc.), and HP PA-8000 (Trademark of Hewlett-Packard, Inc.). The register-mapping table technique has four disadvantages compared to the RB. First, to read a register operand, it has to access the mapping table, using the logical register number, to get the corresponding physical register number in the register file. This additional delay could potentially lengthen the processor's cycle time or introduce another pipeline stage. The third pipeline stage in the MIPS R10000 is dedicated solely to read operand registers.

Second, the mapping table is not a small circuit. For instance, the MIPS R10000 requires two 32×6 mapping tables, one with 12 read ports and 4 write ports for the integer register map, and another with 16 read ports and 4 write ports for the floating-point register map.

Third, precise interrupts are not supported. To overcome this problem, an additional component, called the Reactive list" in the MIPS R10000, is needed to track every active instruction and maintain the old physical register number prior to the new mapping/renaming (if the instruction updates a register) in the decode stage. If the instruction completes out of order and there is an exception at a preceding instruction, the mapping must be unmapped by writing back the old physical register number from the active list to the mapping table.

Fourth, speculative execution is not supported. To overcome it, the processor must save the whole mapping table in a storage area (called "shadow registers" in the MIPS R10000) for every speculated branch. When a branch is mispredicted, the processor yanks the old mapping table. The storage area increases as more levels of speculative execution are added.

TABLE 1

Comparisons of Result Shelving Techniques

|  | Register Scoreboard | Register-Mapping Table | Checkpoint Repair (not discussed) | Reorder Buffer |
|---|---|---|---|---|
| Superscalar Features Supported | • Out-of-order execution | • Out-of-order execution<br>• Register renaming | • Out-of-order execution<br>• Register renaming<br>• Speculative execution<br>• Precise interrupts | • Out-of-order execution<br>• Register renaming<br>• Precise interrupts<br>• Speculative execution (with branch entry location) |
| Notable Features | • Simple alternative to register renaming. | • No associative lookup, direct renaming of register numbers. | • No associative lookup. | • The most complete result shelving technique.<br>• Fastest branch misprediction recovery and restart |
| Shortcomings | • Multiple pending updates stall instruction decoding.<br>• Does not support speculative execution nor precise interrupts. | • Introduces new pipeline stages.<br>• Does not support speculative execution nor precise interrupts. | • Requires substantial storage for the logical spaces.<br>• Needs complex logic to route a result to the appropriate logical spaces.<br>• Slow branch misprediction recovery due to a wait to get the in-order logical space to the Current Space position. | • Requires associative lookup circuitry.<br>• Requires significant amount of comparators and logic circuitry to overcome the "prioritized associative look-up" problem. |

Instruction Shelving Techniques

Instruction shelving is a technique to temporarily shelve decoded instructions until they can be issued and executed at the appropriate functional unit. Thus, an instruction shelf (also called instruction window) is a wait station between decode and execution. Instructions in the instruction window can be dynamically scheduled to achieve multi-instruction issue, decoupled dataflow scheduling, and out-of-order execution. It is also possible to combine result shelving in the instruction window (called the integrated shelving technique) to support other superscalar features; register renaming, speculative execution, and precise interrupts. An instruction in an instruction window is issued (or ready to be issued) if all of its operand(s) are available, and all resources required (functional unit, operand buses, result bus) are granted.

There are two types of instruction windows: central window and distributed window. In the following sections we will discuss three central window techniques (the dispatch stack, register update unit, DRIS) and one distributed window technique (reservation stations).

Dispatch Stack

The dispatch stack (DS) is a central instruction window that performs dynamic code scheduling on the dynamic instruction stream of multiple functional unit processors. It allows out-of-order, multi-instruction issue. The instruction window behaves like a stack where instructions are allocated at the top and issued from the bottom. After a set of instructions is issued, the gaps (freed entries) are filled with unissued instructions above it (compression). Then, the next set of instructions can be pushed in. This is important to determine instruction order during dependency checks. A DS entry consists of an instruction tag, opcode, source and destination register identifiers, dependence fields, and issue index. To explain how the DS works, consider the program example shown below (see R. D. Acosta, J. Kjelstrup, and H. C. Torng, "An Instruction Issuing Approach to Enhancing Performance in Multiple Functional Unit Processors," *IEEE Transactions on Computers*, Vol. C-35, pp. 815–828, 1986), which adds floating-point numbers in R0 through R7 and leaves the sum in R0.

Program Example with Tight Data Dependencies

I0: fadd R0,R1,R0; R0←R1+R0

I1: fadd R2,R3,R2; R2←R3+R2

I2: fadd R0,R2,R0; R0←R2+R0

I3: fadd R4,R5,R4; R4←R5+R4

I4: fadd R6,R7,R6; R6←R7+R6

I5: fadd R4,R6,R4; R4←R6+R4

I6: fadd R0,R4,R0; R0←R4+R0

FIG. 4 shows the DS contents after the above sequence of instructions is decoded and allocated into the window. Since there is no register renaming mechanism in this case, the α and β dependence fields must include not only data dependencies, but also artificial (anti and output) dependencies. The α(S1) and β(S2) count the number of data dependencies (among its preceding instructions in the window). The α(D) counts the number of output dependencies, and β(D) counts the number of anti dependencies. An instruction is ready to issue if its issue index ($I^2$) is zero (meaning no dependencies). In FIG. 4(a), four instructions (I0, I1, I3, and I4) are issued, assuming there are adequate functional units and data paths to transmit operands and results. At the completion of each issued instruction, the destination register identifier (D) is forwarded to the DS, which is compared to the S1, S2, and D fields of all unissued instructions. Wherever there is a match, the appropriate α or β is decremented by 1. FIG. 4(b) shows the updated dependence fields, assuming I0, I1, I3, and I4 complete at the same time. Also note that the window has been compressed. In the next two issues, instructions I2 and I5 are issued simultaneously, followed by I6.

The hardware implementation of a DS is very complex. Each entry requires five counters for the dependence fields and issue index. When an instruction is decoded and allocated to the DS, these counters must be set by comparing the instruction's register identifier with every instruction in the window, requiring (5×number of instructions decoded per cycle×(number of DS entries−1)) comparators. The allocation process also requires each entry to be able to receive an instruction from any decoder position. Since instructions can be issued from any position, every functional unit must be able to receive an instruction from any DS entry. When an issued instruction completes, its destination register identifier must be compared to the register identifiers of all instructions in the DS, requiring another set of (5×number of instructions completed per cycle×number of DS entries) comparators. And, what could be the most complex circuitry, compressing the window requires each entry to be able to receive from any entry above it. Dwyer and Torng estimated that the issue, compression, and allocation circuitry for a mere 8-entry dispatch stack would consume 30,000 gates and 150,000 transistors (see H. Dwyer and H. C. Torng, A Fast Instruction Dispatch Unit for Multiple and Out-of-Sequence Issuances, School of Electrical Engineering Technical Report EE-CEG-87-15, Cornell University, Ithaca, N.Y., 1987 and Johnson, 1991). This complexity makes the dispatch stack unattractive.

Register Update Unit

Sohi and Vajapeyam proposed a simpler central window than the dispatch stack, called the register update unit (RUU) (see G. S. Sohi and S. Vajapeyam, "Instruction Issue Logic for High-Performance Interruptable Pipelined Processors," *Proceedings of the 14th Annual Symposium on Computer Architecture*, pp. 27–34, 1987). It avoids window compression by keeping issued instructions until they reach the bottom of the RUU, then retire if completed. It has a simpler allocation and issue logic, mainly because it was designed for scalar (single-instruction issue) processors with multiple functional units and long pipeline stages (CRAY-1 category). The RUU resolves data dependencies dynamically, avoids artificial dependencies, and supports out-of-order issue. What is interesting about the RUU design is that it combines the principles of Tomasulo's reservation stations (see R. M. Tomasulo, "An Efficient Algorithm for Exploiting Multiple Arithmetic Units," *IBM Journal of Research and Development*, Vol. 11, No. 1, pp. 25–33, 1967) and Smith and Plezkun's reorder buffer. Thus, an RUU is an instruction window as well as a result buffer (an integrated shelving technique). It supports five superscalar features; decoupled dataflow scheduling, out-of-order execution, register renaming, speculative execution, and precise interrupts.

To allow multiple instances of a register (register renaming), each register in the register file is associated with two counters (NI and LI). The NI counter represents the number of instances of a register in the RUU, while the LI counter represents the latest instance number. When an instruction with destination register Ri is decoded and allocated to the RUU, Ri's NI and LI counters are incremented. Wrap around in the LI counter is allowed (modulo counter). However, when the NI counter reaches its maximum value, the instruction decoding is stalled. When an instruction is retired from the RUU and updates the destination register, the NI counter is decremented. With these counters, tag allocations and deallocations become simple. A register tag now simply consists of the register number appended to the LI counter.

In each clock cycle, the RUU performs four operations simultaneously: (a) dispatch/allocate one instruction from the decoder, (b) issue one instruction nearest to the head pointer with ready operands, (c) writeback any result value to the instruction's RUU entry, and forward this result to any matching operand(s), and (d) retire one completed instruction at the head entry and update its result value to the register file. To describe these operations, consider the previous program listing. FIG. 5(a) shows the instruction timing when each instruction is allocated, issued, written back, and retired. It is assumed that each floating-point add takes six cycles to complete. FIG. 5(b) shows the snapshot of the RUU contents at cycle 7. Instruction I6 (fadd R0,R4, R0) has just been allocated at the tail of the RUU. Its program counter, functional unit source, operands, and destination register tag are written. The destination register tag (0,3) is simply the register number (0) appended with the current LI counter value for R0 (3). The "executed" flag is reset to indicate entry 6 as unissued. Operands are read directly from the register file. If an operand is available, its value is copied to the allocated entry and the "ready" flag is set. However, if an operand has not been produced, then its register tag is copied to the allocated entry and the "ready" flag is reset. Later when the operand value is produced, the RUU forwards it. By copying operands and forwarding results to the instruction window, anti and output dependencies are effectively eliminated (see Johnson, 1991).

The issue operation is carried out by first checking "ready" flags of source operand 1 and 2. Any unissued instruction with both operands' "ready" flags set is considered ready. Since only one instruction can be issued per cycle, priority is given to the one nearest to the head pointer. This instruction can issue if all accesses to the functional unit, operand buses, and result bus have been resolved. The issue may be out of order, as shown by the example in FIG. 5(b). Instructions are issued in the following order: I0, I1, I3, I4, I2, I5, and I6.

When an instruction completes execution, its result value is written back to the instruction's RUU entry at the destination's "content" field (writeback operation). The "executed" flag is set. To free locked instruction(s) that wait on this result, the destination's "tag" is compared to any source operand's "tag". A match triggers the forwarding of the result value to the operand's "content" field. The "ready" flag is then set. FIG. 5(c) shows the contents of RUU at cycle 9 where RUU performs a writeback operation due to the completion of I1. Because the I1's destination register tag (2,1) matches with I2's second operand, I1's result value is forwarded to I2's source operand 2 "content" and the "ready" flag is set. Now both of I2's operands are available and I2 is ready for issue.

The retire operation is performed on the instruction at the bottom entry of the RUU. If its "executed" flag=1, the result value (destination's "content") is retired to the register file and the head pointer is incremented, modulo RUU size (see I0 in FIG. 5(c)). Retiring from the bottom entry ensures that the register file is updated in the original program order. If the instruction does not complete successfully due to exception or branch misprediction, then a recovery action is initiated by flushing the entire contents of RUU. The register file automatically contains the correct in-order state at the branch point or precise-repair point. The NI and LI counters are reset to zero since the only instance of a register is in the register file (register instances in RUU are completely flushed).

Although the RUU meets many of the superscalar objectives, it is not directly applicable to superscalar processors. The RUU has serious performance bottlenecks (see Johnson, 1991):

The instruction issue rate is limited to one instruction per cycle (because it was designed for scalar, instead of superscalar processors).

The window entries of issued instructions are not immediately deallocated. Since only one entry (bottom entry) is freed at a time, a small window size results in frequent stalls at the decoder when the RUU is full. For the RUU to be effective, the window size must be relatively large. Simulation results reported by Sohi and Vajapeyam on Lawrence Livermore loop benchmark programs, show that a relative speedup (compared to the scalar CRAY-1 simulator) greater than 1.8 requires at least 50 entries (see Sohi and Vajapeyam).

An instruction with branch misprediction or exception is detected very late, after it reaches the bottom of the RUU. This is a substantial delay that causes many instructions beyond the branch or exception instruction to be fetched, decoded, and executed unnecessarily, wasting the processor's time with decreased performance.

DRIS

Figure 6:
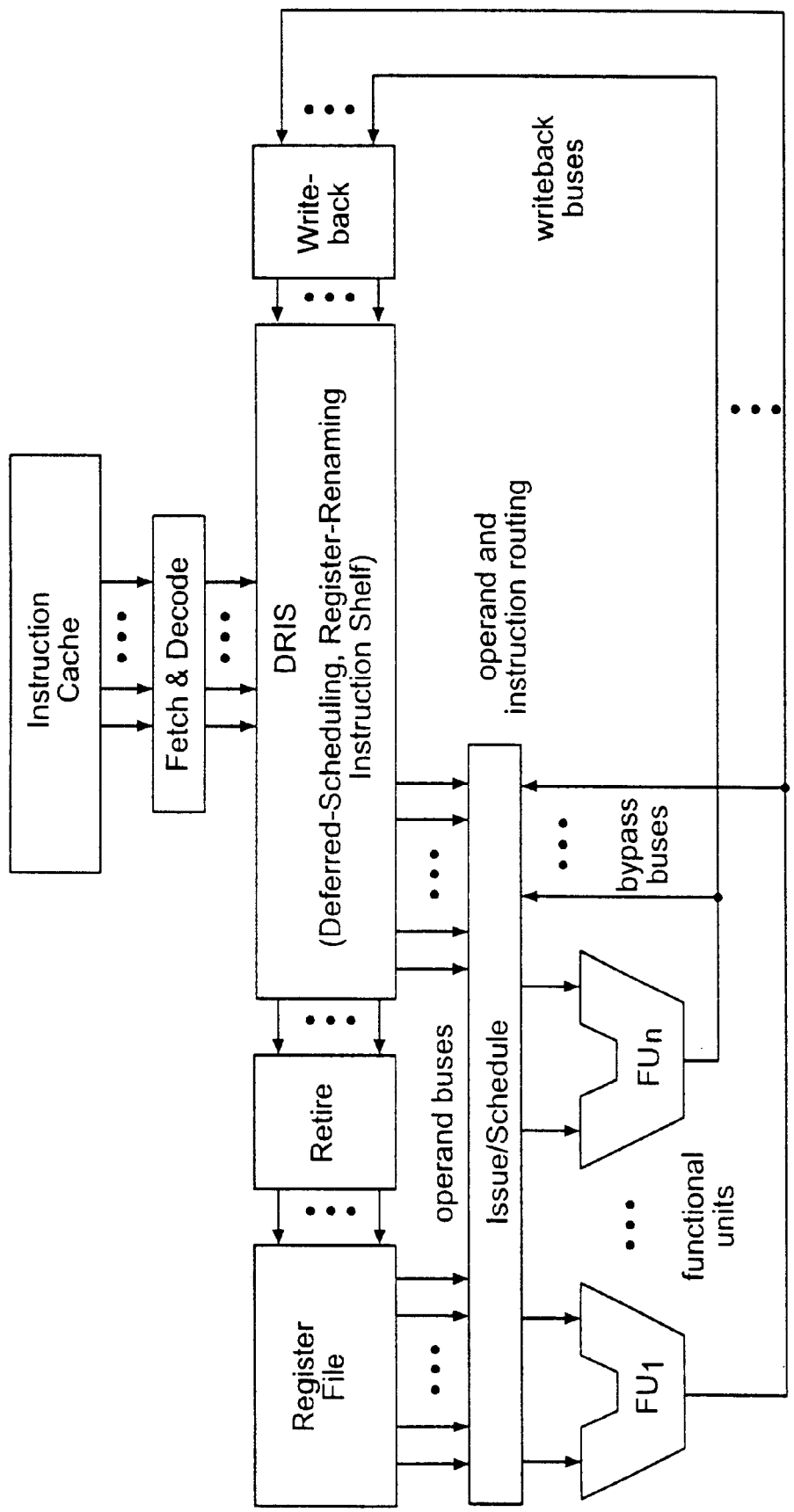
FIG. 6 is a diagram of the Metaflow architecture.

The DRIS (deferred-scheduling, register-renaming instruction shelf) is an improved version of Sohi and Vajapeyam's RUU that is more suitable for superscalar processors. The DRIS is the integrated shelving technique of the Metaflow architecture (see V. Popescu, M. Schultz, J. Spracklen, G. Gibson, B. Lightner, and D. Isaman (Metaflow technologies, Inc.), "The Metaflow Architecture," IEEE Micro, pp. 10–13 and 63–73, 1991), shown in FIG. 6. The DRIS supports all six superscalar features; multi-instruction issue, decoupled dataflow scheduling, out-of-order execution, register renaming, speculative execution, and precise interrupts. The first implementation of DRIS, named DCAF (dataflow content-addressable FIFO), appears in the Metaflow LIGHTNING/THUNDER SPARC microprocessor (Trademark of Metaflow Technologies, Inc.).

The key process to do register renaming, dependency checking, and result forwarding is the tagging of register results. The DRIS uses a different register tagging scheme than RUU. Each register in DRIS is tagged with the identifier (ID) of the producer instruction. The ID of a newly allocated instruction consists of the current "color" bit appended with its DRIS index (entry number). The color bit is used to distinguish the age or order of instructions when the valid entry area (from head pointer to tail pointer) wraps around. When incrementing the tail pointer (modulo DRIS size), if the DRIS index goes back to zero, the color-bit register is toggled. In determining the order of two instructions X and Y, we compare their IDs. If index(X)>index(Y) and color(X)=color(Y), then instruction x is "younger" (was allocated later) than instruction Y. If their color bits are opposite then the relationship is reversed.

There are four stages/operations in the Metaflow architecture involving the DRIS: dispatch/allocate, issue, writeback, and retire. (To be consistent with the terms used in this document, the Metaflow's terms of "issue", "schedule", and "update" have been changed to the similar terms dispatch/allocate, issue, and writeback, respectively.) To describe these operations, consider the previous program example. FIG. 7(a) shows the instruction timing when each instruction is allocated, issued, written back, and retired. It is assumed that there are four allocate ports, four retire ports, and two floating-point adders with 3-cycle latency. FIGS. 7(b) and 7(c) show the DRIS contents at different time points.

The allocate operation is performed when a set of decoded instructions arrives at the DRIS. For each instruction, the allocated DRIS entry is written with the program counter, opcode, functional unit class number, register numbers of source and destination operand(s), register tags of source operand(s), and some control information. FIG. 7(b) shows a snapshot of the DRIS at cycle 2 when I4, I5, and I6 have just been allocated. The "dispatched" and "executed" bits are initially reset. There are three associative searches involved for each entry allocation; during the setting of "latest" bit in the destination section and during the setting of "locked" bit and "ID" fields in both source operand sections (dependency checking). Consider next the allocation of I6. To determine the "latest" bit, the DRIS allocate logic searches and compares all other entries (including the ones currently being allocated) with the same destination register number as I6 (0). If no match, the "latest" bit is automatically set. In this case, there are two matched entries (I0 and I2). The ID (color, index) comparisons of I0, I2, and I6 show that I6's entry is the youngest. This means I6 is the last instruction in the DRIS that updates R0. So, I6's "latest" bit is set and I2's and I0's "latest" bits are reset. To determine the "locked" bit and "ID" fields of I6's second operand (R4), register number 4 is associatively searched among the destination registers of other older entries. If no match is found, no instructions in the DRIS updates R4 and R4 must be retrieved from the register file. The "locked" bit is cleared and the "ID" field is set to a default value (e.g. the instruction's own ID) to indicate that the operand is in the register file. However, in this case, two matches are found (I3 and I5), but IS's entry contains the latest R4. Therefore, its index (5) plus the current color bit (0) becomes the ID (0,5) of I6's second operand. The "locked" bit and "ID" fields of I6's first operand are determined similarly.

The issue operation is performed by checking the "locked" bits of unissued instructions ("dispatched"=0). The oldest instruction with both operands unlocked ("locked"=0) is given priority for issue, provided the requisite functional unit is available. The DRIS issue logic strives to find as many instructions to issue as possible. FIG. 7(b) shows a case where the DRIS finds two instructions (I0 and I1) to issue. The DRIS issue logic checks the ID field of each source operand to determine the operand location (either in the register file or the DRIS). Since I0's and I1's source operand IDs are the instruction's own ID (default value for register file location), the operand values are fetched from the register file. In the case that an operand is in the DRIS, the operand ID's index part locates the DRIS entry, where the "content" field of the destination section is then routed as the operand value. In any case, the DRIS issue logic passes the opcode, operand values, and ID of each issued instruction to the corresponding functional unit. The "dispatched" bit of the issued entry is then set.

The writeback operation is performed when an instruction completes execution. The instruction's DRIS entry is found by the result ID's index part. The result value is then written to the "content" field of the destination section. The result ID is broadcast and compared to the operand IDs of other valid DRIS entries. A match clears the corresponding "locked" bit. Thus, the result forwarding unlocks any locked operands that are dependent on the result value. FIG. 7(c) shows how I3's and I4's results unlock both operands of I5.

The retire operation is performed in order, starting from the oldest instruction in the DRIS (bottom entry). Multiple instructions may be retired simultaneously depending on the number of retired ports and the eligibility of instructions. An instruction is eligible to retire if (see Popescu, et al.): (a) it has completed successfully ("executed"=1 and no exception error), (b) all older instructions have been retired or are being retired in this clock cycle, and (c) there is an available retire port to write the register "content" to the register file. FIG. 7(c) shows two instructions (I0 and I1) are eligible to retire.

The DRIS handles memory-reference instructions (loads and stores) by forcing them to go through the dispatch/allocate, issue, execute, and writeback operations twice: first to compute the load/store address, and second to load/store the memory data. Load bypassing is allowed.

The DRIS supports multi-level speculative execution by shelving multiple instances of condition code. The condition code value is written to the DRIS entry of a condition code-setting instruction (at the "content" field of the destination section). When a branch instruction is decoded and allocated a DRIS entry, the branch's operand "ID" field is written with the ID of the youngest condition code-setting instruction (associatively searched). When this instruction completes execution, the writeback operation causes the branch operand to be unlocked. As the oldest branch entry is issued, the predicted branch direction (part of the "opcode" field) is compared to the branch operand, i.e., the condition code fetched from DRIS. If the branch was correctly predicted, then the "executed" bit is set and operation continues as usual (the speculative execution is successful so far). However, if a branch misprediction is detected, then a branch repair action is invoked. To flush all entries following the mispredicted branch, the DRIS tail pointer is set to the branch ID's index.

Compared to the register update unit, the DRIS improves three areas (see Popescu, et al.): (a) register renaming, (b) operand storage and routing, and (c) branch misprediction delay. First, the implementation of register renaming is improved by a more efficient register tagging (ID). Costly counters per register are avoided. The LI and NI counters also limit the number of instances of a register, which could result in more stalling. Second, the storage per entry in the DRIS is less than the RUU because operand values are not copied to DRIS entries. Rather, the operand values are read directly from the DRIS destination section (or the register file) at issue time. This strategy also saves expensive data routing during result forwarding, eliminating paths from result values to operand fields. Third, branch misprediction is repaired as soon as it is issued and executed, not when it is retired at the bottom of the window.

Despite these improvements, the DRIS still carries one RUU disadvantage: window entries of issued instructions are not immediately deallocated. DRIS entries are freed only when instructions are retired, which proceeds in order, from the bottom of the DRIS. This could result in frequent stalls at the decoder as the DRIS gets full, which may occur due to a small window size or relatively long waits due to many data dependencies or unresolved conditional branches. For the DRIS to be effective, the window size must be sufficiently large, which increases hardware cost. Another potential disadvantage of DRIS is long load and store delays. Many cycles could be saved if the load/store address computation is implemented as a separate instruction and scheduled as early as possible.

Reservation Stations

Figure 8:
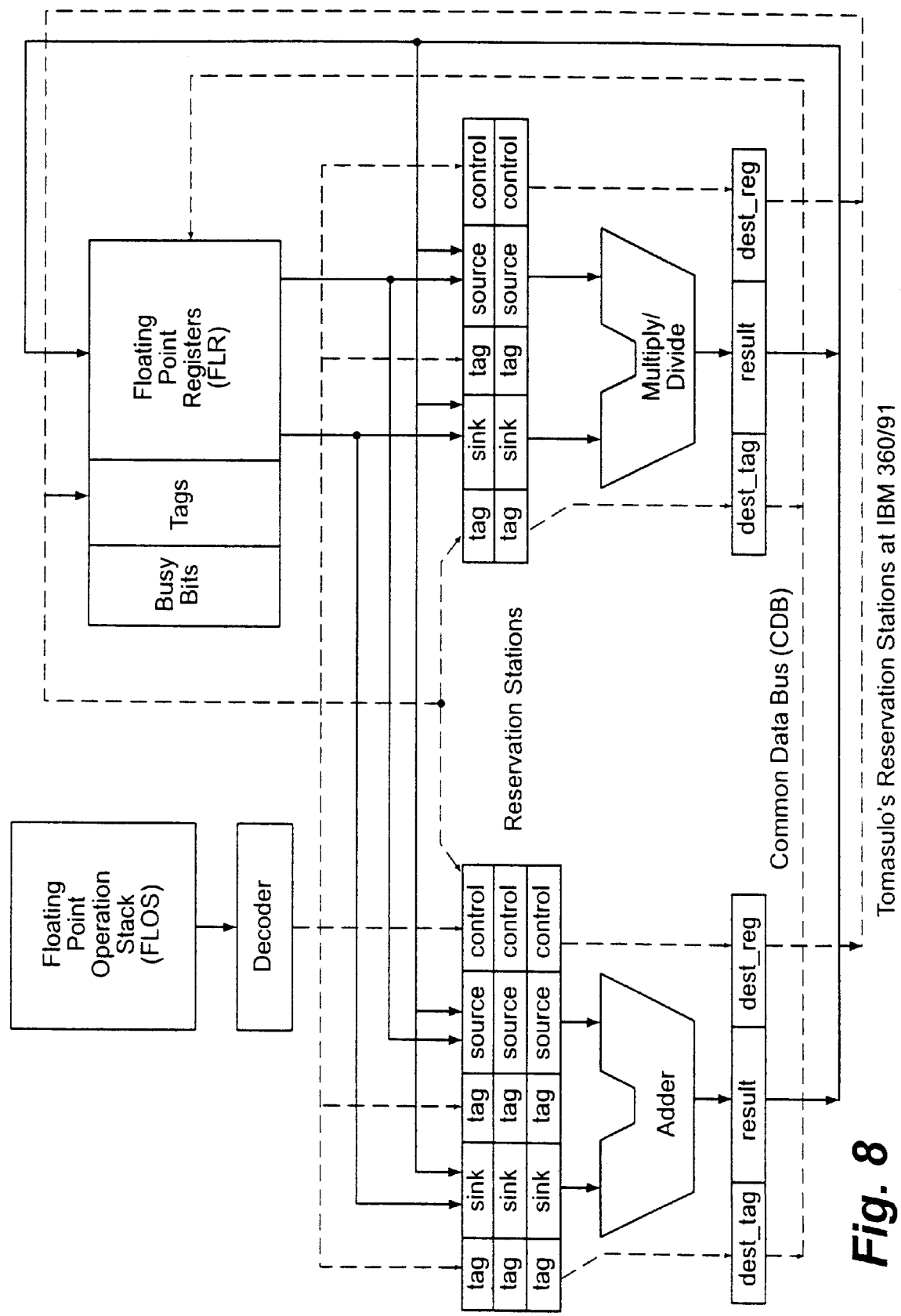
FIG. 8 shows Tomasulo's Reservation Stations at IBM 360/91.

Tomasulo introduced reservation stations in the floating-point section of the IBM 360/91 to exploit the multiple execution units. The main objective was to permit simultaneous execution of independent instructions while preserving the precedence (data dependency) constraints in the instruction stream. Reservation stations are essentially an implementation of distributed instruction windows with some result shelving. The result shelving, done by copying operands and result forwarding to reservation stations, are necessary to support register renaming. FIG. 8 shows the hardware implementation of Tomasulo's algorithm. (To focus the discussion on the reservation stations, two hardware units (floating point buffers and store data buffers) are intentionally omitted from the original diagram.)

There are four key components in Tomasulo's concept: busy bit, tag, reservation station, and common data bus. A busy bit is associated with each floating-point register or operand as a dependency mechanism. If set (busy bit=1) then it means the register is not available, currently being generated. A tag is associated with each register instance, which is used in place of the register number/identifier. This reintroduces the distinction between register and value, the essence of register renaming. In Tomasulo' algorithm, a tag corresponds directly (1-to-1) to a reservation station. For example, in the IBM 360/91, tag numbers 10 through 12 correspond to the three reservation stations of the adder unit. However, Weiss and Smith suggested a more flexible way of assigning tags (S. Weiss and J. E. Smith, "Instruction Issue Logic in Pipelined Supercomputers," *IERE Transactions on Computers*, Vol. C-33, No. 11, pp. 1013–1022, 1984). When an instruction is decoded, a new tag is assigned for its destination register from a "tag pool" that consists of some finite set of tags. When the instruction completes, the tag is returned to the pool for reuse.

The reservation station is a wait station for an instruction that is about to be executed. Each execution unit has its own set of reservation stations. Each reservation station consists of four fields: sink tag, sink value (first operand), source tag, source value (second operand), and control. The control field contains opcode and destination register number information. It also contains information defining whether the reservation station is ready to issue or not. Two busy bits for the sink and source can be used. If both clear then both operands are available and the reservation station is ready to issue. Note that the IBM 360/91 has two-operand instructions. A sink register is a destination register as well as a source operand. A three-operand processor would have a different reservation station format: source 1's busy bit, tag, value, source 2's busy bit, tag, value, dest tag, and control.

The actions taken during instruction decode are as follows. The decoder decodes one instruction from the top of the floating point operation stack (FLOS). A reservation station is allocated at the appropriate execution unit. Instruction operands (sink and source) are copied from FLR to the reservation stations. If the busy bit of an operand register in FLR is clear (indicating the register value is valid), then the register content, tag, and busy bit are copied to the reservation station (at sink or source fields). A new tag is updated to the destination register in FLR, and the busy bit is set. This new tag is the reservation station's assigned number. However, if the busy bit of the operand register in FLR is already set (indicating another instruction is currently generating the register value), then only the register tag and busy bit are copied to the reservation station.

The actions taken during instruction issue are as follows. For each execution unit, one waiting instruction from its reservation station set is selected for issue/execution. This instruction must satisfy the following requirements: (a) all of its operands are available, (b) it has priority over other waiting instructions that are also ready, and (c) its request for the result bus (common data bus), at the clock period when the result will be generated, has been granted. The reservation station number of the issued instruction becomes the destination register tag (dest_tag). The issued instruction then releases the reservation station for others to use.

When the instruction completes execution, the result value, destination register number (dest_reg) and tag (dest_tag) are placed at the common data bus (CDB). This result is updated to the FLR based on dest_reg and dest_tag. The FLR compares the dest_tag to the last tag of the dest_reg to ensure that only the most recent instruction changes the register. The result is also forwarded to the reservation stations. Each active reservation station compares its sink and source tags to the dest_tag. If they match, the result is written to the sink and/or source fields. This may free some waiting instruction(s).

Implementing instruction shelving by Tomasulo's reservation stations accomplishes the following superscalar objectives:

Achieves multi-instruction issue by allowing each functional unit to independently issue an instruction from its reservation station set, Achieves decoupled dataflow scheduling by shelving all decoded instructions and not stalling instructions at the decoder, Permits out-of-order execution while preserving data dependency constraints, and Achieves register renaming (enforces data dependencies, eliminates anti and output dependencies) by tagging registers, copying operands and result forwarding to reservation stations.

Anti dependencies (write-after-read hazards) are avoided by copying operands to reservation stations. Once operands are read from the FLR and copied to the reservation stations (at decode stage), they cannot be overwritten by writes/updates from subsequent instructions. If an operand value is not available from the FLR at the decode stage, its register tag is copied instead to the reservation station. When the operand value is finally generated by one of the execution units, it will be delivered to the reservation station. Thus, result forwarding enforces data dependencies (read-after-write hazards). Output dependencies (write-after-write hazards) are avoided by comparing tags at the FLR on every register write, to ensure that only the most recent instruction changes the register.

Tomasulo's algorithm lacks a mechanism to handle speculative execution. If instructions are allowed to be fetched, decoded, and executed speculatively, then the FLR only contains the architectural state. Only the most recent updates of registers are maintained, regardless of whether they are speculative updates or not. For speculative execution to work properly, there must be a mechanism to recover certain old values and restart at the in-order state prior to the speculative branching. To support speculative execution, the register file can be accompanied by a reorder buffer. The original Tomasulo's algorithm also lacks multi-instruction fetch and decode. A single-instruction decoder really underutilizes the potential machine parallelism. It is not difficult however, to expand Tomasulo's reservation stations to handle multi-instruction decode and become a superscalar distributed window (see Johnson, 1991).

Summary of Comparisons

Table 2 is a summary of instruction shelving techniques. The features which support superscalar design are defined and the good and poor features of each technique are also noted. Review of the literature suggests that the reservation station (RS) is the best instruction shelving technique to give maximum machine parallelism (see Table 2). The closest contender to the RS is the DRIS (Deferred-scheduling, Register-renaming Instruction Shelf), a central window technique used in the Metaflow Thunder SPARC. The DRIS central window technique has five disadvantages compared to the RS distributed window. First, the DRIS has long load and store delays because it forces all memory-reference instructions to go through the dispatch, issue, execute, and writeback pipeline stages twice; first to compute the load/store address, and second to load/store the memory data.

Second, inherently, the DRIS has less parallel issue capability (machine parallelism) than the RS. In the RS technique, by distributing the windows to each execution unit, the number of instructions that can be issued in parallel is as many as the total number of execution units, because each execution unit's window can issue an instruction. On the contrary, the maximum number of parallel issues in the DRIS central window is limited to the number of issue ports.

Third, the hardware to support multiple out-of-order issues is very complex because the issue logic has to deal with greater numbers of instructions and resource allocation conflicts relative to the RS technique, which deals with fewer instructions locally and only needs to issue one instruction.

Fourth, the instruction routing in the DRIS central window with out-of-order issue requires that there is an issue path from any window entry to any functional unit. The requirement in the reservation-station distributed window is simpler, one issue path from any window entry to one functional unit. Moreover, since the RS window has considerably fewer entries than the DRIS window, the instruction routing complexity becomes even simpler.

Fifth, in DRIS, window entries of issued instructions are not immediately retired/freed, resulting in inefficient use of the window especially if there are long chains of data dependencies or long, unresolved conditional branches. This inefficiency could result in frequent decode stalls and reduce performance. As a result, the DRIS window size must be made relatively large, which increases hardware cost considering each DRIS entry contains many comparators, register bits, and logic to update different kinds of flags (locked, latest, dispatched, executed). The other penalty is the need for DRIS to retire/deallocate multiple entries per cycle. In contrast, the RS only issues one instruction at a time, in which the issued-entry is deallocated immediately.

The proof of DRIS hardware complexity is seen in the Metaflow Thunder SPARC which requires a three-chip set implementation even using IBM's advanced 0.5-micron CMOS process (see R. Wilson, "RISC Face-Off Coming to Hot Chips," *Electronic Engineering Times*, pp. 1–68, 1994). In general, a central window technique is more complex to implement than a distributed window technique.

superscalar processor that supports (single-level) speculative execution and register renaming, the IBM RS/6000, was also introduced in 1989 (see R. D. Groves and R. R, Oehler, "An IBM Second Generation RISC Processor Architecture," *Proceedings of the 1989 IEEE International Conference on*

TABLE 2

Comparisons of Instruction Shelving Techniques

|  | Dispatch Stack | Register Update Unit | DRIS | Reservation Stations |
|---|---|---|---|---|
| Type | Central window | Central window | Central window | Distributed windows |
| Superscalar Features Supported | • Multi-instruction issue<br>• Decoupled data-flow scheduling<br>• Out-of-order execution | • Decoupled data-flow scheduling<br>• Out-of-order execution<br>• Register renaming<br>• Speculative execution<br>• Precise interrupts | • Multi-instruction issue<br>• Decoupled data-flow scheduling<br>• Out-of-order execution<br>• Register renaming<br>• Speculative execution<br>• Precise interrupts | • Multi-instruction issue<br>• Decoupled data-flow scheduling<br>• Out-of-order execution<br>• Register renaming |
| Notable Features | • Immediately frees issued entries for reuse. | • Integrated shelving (instruction + result), combining the principles of reservation station and reorder buffer.<br>• Simple tag allocation and de-allocation using the NI and LI counters. | • Integrated shel-ving (instruction + result), an improved version of RUU<br>• No need to copy operands to DRIS entries, reduces storage requirement.<br>• Supports multi-level speculative execution. | • Integrated shel-ving (instruction + result).<br>• The result shel-ving supports register renaming.<br>• More parallel issue capability than a central window; each func-tional unit has a window to issue instruction. |
| Shortcomings | • Artificial dependencies stall instruction issue. Requires very complex circuitry (especially for window compression). Uses many counters and comparators.<br>• 8-entry dispatch stack already consumes 30,000 gates and 150,000 transistors. | • Single-instruction issue. To be effective, the window size must be relatively large because issued entries are not immediately freed.<br>• Late detection of branch misprediction and exception.<br>• Copying operands to RUU increases storage/area.<br>• Result forwarding to all window entries increases global bus routing. | • To be effective, the window size must be relatively large because issued entries are not immediately freed.<br>• Long load and store delays because they are Processed in DRIS twice.<br>• The hardware to support out-of-order is complex, lengthens clock period, and adds a pipeline stage.<br>• Result forwarding to all DRIS entries increases global bus routing. | • Result shelving at reservation stations does not support speculative execution, unless the register file is accompanied by a reorder buffer.<br>• Copying operands to reservation stations increases storage and global bus routing.<br>• Result forwarding to all reser-vation stations increases global bus routing. |

Commercial Superscalar Microprocessors

The first commercial superscalar microprocessor was the Intel i960 CA, which was introduced in 1989. The superscalar features supported were limited, excluding speculative execution and register renaming. The i960 CA decodes four instructions at once, issues up to three of them per cycle, and can sustain a maximum execution rate of two instructions per cycle. The Intel i960 CA was followed by many other versions (CF, MM, etc.). A more complete *Computer Design*, pp. 134–137, 1989). Many other superscalar microprocessors followed later.

The following sections describe six commercial superscalar microprocessor architectures: the IBM RS/6000, Metaflow LIGHTNING/THUNDER SPARC, TI SUPER-SPARC (Trademark of Texas Instruments, Inc.), DECchip 21064 (ALPHA AXP), HP PA-7100 (Trademark of Hewlett-Packard, Inc.), and Intel PENTIUM. The discussions focus on the superscalar aspects of the processors. A summary of upcoming superscalar microprocessors that have been recently announced to reach their sampling status in 1995 or 1996 is also given at the end. These include the DEC ALPHA 21164, Sun Microsystems ULTRA-SPARC (Trademark of Sun Microsystems Computer Corporation), IBM POWERPC 620 (Trademark of IBM, Inc.), MIPS R10000, HP PA-8000, and AMD K5. All of these new microprocessors adopt some kind of superscalar techniques to support out-of-order and speculative execution. Other trends are the migration to true 64-bit architectures, larger bandwidths, multimedia hardware support, and glueless two- or four-way symmetric multiprocessing. Among all existing microprocessors to date, the DEC Alpha 21164, the follow-on to Alpha 21064, currently has the highest performance. Its single-chip architecture is a combination of superpipelined and superscalar architectures. Volume-wise, the Intel PENTIUM is currently the superscalar microprocessor sold in the largest quantities, used in PCs and low-priced workstations, mainly due to its large x86 software-base.

IBM RS/6000

Figure 9:
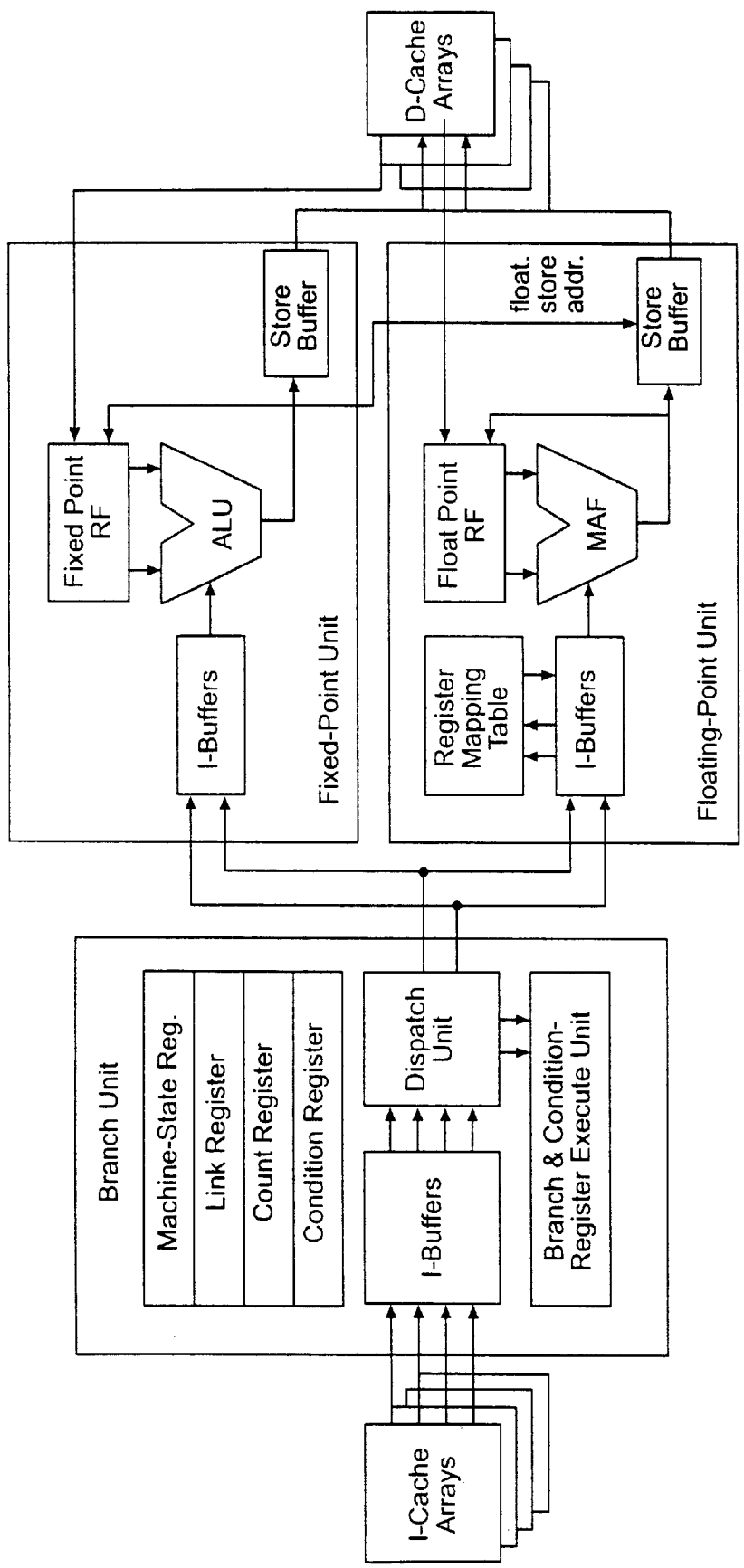
FIG. 9 is a diagram of the IBM RS/6000 architecture.

The IBM RS/6000 is a multi-chip superscalar processor with a RISC instruction set (derivation of the 801 instruction set), capable of executing up to four instructions per cycle. FIG. 9 shows the architecture of the IBM RS/6000. There are three functional units—the branch unit (BU), fixed-point unit (FXU), and floating-point unit (FPU)—that are capable of executing instructions in parallel. The BU can issue up to two instructions per cycle, a branch and a condition-register instruction. The FXU issues one instruction per cycle, which can be a fixed-point arithmetic, a fixed-point load/store, or a floating-point load/store. The FPU issues one floating-point arithmetic instruction per cycle including a multiply-add instruction. Each functional unit has instruction buffers (I-buffers) to shelve instructions. These I-buffers are organized as a FIFO instruction window with in-order issue. The BU's I-buffers are a central window that contain all fetched instructions (not decoded yet). The FXU's and FPU's I-buffers are distributed windows. Both receive the same fixed- and floating-point instructions (not decoded at this point).

The instruction cache (I-cache) is a two-way set-associative cache with 16-instruction cache lines. The I-cache can supply four instructions per cycle for each fetch address (PC) presented, regardless of whether the PC is quad-word aligned or not. Instruction aligning is achieved by implementing the I-cache with four independent I-cache arrays, each fetching one instruction per cycle. By adjusting the address and rerouting (aligning) the output of each I-cache array, four instructions can always be fetched, provided they reside in the same cache line. It is to be understood that memory or other storage units may be used instead of an I-cache array.

The BU receives four instructions per cycle from the I-cache arrays into the BU's 12-entry I-buffers and dispatch unit. The dispatch unit dispatches externally to the FXU and/or FPU any two-instruction combination of fixed- and floating-point instructions. If the remaining two instructions contain a branch and/or a condition-register instruction, they are dispatched and executed internally in the BU. When a conditional branch instruction is encountered, the BU fetches the branch-not-taken path instructions (default branch prediction direction) and dispatches them to the FXU and FPU. These instructions are executed speculatively and can be canceled if the branch is mispredicted (by postponing retirement to register files and flushing the pipelines). The branch-taken path instructions are also fetched from the I-cache arrays and placed at the BU's I-buffers, but their dispatching (or flushing) is held off until the branch outcome is known. The worst-case penalty for a branch misprediction is three cycles. The penalty can be eliminated if there are enough independent instructions to separate the compare from the branch.

The BU has four special purpose registers (see R. R. Oehler and R. D. Groves, "The IBM RISC/6000 Processor Architecture," *IBM Journal of Research and Development*, Vol. 34, No. 1, pp. 23–36, 1990); the machine-state register (to control system states), the link register (for subroutine return address), the count register (to control loop iteration), and the condition register (to support multiple condition codes for conditional branches). Zero-delay branch for loops with a known iteration count is achieved with the branch-and-count instruction that uses the count register. The condition register contains eight condition fields, two of which are reserved to contain the condition code results of arithmetic computations in the FXU and FPU. The remaining six can be explicitly set by other fixed- or floating-point compare instructions and special branch-unit instructions. The setting of each condition field is controlled by the record bit (Rc) of arithmetic instructions. There are advantages to having multiple, setable condition fields. First, the compiler can schedule a compare instruction early, as far away as possible from the conditional branch instruction. Second, several compare instructions can be scheduled first (their results written into separate condition fields), which are then followed by a single conditional branch instruction. This is useful to implement a guarded statement/code section with multiple guard conditions, eliminating the typical structure of a series of single compares followed by a single branch.

The FXU contains I-buffers, an arithmetic logic unit (ALU), a general-purpose fixed-point register file, and a single-entry store buffer. The I-buffers receive both fixed- and floating-point instructions from the BU's dispatch unit, but issue only fixed-point instructions and floating-point load/store instructions to the ALU. Addresses of all loads/stores are computed in the FXU. The ALU includes a multiply/divide unit with 3- to 5-cycle multiply and 19- to 20-cycle divide latencies. The store buffer holds data and address of one fixed-point store instruction. The store buffer makes load bypassing possible. Address and data of floating-point store instructions are buffered in the FPU. The I-buffer is a strictly FIFO instruction window with in-order issue. Partial out-of-order issue is achieved among different functional units. Since there is only one ALU and no out-of-order issue in the FXU, the integer RF is not accompanied by a result buffer. Result values are written directly to the integer RF, except on speculative results which are held off in the pipeline until the branch condition is known. Further instruction issue/execution in the FXU must be stalled. This limits the speculative execution capability in the IBM RS/6000.

The FPU contains I-buffers, a unified floating-point multiply-add-fused unit (MAF), a floating-point register file, a register-mapping table, and a store buffer. FPU's I-buffers receive the same instructions as FXU's I-buffers, but issue only floating-point arithmetic instructions to the MAF. The MAF can perform an indivisible multiply-accumulate operation (A×B)+C, which reduces the latency for chained multiply-add operations, rounding errors, chip busing, and the number of adders/normalizers. The latency of a floating-point multiply-add instruction (FMA) is two cycles (see R. K. Montoye, et al., "Design of the IBM RISC System/6000 Floating-Point Execution Unit," *IBM Journal of Research* and Development, Vol. 34, No. 1, pp. 59–70, 1990). The register-mapping table provides register renaming (8 renaming registers) to allow independent, out-of-order executions of floating-point load/store and arithmetic instructions. The store buffer contains five entries for addresses and four entries for data. A floating-point store instruction is issued at the FXU where the store address is calculated and placed at the store buffer. Once the FPU produces the store value, it is placed at the corresponding entry in the store buffer, ready to be committed to the data cache (it is to be understood that memory or other storage units may be used instead of a data cache). By buffering stores, the FXU can continue issuing subsequent loads (load bypassing).

The number of pipeline stages in the BU, FXU, and FPU are two, four, and six, respectively. To describe how instructions are executed in the RS/6000 pipeline stages, consider the following 2-D graphics transform program example shown below in RS/6000 pseudo-assembly code (see G. F. Grohoski, "Machine Organization of the IBM RISC System/6000 Processor," *IBM Journal of Research and Development*, Vol. 34, No. 1, pp. 37–58, 1990).

| 2-D Graphics Transform Program Example | | | |
|---|---|---|---|
| I1: | FL | FR0,sin__theta | ;load |
| I2: | FL | FR1,-sin__theta | ;rotation matrix |
| I3: | FL | FR2,cos__theta | ;constants |
| I4: | FL | FR3,xdis | ;load x and y |
| I5: | FL | FR4,ydis | ;displacements |
| I6: | MTCTR | i | ;load count register with loop count |
| I7:_LOOP: | UFL | FR8,x(i) | ;load x(i) |
| I8: | FMA | FR10,FR8,FR2,FR3 | ;form x(i)*cos + xdis |
| I9: | UFL | FR9,y(i) | ;load y(i) |
| I10: | FMA | FR11,FR9,FR2,FR4 | ;form y(i)*cos + ydis |
| I11: | FMA | FR12,FR9,FR1,FR10 | ;form −y(i)*sin + FR10 |
| I12: | FST | FR12,x(i)' | ;store x(i)' |
| I13: | FMA | FR13,FR8,FR0,FR11 | ;form x(i)*sin + FR11 |
| I14: | FST | FR13,y(i)' | ;store y(i)' |
| I15: | BCT | _LOOP | ;continue for all points |

Figure 10:
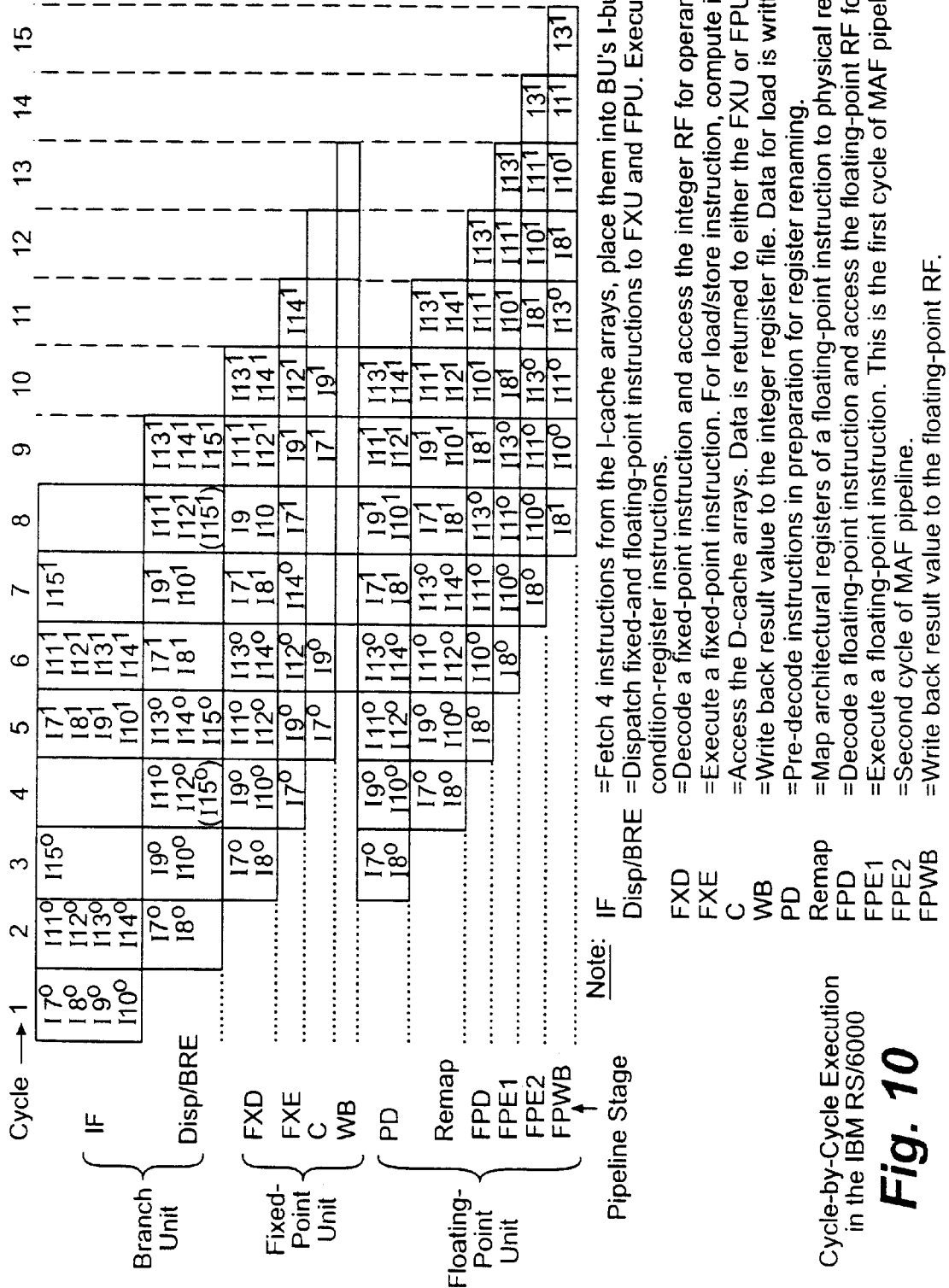
FIG. 10 shows cycle-by-cycle execution in the IBM RS/6000.

FIG. 10 shows the cycle-by-cycle execution of the inner loop. The superscripts indicate the iteration numbers. During cycle 1, four instructions (I7$^0$, I8$^0$, I9$^0$, I10$^0$) starting from_LOOP label are fetched from the I-cache arrays and placed into BU's I-buffers. During cycle 2, the first load and multiply-add instructions (I7$^0$, I8$^0$) are sent to the FXU and FPU, respectively. The next four instructions are fetched (I11$^0$, I12$^0$, I13$^0$, I14$^0$). During cycle 3, the FXU decodes the floating-point load (I7$^0$) and discards the floating-point multiply-add (I8$^0$). The FPU pre-decodes both instructions for register renaming. The loop-closing BCT instruction (I15$^0$) is fetched. During cycle 4, there is no valid instruction fetch because the branch target address is still being computed. The FXU computes the address of the first load (I7$^0$), while decoding the second load (I9$^0$). The FPU renames the floating-point registers of I7$^0$ and I8$^0$. The BU detects the BCT instruction and generates the branch target address. During cycle 5, instructions from the next iteration (I7$^1$, I8$^1$, I9$^1$, I10$^1$) are fetched. The D-cache is accessed for the first load (I7$^0$). The FXU computes the address of the second load (I9$^0$). The first FMA instruction (I8$^0$) is decoded at the FPU. During cycle 6, the FPU executes the first FMA instruction while decoding the second FMA instruction (I10$^0$). The D-cache is read for the second load (I9$^0$). In summary, the first iteration outputs x(i)' and y(i)' are stored at cycle 10 and 11, respectively. The iteration period of this loop is 4 cycles. In FIG. 10, there is no branch penalty (zero-cycle branch) in FXU's and FPU's pipelines. The execute pipeline stages (FXE, FPE1, FPE2) are always full, primarily because the instruction fetch rate is twice the instruction issue rate at the arithmetic units. However, a true branch penalty should be seen at the fetch stage (IF), which in this case shows a one-cycle branch delay due to the branch address calculation.

The IBM RS/6000 processor chipset consists of nine chips (including I-cache and D-cache arrays, bus controller, and I/O controller), which are implemented in a 1-$\mu$m, three-metal CMOS process. The total number of transistors is 6.9 million. The benchmark performance figures on the top of the line system, the IBM RS/6000 POWERSTATION (Trademark of IBM Corporation) 580 (62.5 MHz), are SPECint92 61.7, SPECfp92 133.2 (see R. Myrvaagnes, "Beyond Workstations," *Electronic Products*, pp. 17–18, 1993), and 38.1 MFLOPS on (double precision, N=100) LINPACK (Trademark of Digital Equipment Corporation—see Digital Equipment Corporation, ALPHA AXP Workstation Family Performance Brief-Open VMS, 1992).

In general, the IBM RS/6000 supports all six superscalar features (multi-instruction issue, decoupled dataflow scheduling, out-of-order execution, register renaming, speculative execution, and precise interrupts), some in a limited way. Although four instructions are fetched per cycle, only two (fixed- and floating-point) or three (including a branch) instructions are typically issued per cycle. Only single-level speculative execution is supported. Multiple unresolved conditional branches cause issue stalls because of the lack of a result buffer. Precise interrupts are not supported in the regular mode. They are only supported when the processor is put in the "synchronize" mode, which slows the processor significantly.

Metaflow LIGHTNING/THUNDER SPARC

Figure 11:
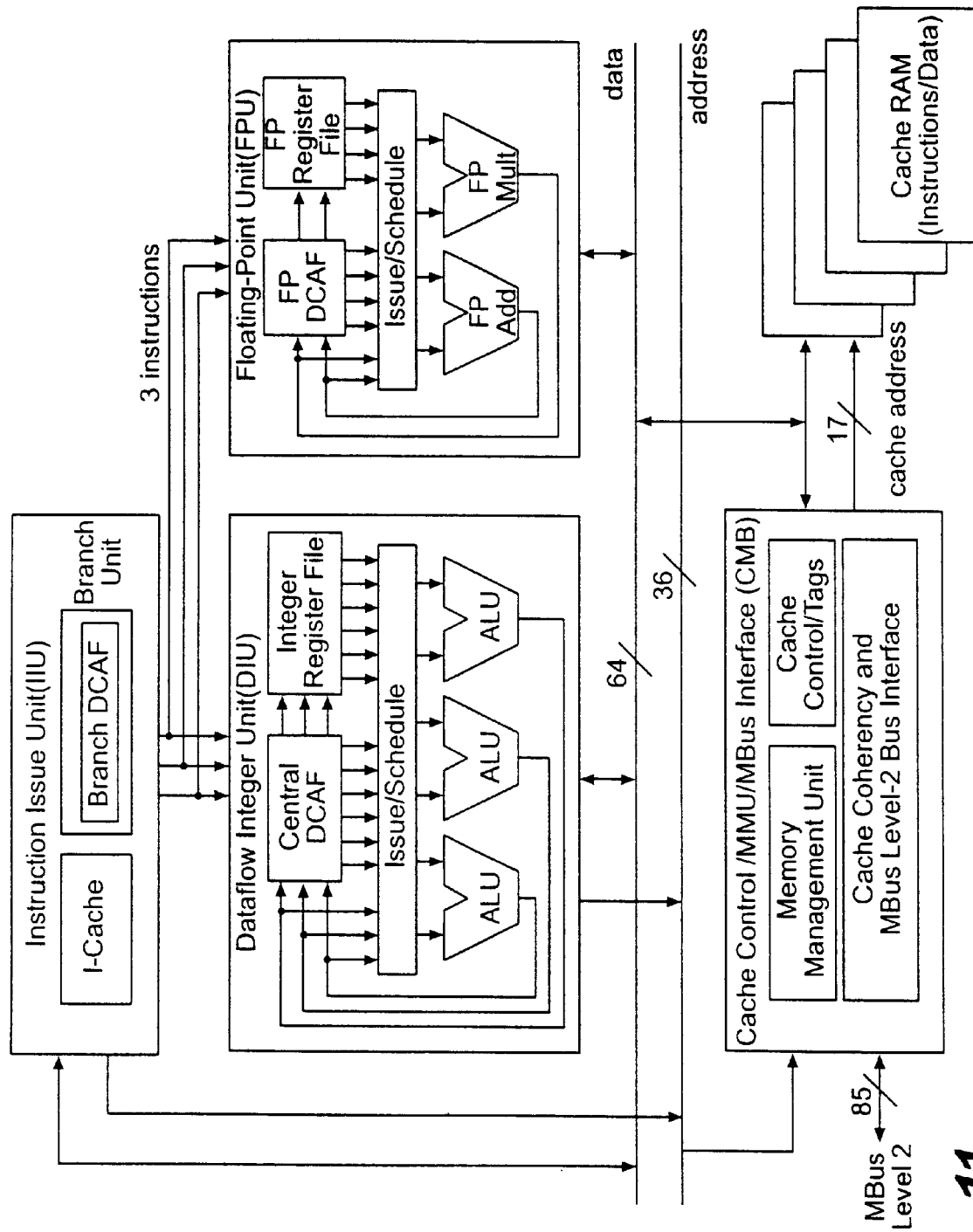
FIG. 11 is a diagram of the Lightning SPARC architecture.

The LIGHTNING SPARC microprocessor, from Metaflow Technologies, Inc., is the first implementation of the Metaflow architecture that executes the SPARC (v.8) RISC instruction set. The architecture is based on the DCAF (dataflow content-addressable FIFO), a DRIS implementation. Although the DRIS is conceptually a central window, it is implemented as three physical windows: (a) the central DCAF in DIU which shelves all instructions (complete DRIS), (b) the floating-point DCAF in FPU which shelves only floating-point instructions, and (c) the branch DCAF in IIU which shelves only conditional branch instructions. The central DCAF is the central window that is responsible for retiring operations; while others are only a subset of the central DCAF. FIG. 11 shows the LIGHTNING SPARC module which consists of an external cache (up to 1 Mbyte) and four ASICs; the instruction issue unit (IIU), the dataflow integer unit (DIU), the floating-point unit (FPU), and the cache controller/MMU/bus interface (CMB). The external cache consists of the first-level cache for data and the second-level cache for instructions (the first-level is in the IIU chip).

The IIU fetches four instructions per cycle from the on-chip instruction cache (I-cache), assigns a unique ID to each instruction, and computes their PCs. Instruction aligning is achieved by the self-aligning I-cache with an 8-instruction cache line. To guarantee supplying four instructions at all times, a branch to the last three instructions of a cache line causes a read and concatenation of two cache lines. Of these four instructions, up to three of them are sent to both the DIU and FPU. If one of the four instructions is a control-transfer instruction (branch, call, return), the IIU executes that instruction itself (at the branch unit). Thus for a typical cycle, all four instructions fetched are not taken/processed. The IIU also contains a one-entry shelf for the processor state registers. A second instruction attempting to write the same state register before the first has retired, is stalled.

The IIU's branch unit executes a conditional branch instruction speculatively, and shelves it at the branch DCAF for a later misprediction check. The branch DCAF is a specialized DRIS implementation that shelves conditional branch instructions that were speculatively executed. The ID of the oldest, unresolved conditional branch instruction is sent to the retire logic in the central DCAF, to prevent retiring speculative instructions. During the writeback stage, the IDs and results of up to three condition code-setting instructions (two from the integer ALUs in DIU and one from the floating-point adder in FPU) are updated to the branch DCAF. During the execute stage, all branch entries with unlocked operands compare their condition code result with the prediction. If not the same, then the conditional branch was misspeculated. Branch repair is initiated on the oldest mispredicted branch. Its ID is broadcast to all DCAFs. All entries with younger IDs are flushed by moving the tail pointers accordingly.

The DIU contains the central DCAF, two integer ALUs, one memory-address ALU, and retire logic. Up to three instructions can be allocated into the central DCAF, including floating-point instructions which are used for retirement purposes. The central DCAF invokes issue and writeback operations only on integer and memory-reference instructions. To allow proper retiring, each cycle the central DCAF is informed by the FPU on all IDs of successfully executed floating-point instructions. The retire logic can retire up to eight instructions per cycle in the central DCAF (see Popescu, et al.): three that update integer registers or condition codes, two that update floating-point registers, one store instruction, and any two instructions of other types (control transfers, processor state updates). The FPU contains the floating-point DCAF, a floating-point adder, and a floating-point multiplier. The floating-point DCAF invokes allocate, issue, and writeback only on floating-point instructions. To deallocate entries, the floating-point DCAF is informed by the DIU on the IDs of retired floating-point instructions.

The simulation study shows that the Lightning SPARC can exploit instruction parallelism by mainly relying on its dynamic hardware scheduling. The processor is observed to be insensitive to the quality of the SPARC compiler's code generator, especially toward code scheduling and register allocation (see Popescu, et al.). Speculative execution also plays an important role. The processor always has to execute some instructions speculatively, with at least one unresolved conditional branch. The performance limitations observed are memory bandwidth, FPU bandwidth, branch prediction accuracy, branch address calculation latency, and instruction cache hit rate (see Popescu, et al.).

The Lightning SPARC never became a commercial product due to the disintegration of the partnership with the original foundry LSI Logic Corp. These shortcomings found during the first design implementation may have also contributed to the failure:

Low Clock Speed:
  The out-of-order issue hardware greatly affects control logic delays. Within each clock cycle, the scheduler must examine a large number of instructions in the DCAF, determine which instructions are ready to issue, and select based on priority rules (see Popescu, et al.). This lengthens the basic clock cycle when compared to conventional RISC processors. The estimated clock speed is relatively low, in the 40-MHz range. The out-of-order issue in DCAF also adds a pipeline stage for scheduling.

No Breakthrough in Performance:
  The performance on 100×100 Linpack is around 18 MFLOPS while its competitors (the IBM RS/6000, HP PA-7100, DEC ALPHA AXP) are in the 30 40 MFLOPS range. The performance on Dhrystone (Version 1.1) is estimated at 116,000 D/s. The single-chip, 40-MHz SUPERSPARC (on the SPARCSTATION (Trademark of SPARC International, Inc.) 10/41 system) has a Dhrystone performance of 192, 400 D/s.

Expensive Implementation Cost:
  The design complexity of the DCAF requires substantial VLSI real estate and forces an implementation with four ASICs. Several other single-chip processors with simpler designs have better performance. The medium performance of the Lightning SPARC does not justify the expensive hardware cost and complex design.

In 1994, Metaflow Technologies Inc.'s new partnerships with VLSI Technology Inc. and IBM Microelectronics gave a new birth to the Lightning SPARC design as the Thunder SPARC (see Wilson). With IBM's 0.5-micron, four-metal CMOS implementation the Thunder SPARC chip set is expected to operate at 80 MHz and deliver performance close to 200 SPECint92 and 350 SPECfp92.

TI SUPERSPARC

Figure 12:
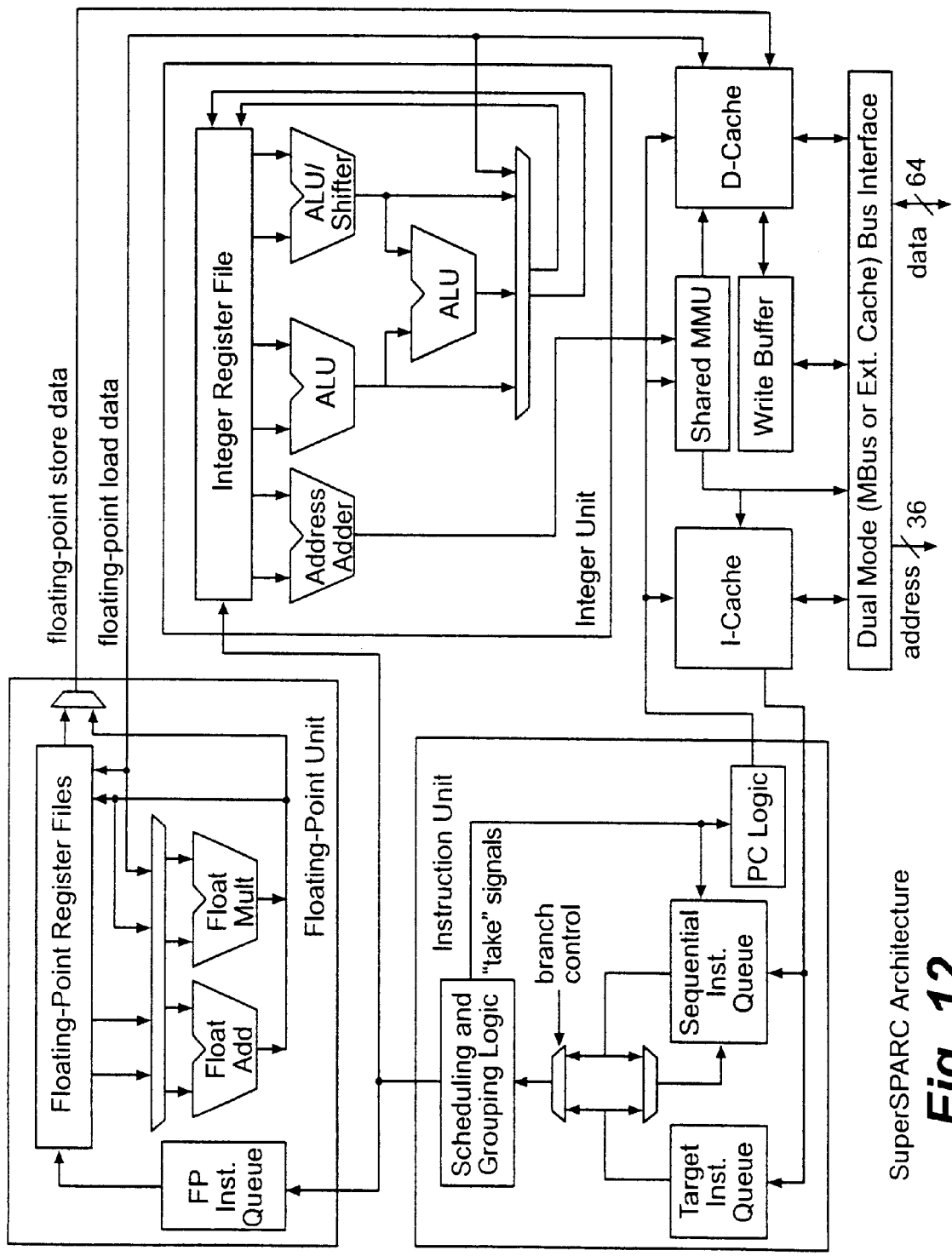
FIG. 12 is a diagram of the SuperSPARC architecture.

The SUPERSPARC processor from Texas Instruments, Inc. is the first commercial superscalar implementation of the SPARC version 8 architecture (Sum Microsystems Computer Corporation, *The SUPERSPARC Microprocessor-Technical White Paper*, 1992). A virtually identical version from Ross Technology, Inc. and Cypress Semiconductor Corporation is called the HYPERSPARC (Trademark of Ross Technology, Inc. and Cypress Semiconductor Corporation). FIG. 12 shows the SUPERSPARC architecture which primarily consists of three functional units: an instruction unit, integer unit, and floating-point unit. There are also a 20-Kbyte I-cache that fetches four instructions per cycle, and a 16-Kbyte D-cache that can handle one 64-bit load or store per cycle. These on-chip caches can interact with the MBus or a second-level cache controller that supports up to 1-Mbyte of external cache.

The instruction unit is responsible for instruction fetch, decode, issue, and branch execution. It fetches four instructions from the I-cache to either the 8-entry sequential instruction queue (for sequential or untaken branch path) or the 4-entry target instruction queue (for taken branch path) (see F. Abu-Nofal, et al., "A Three-Million-Transistor Microprocessor," *Digest of Technical Papers of the 1992 IEEE International Solid-State Circuits Conference*, pp. 108–109, 1992) The SUPERSPARC always predicts all branches are taken (see Sun Microsystems Computer Corporation, 1992), and fetches instructions in the branch-target path with one-cycle branch delay (to calculate the target address). The selected instruction queue is essentially a central instruction window with in-order issue. Three oldest/bottom instructions from the selected instruction queue are presented to the scheduling and grouping logic block, where: (a) opcodes are decoded, (b) instruction grouping is determined, (c) intergroup data dependencies are checked, (d) resources are allocated, and (e) bypassing is controlled. Not all three candidate instructions can be issued. There are some grouping restrictions (a total of 23 rules) such as (G. Blanck ans S. Krueger, "The SUPERSPARC Microprocessor," *Proceedings of the 37th COMPCON*, pp. 136–142, 1992):

Maximum of two integer results,
Maximum of one shift instruction,
Maximum of one floating-point arithmetic instruction,
Maximum of one control transfer (branch) instruction,
Certain "hard" instructions (e.g., subroutine save/restore, integer multiply/divide, control-register update) are issued as a single-instruction group exclusively.

Instructions are never issued out of order. Thus if the third instruction is issued then so are the first and second instructions. Remaining instruction(s) that cannot issue are recirculated to the sequential instruction queue.

The integer unit executes all integer arithmetic instructions (except integer multiply and divide) and load/store address calculations. A virtual address adder and two RF read ports are dedicated to load/store address calculations. Three ALUs are dedicated to arithmetic instructions. The shift instructions can only execute at the first-level ALU with shifter. The second-level ALU is provided for "cascaded" arithmetic operations, to allow back-to-back dependent integer instructions within an instruction group.

The floating-point unit provides a 4-entry floating-point instruction queue, 5-port floating-point register file, floating-point adder, and floating-point multiplier. A floating-point instruction is issued from the bottom (oldest entry) of the instruction queue when the operands and resources are available. All floating-point instructions start in order and complete in order (see Sun Microsystems Computer Corporation, 1992). The floating-point adder performs addition, subtraction, format conversion, comparison, absolute value, and negation. The floating-point multiplier performs single- and double-precision multiplication, division, square root, and integer multiplication and division. Bypassing capabilities from the result buses and load bus to arithmetic units are provided. The latency of most floating-point operations is three cycles.

The SUPERSPARC processor is implemented using a 0.8 $\mu$m, three-metal BiCMOS process. It integrates 3.1 million transistors and currently runs at 50 MHz. The pipeline is implemented based on a two-phase, non-overlapping clocking scheme. Instruction processing consists of eight pipeline stages/phases: two phases of instruction fetch (F0, F1), three phases of decode (D0, D1, D2), two phases of execution (E0, E1), and a writeback phase (WB). The top benchmark performance figures are: SPECint92 68 and SPECfp92 85.

The SUPERSPARC processor supports five superscalar features; multi-instruction issue, decoupled dataf low scheduling, speculative execution, out-of-order execution, and precise interrupts. Speculative execution is handled by holding a speculative result at the end of the pipeline before being written to the register file (until the conditional branch is resolved). If mispredicted, all instructions and results currently in processing pipelines are flushed. The multiple-path fetching into the sequential and target queues helps reduce the branch misprediction penalty. The SUPERSPARC architecture is still somewhat limited in its superscalar capabilities: (1) The multi-instruction issue has a lot of restrictions/rules, and is limited to three instructions despite the four-instruction fetch. Output dependencies also stall instruction issue because register renaming is not supported.

(2) Only single-level speculative execution is supported because of the lack of a result buffer.

(3) Only limited out-of-order execution is supported; no load bypassing, and strictly in-order issue with the possibility of out-of-order completion of floating-point instructions from the floating-point queue with respect integer instructions.

DEC ALPHA 21064

Figure 13:
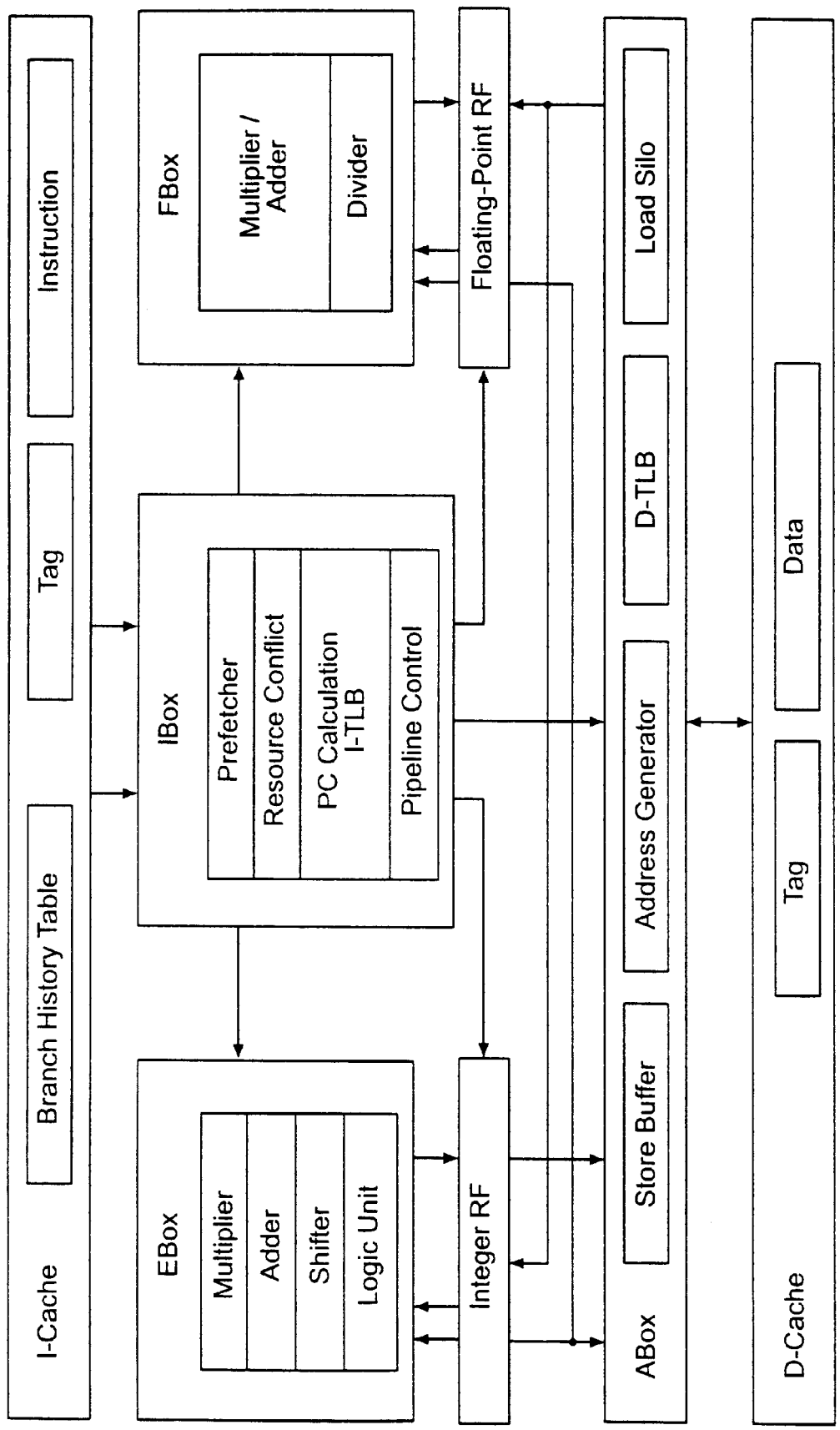
FIG. 13 is a diagram of the DEC Alpha 21064 architecture.

The DEC ALPHA 21064 processor is the first implementation of Digital Equipment Corporation's 64-bit ALPHA AXP architecture (see E. McLellan (Digital Equipment Corporation), "The APLHA AXP Architecture and 21064 Processor," *IEEE Micro*, pp. 36–47, 1993). It is currently the fastest single-chip microprocessor in the industry. The architecture is a combination of superpipelined and superscalar architectures. The integer and floating-point pipelines are seven- and ten-stages deep, respectively. Since DEC has an existing, large customer base of software, it offers compatibility with VAX and MIPS codes through binary translation. Executable program codes are converted to AXP code without recompilation (with some performance degradation). FIG. 13 shows the DEC ALPHA 21064 architecture, which has four functional units: an instruction unit (IBox), an integer unit (EBox), a floating-point unit (FBox), and an address unit (ABox). There are also 32 entry by 64-bit integer and floating-point register files (RFs), 8-Kbyte D-cache, and 8-Kbyte I-cache with a 2 K by 1-bit branch history table. The branch history table is provided for dynamic prediction and achieves 80% accuracy on most programs. Static prediction is also supported based on the sign of the branch address displacement field as the default; backward branches are predicted taken and forward branches are predicted not-taken.

The IBox fetches a pair of instructions from the on-chip I-Cache, decodes them, and issues up to two instructions that pass all register conflict checking. Branch instructions are also executed in this unit. The virtual branch target address is translated to its physical address, which is simply accessed from the I-TLB (instruction translation look-aside buffer). The DEC ALPHA 21064 restricts the instruction pairs that can be issued simultaneously, because of the limited RF ports and instruction issue buses. If an instruction pair cannot dual issue, either the pair is swapped with another pair capable of dual issue, or the pair is serialized, issuing one instruction at a time in order. Although it is not mentioned in McLellan, it is interpreted that pair swapping and serialization operations require some kind of shelving of fetched instructions into a prefetch buffer (central instruction window). Based on the rules shown below, the IBox determines which instruction pairs can dual issue.

| Valid Dual Issue: | |
| --- | --- |
| Instruction A | Instruction B |
| integer operate | floating-point operate |
| integer/floating-point load | integer/floating-point operate/branch |
| integer store | integer operate |
| integer store | floating-point branch |
| floating-point store | floating-point operate |
| floating-point store | integer branch |
| integer branch | integer operate |
| floating-point branch | floating-point operate |

Note that a branch instruction is formatted as an integer (floating-point) instruction if its condition code is in an integer (floating-point) register. The DEC ALPHA 21064 avoids condition codes, special registers, or any other single copy of a resource which can potentially become a point of contention in a multi-instruction issue environment. Compare instructions write directly to any general-purpose register (integer or floating-point, depending on the compare operation type).

The EBox contains dedicated integer multiplier, adder, shifter, and logic units. The multiplier unit is not pipelined to save silicon area. The adder and logic units have single-cycle latency with bypass paths for register write data. The shifter takes two cycles to produce results, but is fully pipelined (one-cycle throughput). The FBox contains dedicated floating-point multiplier/adder and divider units. It supports both VAX- and IEEE-standard data types and rounding modes. The divider unit generates one bit of quotient per cycle. All other floating-point operate instructions have six-cycle latency and one-cycle throughput.

The ABox performs all load and store instructions. It has a dedicated displacement adder to compute load/store addresses independently from the IBox. A 4-entry×32-byte store buffer is provided for load bypassing and merging of data from adjacent stores to increase effective bandwidth. A memory barrier instruction is provided to disable load bypassing when necessary. The ABox also contains a 32-entry data TLB to translate the virtual load/store address to its physical address, and 3-entry load silo to buffer outstanding load misses. With a hit at the primary D-cache, the latency of a load is three cycles.

Figure 14:
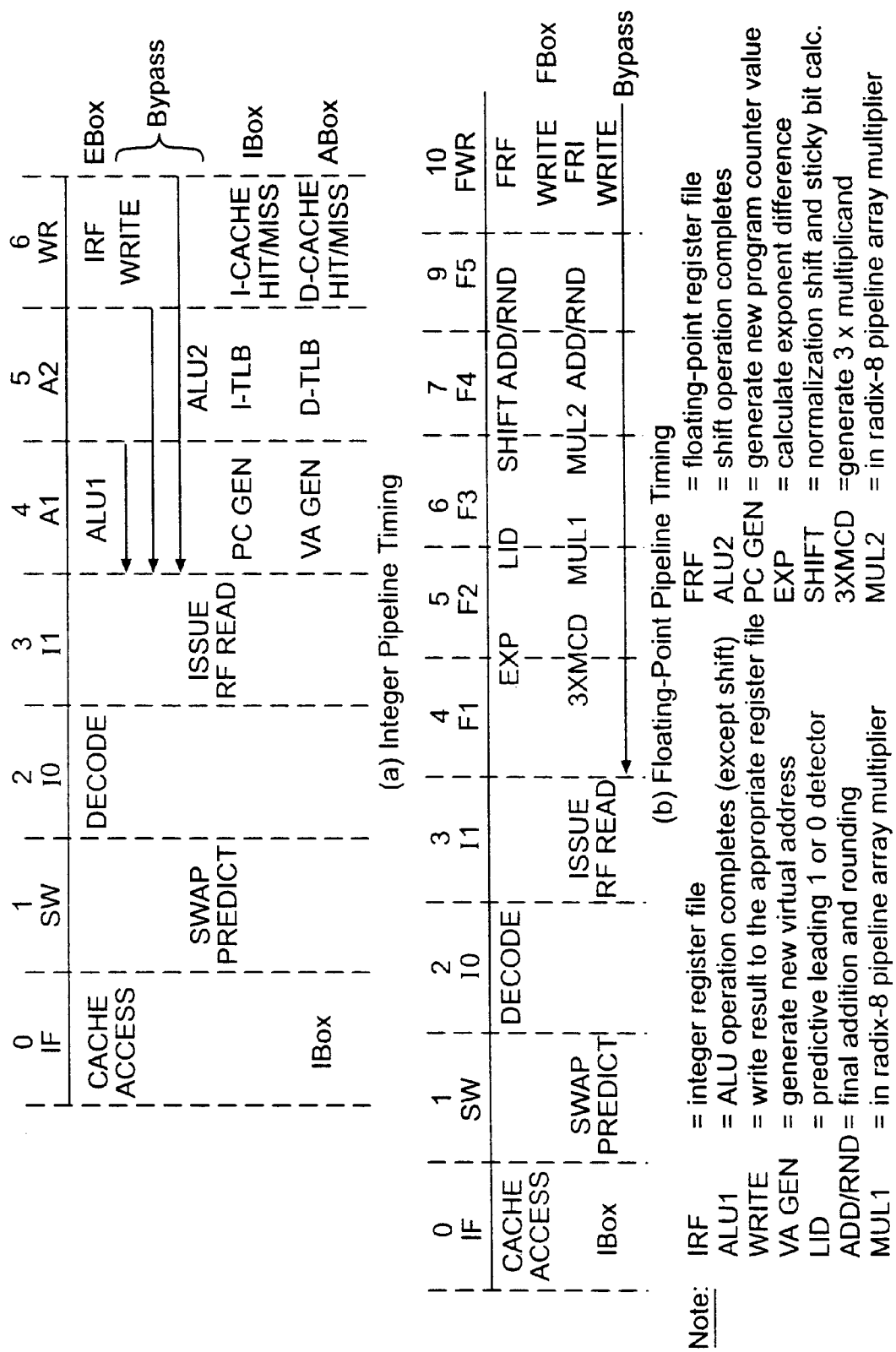
FIG. 14 shows the DECchip 21064 pipeline stages.

FIG. 14 shows the pipeline stages of the DEC ALPHA 21064 processor for integer and floating-point instructions. Up to two instructions can be processed in each stage. The first three stages (IF, SW, I0) can be stalled, while stages beyond I0 advance every cycle (see D. W. Dobberpuhl, et al., "A 200-MHz 64-Bit Dual-Issue CMOS Microprocessor," *Digital Technical Journal*, Vol. 4, No. 4, Special Issue, pp. 35–50, 1992). In stage IF, a pair of instructions is fetched from the on-chip I-cache. In stage SW, a swap or serialization operation is performed based on the dual-issue rules. If there is a conditional branch instruction, the branch direction is predicted statically or dynamically (using the branch history table). In stage I0, instruction(s) are decoded and checked for dependencies between the two fetched instructions (if any). In stage I1, instruction(s) are issued to the appropriate functional unit, provided there is no register conflict. The source operands are read from the integer and/or floating-point RFs and sent to the EBox, IBox, ABox, and FBox. In stage 4, instruction executions start (stage A1 for integer instructions, stage F1 for floating-point instructions).

FIG. 14(a) shows that all integer arithmetic and logic instructions (EBox), except shift instructions, have one-cycle latency, through bypass paths. Shift instructions have two-cycle latency. All results in EBox are actually written back to the integer RF in stage 6. Without the bypass path, the latency would be three cycles. But with the bypass path, the latency is reduced to one or two cycles. This improves the probability that back-to-back dependent instructions execute at full pipeline speed. The DECchip 21064 dedicates 45 different bypass paths. Conditional branch instructions (IBox) are resolved in stage 4. If a branch misprediction is detected, a branch repair is initiated. Instructions subsequent to the branch (in the wrong path) and their intermediate results are flushed from all pipeline stages. The alternate branch target address is computed as the new PC. The first instruction pair of the correct branch path is fetched at stage 6. This branch misprediction causes a four-cycle delay.

Primary, on-chip D-cache accesses of load and store instructions (ABox) complete in stage 6. So, the latency of loads and stores is three cycles. FIG. 14(b) shows that results of floating-point operations (from the multiplier/adder unit) are written back to the floating-point RF in stage 9, thus giving a 6-cycle latency. The ALPHA AXP architecture has several notable characteristics:

Design Simplicity:
  The architecture avoids direct hardware support of features that are seldom used or prone to limit performance due to cycle-time restrictions. For example, it omits support for direct-byte load/store instructions and precise arithmetic exceptions. Some functionality sacrifices have to be made to get a very high processor clock frequency. Full functionality is achieved through software assistance.

Privilege Architecture Library (PAL):
  The architecture supports multiple operating system (O/S) ports (currently OpenVMS, 64-bit Unix DEC OSF/1, Microsoft WINDOWS NT (Trademark of Microsoft Corporation)) using a set of privileged software subroutines, the PALcode. The PLACODE routines are written by the O/S programmer and can be completely customized since they use a superset of the AXP instruction set. They can implement lowest-level hardware-related tasks unique to a particular O/S, such as interrupts, exceptions, context switching, memory management, etc. The PALcode routines are invoked by hardware traps or explicit CALL_PAL instructions.

Conditional Move Instructions:
  The AXP instruction set includes conditional move instructions for both integer and floating-point data. These instructions should help remove some conditional branches (see section below entitled Condition Move Transformation).

Imprecise Interrupts:
  Precise exceptions are not supported. A user must use the trap barrier instruction when precise interrupt behavior is necessary. In this case, the performance is sacrificed.

The DEC ALPHA 21064 single-chip processor is implemented using a 0.75 $\mu$m, three-metal CMOS process, with operating speeds up to 200 MHz. The extremely high clock frequency presents a difficult clocking situation. To avoid race conditions for latched data, the clock edge rate must be extremely fast (0.5 ns) and only very little clock skew can be tolerated. DEC's solution is to implement a very large, on-chip clock driver with a final stage containing 156 to 172-mil-wide PMOS and 63 to 78-mil-wide NMOS devices (see McLellan). The clock driver occupies about 5% of the total chip area and draws a peak switching current of 43 A. A 0.13-$\mu$F on-chip decoupling capacitance must be added to overcome the supply voltage problem. The chip's power dissipation is 30 W at 200 MHz with a 3.3-V supply. Sophisticated packaging is used to cool the chip. These hardware cost and implementation problems are compensated by top performance. The benchmark performance figures on the top-of-the-line system, the DEC 10000/610 (200 MHz), are: SPECint92 116.5, SPECfp92 193.6, and 40.5 MFLOPS on 100×100 Linpack (double precision).

The DECchip 21064 processor supports three superscalar features; multi-instruction issue (dual issue), decoupled dataflow scheduling, and limited out-of-order execution (by load bypassing and pair swapping for dual issue). The load bypassing permits out-of-order execution between loads and stores. The pair swapping selects the two oldest instructions capable of dual issue, resulting in out-of-order issue. The DEC ALPHA 21064 does not push the superscalar design aggressively since the main goal is to achieve very high clock frequency. Some of the restrictions are:

(1) Only two instructions are fetched per cycle, which are issued with some pairing restrictions. DEC has just tackled this problem by having a quad-issue on its next generation ALPHA 21164.

(2) Register renaming is not supported which inhibits implementation of full out-of-order execution. Anti and output dependencies will stall instruction issue.

(3) No speculative execution is supported due to the lack of a result buffer. A conditional branch must be resolved at stage 4 before the predicted path can proceed further into the execution pipeline. An unresolved conditional branch will stall the decode and issue pipelines.

(4) Precise interrupts are not supported in hardware. The software solution complicates debugging and slows down the processor significantly.

HP PA-7100

The HP PA-7100 processor is the seventh implementation of Hewlett-Packard's PA-RISC (precision architecture, reduced instruction set computer—Trademark of Hewlett-Packard, Inc.) architecture (T. Asprey, et al. (Hewlett-Packard), "Performance Features of the PA-7100 Microprocessor," IEEE Micro, pp. 22–35, 1993). It is the first superscalar PA-RISC design, which issues up to two instructions per cycle. Its design also has a VLIW flavor. There are two notable design approaches in the PA-RISC architecture; (a) the use of off-chip, rather than on-chip, primary caches (I-cache and D-cache), and (b) the reduction of instruction count in programs (pathlength reduction—see R. Lee, et al., "Pathlength Reduction Features in the PA-RISC Architecture," *Proceedings of the 37th COMPCON*, pp. 129–135, 1992) by adding VLIW-like and SIMD-like instructions. The motivation to use off-chip caches is the fact that on-chip caches are usually not large enough to achieve balanced performance across a wide range of applications. Typically, on-chip I-caches range from 8 to 20 Kbytes, and on-chip D-caches range from 8 to 16 Kbytes. The PA-7100 processor can have up to 1 Mbyte I-cache and 2 Mbyte D-cache. Unlike most processors with small on-chip caches, a secondary cache becomes unnecessary. Another advantage is the flexibility of cache size and speed to configure different systems, from low-end to high-end systems.

The objective of pathlength reduction is to resolve the key disadvantage of RISC architectures, the code/pathlength expansion. There are two instruction types added to the RISC instruction set. First, two or three operations that frequently occur together are combined into a fixed-length, 32-bit instruction. This results in multi-operation, VLIW-like instructions (except they are contained within a short 32-bit instruction), such as Shift&Add (perform integer multiplications with a small constant), Multiply&Add (floating-point), Compare&Branch, Add&Branch, Branch_on_Bit, etc (see Lee, et al.). Other streamlined RISC architectures such as MIPS require multiple instructions to perform these tasks. Second, SIMD-like instructions are added to operate, in parallel, on multiple data units smaller than a 32-bit word. These instructions are particularly useful in parallel character and decimal operations. For example, in the C language, character manipulations frequently involve finding the null byte (zero) that marks the end of a variable-length string of characters. PA-RISC's Unit_Exclusive_Or instruction speeds this process by testing a "no byte zero" in a word of four bytes in a single cycle (see Lee, et al.). The addition of the two instruction types is accommodated in the hardware without impacting the cycle time or the CPI. This gives the PA-RISC architecture some of the advantages of a very simple VLIW architecture (with short 32-bit instructions), without losing the advantages of a RISC architecture.

Figure 15:
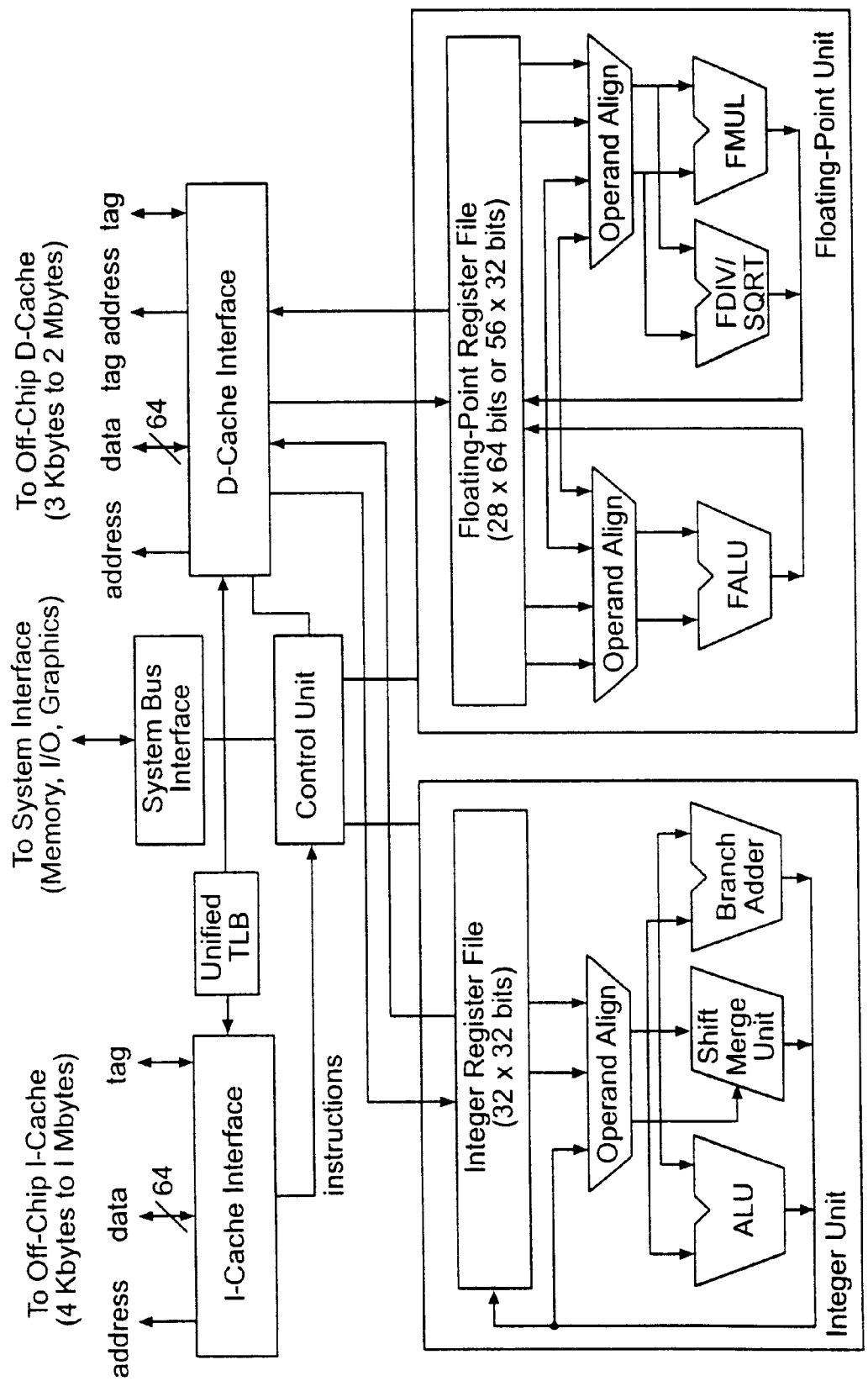
FIG. 15 shows the HP PA-7100 architecture.

FIG. 15 shows the PA-7100 architecture. The processor chip consists of six major blocks; the integer unit, floating-point unit, cache control/interface, unified TLB, control unit, and system bus interface. The control unit is responsible for fetching, decoding, and issuing of instructions. Two instructions are fetched from the off-chip I-cache per cycle, and buffered in a small prefetch buffer (central window). The control unit can issue up to two instructions per cycle, one to the integer unit and one to the floating-point unit. There are no alignment or order constraints on the pair of instructions (see E. DeLano, et al., "A High Speed Superscalar PA-RISC Processor," *Proceedings of the 37th COMPCON*, pp. 116–121, 1992). However, no two integer or floating-point instructions can be issued simultaneously. If a conditional branch instruction is encountered, a simple static branch prediction scheme is used to minimize branch penalty. All forward conditional branches are untaken and backward conditional branches are taken.

The integer unit contains an ALU, shift-merge unit (SMU), dedicated branch adder, and a 32×32-bit, general-purpose, integer register file. Besides integer arithmetic instructions, the integer unit also executes branch instructions, loads and stores of integer and floating-point registers, and all VLIW-like and SIMD-like instructions, except the floating-point Multiply&Add and Multiply&Subtract. The VLIW-like instructions improve the utilization of the three hardware units. For example, the Add&Branch uses the ALU and the branch adder simultaneously, while the Branch_on_Bit uses the SMU and the branch adder (see Lee, et al.). The register bypass paths produce a one-cycle latency for integer arithmetic instructions.

The floating-point unit contains a floating-point ALU (FALU), multiplier (FMUL), divide/square root unit (FDIV/SQRT), and a 32×64-bit floating-point register file. Although there are 32 physical registers, the first four registers (0–3) are dedicated for status register and exception registers. The remaining 28 registers (4–31) are used as register operands for arithmetic operations. Each register can be access as a 64-bit double word or as two 32-bit single words. The FALU performs single- and double-precision add/subtract, compare/complement, and format conversion instructions. The FMUL performs single- and double-precision multiplications, and also 32-bit unsigned integer multiplications (64-bit result). The multiplier array is based on a radix-4 Booth encoding algorithm. The register bypass paths produce a two-cycle latency for all floating-point instructions performed in the FALU and FMUL. The FDIV/SQRT performs floating-point divide and square-root operations based on a modified radix-4 SRT (Sweeney, Robertson, and Tocher—see Asprey, et al.) algorithm. The main modification is running the radix-4 division hardware at twice the processor clock frequency to effectively achieve a radix-16 performance. Four quotient bits are computed each clock cycle, giving a latency of 8 and 15 cycles for single- and double-precision divide/square root operations. The floating-point register file has five read ports and three write ports to allow concurrent execution of a floating-point multiply, a floating-point add, and a floating-point load or store. This occurs when a Multiply&Add or a Multiply&Subtract instruction is issued concurrently with a floating-point load/store instruction (categorized as an integer instruction).

Figure 16:
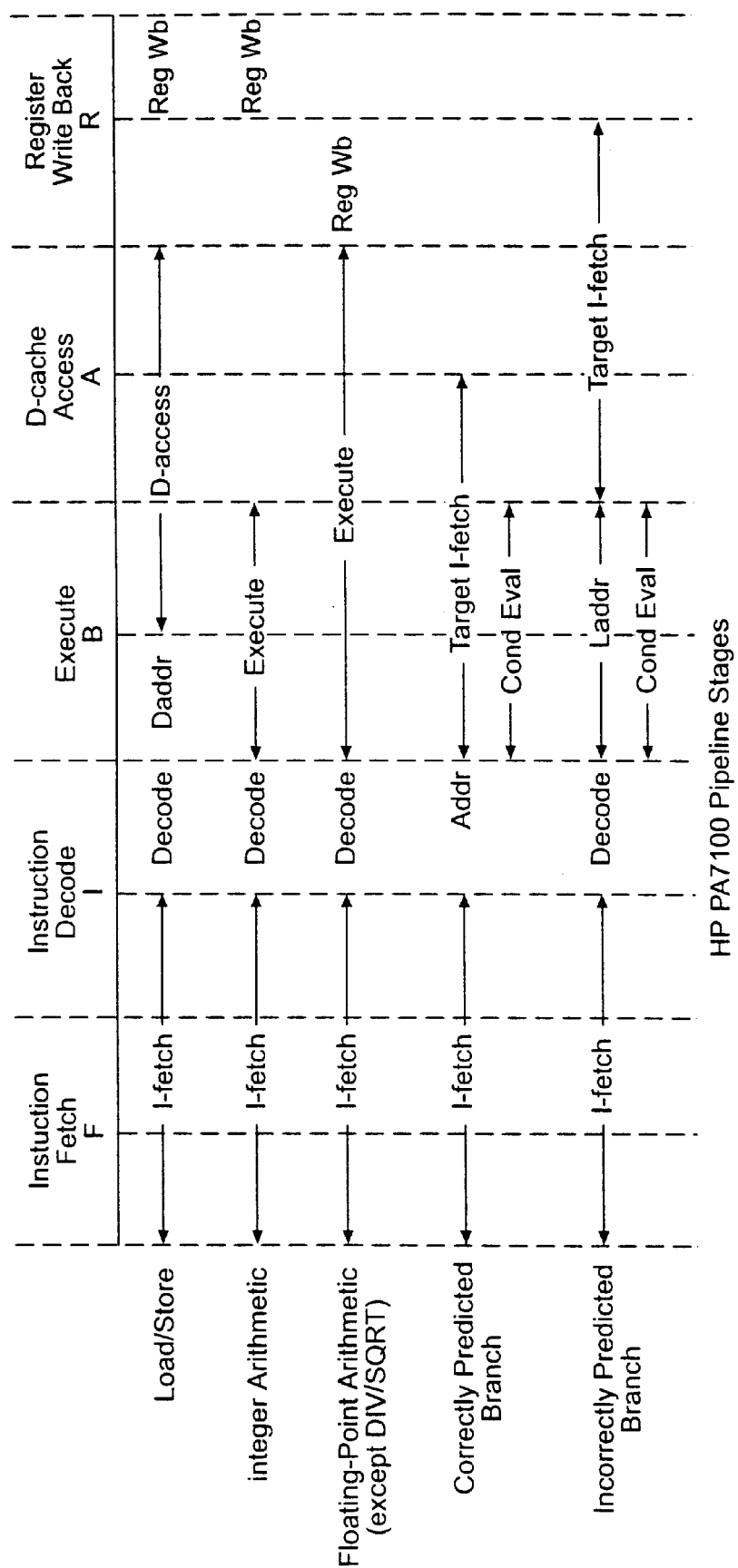
FIG. 16 shows the HP PA-7100 pipeline stages.

The instruction execution pipeline for various types of instructions is shown in FIG. 16. The pipeline frequency is determined by the read cycle time of the off-chip cache RAMs (see Asprey, et al.). Each pipeline stage is divided into two equal phases (2-phase clocking scheme). The first three phases are dedicated for instruction fetching from the off-chip I-cache. Instruction decode and issue can be done in a mere single phase because a pre-decoded bit is dedicated in the instruction-field format to steer instructions to the integer and floating-point units. The phases for instruction execution depend on the instruction type, as depicted in FIG. 16. For a conditional branch instruction, instructions along the predicted path are fetched (static branch prediction) while the branch condition is evaluated. In the meantime the alternate link address (Laddr) is also calculated. If at the end of the execute stage the branch is found to be mispredicted, the previous speculative instruction fetch is flushed and new instructions along the correct path are fetched. If the delay is viewed from the I-fetch to the Target I-fetch, the minimum branch delay of correctly and incorrectly predicted branches is one cycle and two cycles, respectively. The PA-7100 processor has extensive register bypass capability to minimize pipeline interlock penalties. As illustrated in FIG. 16, the penalty for integer ALU pipeline interlock is zero cycles. The penalty for load use, floating-point ALU, or floating-point multiply pipeline interlocks is one cycle.

The HP PA-7100 processor is implemented using a 0.8 $\mu$m, three-metal CMOS process. It operates at 100 MHz and integrates about 850,000 transistors. The use of off-chip caches results in a large pin-count package, 504-pin PGA. The reported benchmark performance figures on the top-of-the-line system, the HP9000/735 (99 MHz), are: SPECint92 80.0, SPECfp92 150.6, and 40.8 MFLOPS on 100×100 Linpack (double precision).

The HP PA-7100 processor supports four superscalar features; multi-instruction issue, decoupled dataflow scheduling, out-of-order execution, and precise interrupts. However, it does not support register renaming and speculative execution. Note that static branch prediction is only used for speculative prefetch, not speculative execution. Instructions following an unresolved conditional branch are stalled and not executed. The HP PA-7100 designers rely on aggressive VLIW-like software scheduling and chose not to push the superscalar hardware too aggressively:

(1) The multi-instruction issue is limited to dual issue of integer and floating-point instruction pairs. No two integer or floating-point instructions can be issued simultaneously. To increase machine parallelism, the VLIW-like and SIMD-like instructions are included, which increases the complexity of the compiler.

(2) The decoupled dataflow scheduling is limited by a small central window (prefetch buffer) that only issues instructions in order.

(3) The out-of-order execution is limited to in-order issue with the possibility of out-of-order completion.

Intel PENTIUM

The Intel PENTIUM microprocessor is the first superscalar implementation that runs the widely-used x86 CISC instruction set. The x86 instructions use only two operands and permit combinations of register and memory operands. Thus, unlike all other commercial superscalar processors, the PENTIUM processor is not a typical register-to-register, three-address machine. Despite the complexity of CISC instructions, many of which require microcode sequencing, the PENTIUM processor manages to differentiate the "simple" (RISC-like) instructions and executes them in superscalar mode (dual-instruction issue). However, complex instructions and almost all floating-point instructions must still run in scalar mode (single-instruction issue). The superscalar execution and architectural improvements in branch prediction, cache organization, and a fully-pipelined floating-point unit result in a substantial performance improvement over its predecessor, the i486 processor. When compared with an i486 processor with identical clock frequency, the PENTIUM processor is faster by factors of roughly two and five in integer and floating-point performance, respectively (D. Alpert and D. Avnon—Intel Corporation, "Architecture of the PENTIUM Microprocessor," IEEE Micro, pp. 11–21, 1993).

Figure 17:
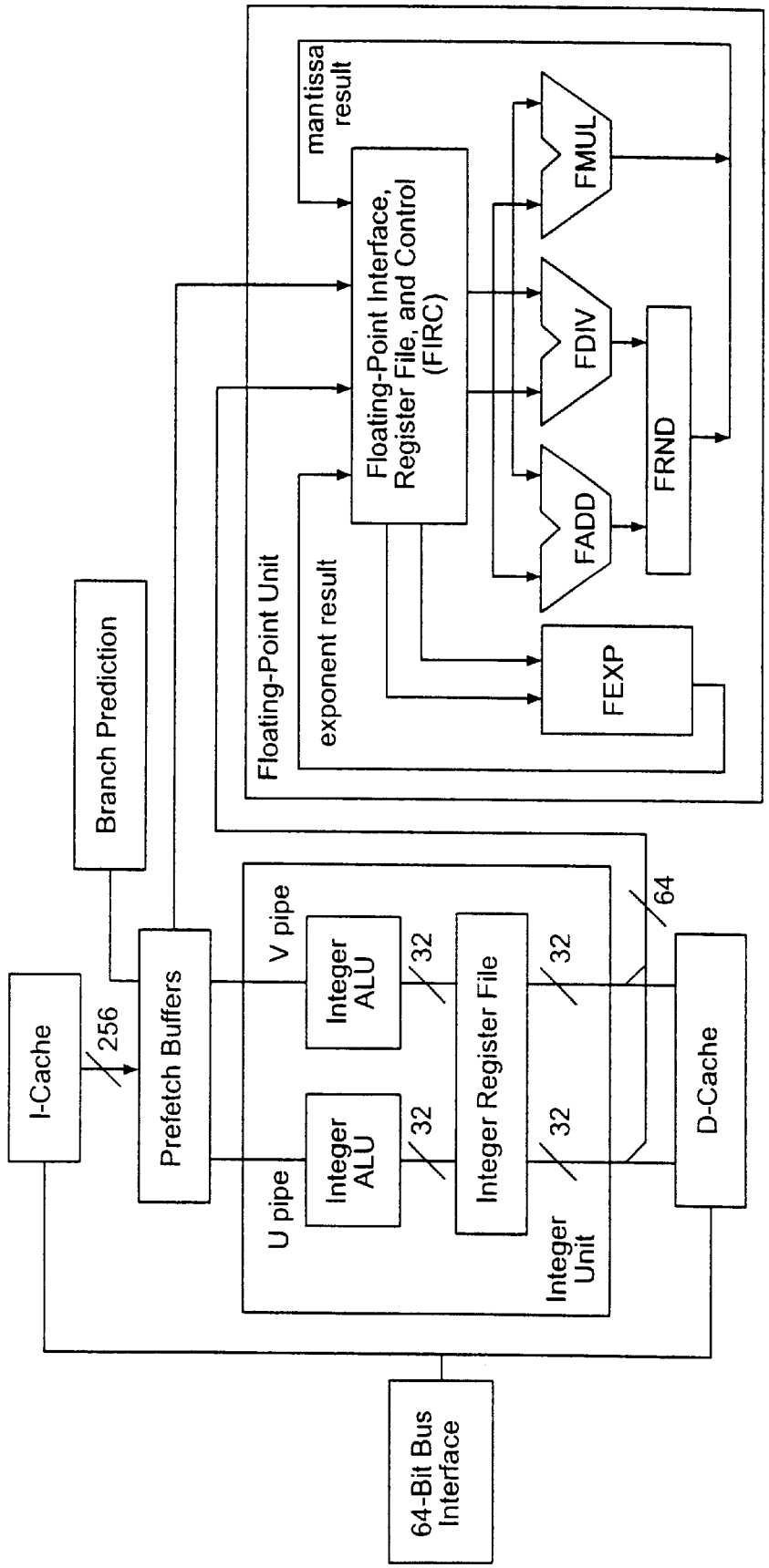
FIG. 17 shows the Intel Pentium architecture.

FIG. 17 shows the PENTIUM architecture. The core execution units are two integer ALUs and a floating-point unit with dedicated adder, multiplier, and divider. The prefetch buffers fetch a cache line (256 bits) from the I-cache and performs instruction aligning. Because x86 instructions are of variable length, the prefetch buffers hold two cache lines; the line containing the instruction being decoded and the next consecutive line (see Alpert and Avnon). An instruction is decoded and issued to the appropriate functional unit (integer or floating-point) based on the instruction type. Two instructions can be decoded and issued simultaneously if they are "simple" instructions (superscalar execution). Because x86 instructions typically generate more data memory references than RISC instructions, the D-cache supports dual accesses to provide additional bandwidth and simplify compiler instruction scheduling algorithms (see Alpert and Avnon).

The integer unit consists of two integer pipelines, the U pipe and V pipe. Two consecutive integer instructions I1 and I2 can be issued simultaneously to U pipe and V pipe, respectively, if: (a) I1 and I2 are from the class of "simple" instructions, (b) I1 is not a jump instruction, (c) destination of I1≠source of I2 (no data dependency), and (d) destination of I1≠destination of I2 (no output dependency). Otherwise, only I1 is issued to the U pipe. Note that an instruction issue is stalled on output dependency (artificial dependency) because the PENTIUM processor does not implement register renaming. However, the PENTIUM anti dependencies are of no concern since instructions are issued in order and operand reads occur in an earlier pipeline stage than result writes. The V pipe can execute ALU operation, memory reference, and jump instructions. The U pipe can execute an additional set that uses special hardware available only in the U pipe, such as the barrel shifter. The "simple" instruction class is limited to instructions that can be executed directly and do not require microcode sequencing. Intel's study shows that more than 90% of instructions executed in the integer SPEC benchmark suite (SPECint92) are "simple" (see Alpert and Avnon).

The PENTIUM processor employs dynamic branch prediction using a branch target buffer (BTB), which holds entries for 256 branches. When a conditional branch instruction is decoded, the processor searches the BTB to find if there is a history (taken or untaken) on the branch instruction. If the branch has untaken history or no history at all, then the processor continues to fetch and decode instructions along the sequential path. If there is a taken history, then the processor uses the target address in the BTB entry to fetch and decode instructions along the target path. The conditional branch is resolved early in the writeback stage. If the branch is mispredicted, the processor flushes the pipeline and resumes fetching along the correct path. The branch history in the BTB is updated. This speculative execution with the BTB allows the PENTIUM processor to execute correctly-predicted branches with no delay. Also, because a conditional branch is resolved after the execute stage, a conditional branch instruction in the V pipe can be paired with a compare instruction or other instruction in the U pipe that sets the condition flag.

The floating-point unit consists of six functional blocks: the floating-point interface, register file, and control (FIRC), the floating-point exponent (FEXP), the floating-point multiplier (FMUL), the floating-point adder (FADD), the floating-point divider (FDIV), and the floating-point rounder (FRND). The FIRC contains a floating-point register file, interface logic, and centralized control logic. The x86 floating-point instructions treat the register file as a stack of eight registers, with the top of the stack (TOS) acting as the accumulator. They typically use one source operand in memory and the TOS register as the other source operand as well as the destination register. In the case of 64-bit memory operands, both ports of the D-cache are used. To swap the content of the TOS register with another register, the FXCH instruction (non-arithmetic floating-point instruction) is used. The FIRC also issues floating-point arithmetic instructions to the appropriate arithmetic blocks. Non arithmetic floating-point instructions are executed within the FIRC itself. Floating-point instructions cannot be paired with any other integer or floating-point instructions, except FXCH instructions.

The FEXP calculates the exponent and sign results of all floating-point arithmetic instructions. The FADD executes floating-point add, subtract, compare, BCD (binary coded decimal), and format conversion instructions. The FMUL executes single-, double-, extended-precision (64-bit mantissa) floating-point multiplication and integer multiplication instructions. The FDIV executes floating-point divide, remainder, and square-root instructions. And, the FRND performs the rounding operation of results from FADD and FDIV. The floating-point unit also supports eight transcendental instructions such as sine (FSIN), cosine (FCOS), tangent (FPTAN), etc. through microcode sequences. These instructions primarily involve the FADD arithmetic block and sometimes other arithmetic blocks.

The PENTIUM processor is implemented using a 0.8 µm BiCMOS process. It integrates 3.1 million transistors and currently runs at 66 MHz. The integer pipeline consists of five stages: prefetch (PF), first decode (D1), second decode (D2), execute (E), and writeback (WB). The floating-point pipeline consists of eight stages, where the first three stages (FP, D1, and D2) are processed with the resources in the integer pipeline. The other floating-point stages are: operand fetch (E), first execute (X1), second execute (X2), write float (WF), and error reporting (ER). The reported benchmark performance figures of the PENTIUM processor are: SPECint92 64.5 and SPECfp92 56.9.

The PENTIUM processor supports five superscalar features; multi-instruction issue, decoupled dataflow scheduling, speculative execution, out-of-order execution, and precise interrupts (using the safe instruction recognition mechanism (see Alpert and Avnon). However, most of these features still have serious limitations which are supposed to be improved in the P6 and P7 designs:

(1) The multi-instruction issue is generally limited to two "simple" integer instructions with certain restrictions.

Output dependencies (artificial dependencies) stall instruction issue because register renaming is not supported. Floating-point instructions also cannot be paired with any other instructions, except occasionally with FXCH instructions (but FXCH may be considered as a useless or unnecessary instruction in true register-to-register architectures). The multiple floating-point arithmetic blocks (FADD, FMUL, FDIV) are underutilized by the limitation of one floating-point instruction per cycle.

(2) The decoupled dataflow scheduling becomes extra difficult and inefficient by the variable length of x86 instructions. Some allocated bits of entries in the instruction window (prefetch buffers) are seldom used and wasted.

(3) Only single-level speculative execution is supported because of the lack of a result buffer. An unresolved conditional branch instruction at the WB stage will stall the processor and inhibits further speculative execution. Adding a result buffer is not easy because an x86 instruction can have a memory source operand and destination. Memory-to-register, memory-to-memory, register-to-memory, and immediate-to-memory instructions are permitted. Unlike register identifiers, memory identifiers (addresses) are relatively long. The result buffer will require extra storage and wide comparators for long identifier bits.

(4) The out-of-order execution is limited to in-order issue with the possibility of out-of-order completion between instructions in the integer and floating-point pipelines. Load bypassing is also not supported.

Summary of Comarisons

Table 3 is a summary of existing commercial superscalar microprocessors (except the Thunder SPARC) discussed in previous sections. The integration, clock speed, SPEC benchmark performance, superscalar features supported, instruction and result shelving type, execution unit composition, instruction decoder size, instruction issue capability, branch prediction type, and notable characteristics of each microprocessor are described. "All six" superscalar features means multi-instruction issue, decoupled-dataflow scheduling, out-of-order execution, register renaming, speculative execution, and precise interrupts.

Table 4 is a summary of upcoming commercial superscalar microprocessors in 1995/1996. DEC continues to lead the pack with its new ALPHA 21164 design. The major architectural improvements from its ALPHA 21064 predecessor are quad-issue, additional integer and floating-point execution units (total 2 each), and the inclusion of a secondary cache on chip (see L. Gwennap, "Digital Leads the Pack with 21164," *Microprocessor Report*, Vol. 8, No. 12, pp. 1 and 6–10, Sep. 12, 1994). The last feature is the first in the history of microprocessors and makes the ALPHA 21164 the densest with 9.3 million transistors. Sun Microsystems' ULTRASPARC (Trademark of Sun Microsystems Computer Corporation) incorporates nine independent execution units, including dedicated graphics add and multiply units. The ULTRASPARC is the first implementation of the new 64-bit SPARC version 9 instruction-set architecture, which supports conditional move instructions. It also supports MPEG-2 graphics instructions in hardware to boost multimedia application performance. The IBM POWERPC 620 is the latest and currently fastest among other PowerPC models (601, 603, 604, 615). It uses reservation stations to shelve instructions at six execution units (see L. Gwennap, "620 Fills Out POWERPC Product Line," *Microprocessor Report*, Vol. 8, No. 14, pp. 12–17, Oct. 24, 1994). IBM put two entries for each execution unit with the exception at load/store unit (3 entries) and branch unit (4 entries). The MIPS Technologies' R10000, also known as T5, uses "decoupled architecture" (another term for decoupled dataflow scheduling) with a set of three central windows (16-entry queues) for memory, integer, and floating-point instructions (see L. Gwennap, MIPS R10000 Uses Decoupled Architecture," *Microprocessor Report*, Vol. 8, No. 14, pp. 17–22, Oct. 24, 1994). The R10000 uses a register-mapping table (also called rename buffer) to support register renaming. Both integer and floating-point units have 64, 64-bit physical registers that are mapped to 32 logical registers. To handle multi-level speculative execution (up to 4 conditional branches), the R10000 saves the mapping table in shadow registers when encountering a conditional branch. The HP PA-8000 is the first 64-bit PA-RISC architecture implementation (see L. Gwennap, "PA-8000 Combines Complexity and Speed," *Microprocessor Report*, Vol. 8, No. 15, pp. 1 and 6–9, Nov. 14, 1994). Like its predecessors (PA-7100, PA-7100), the PA-8000 will not have on-chip cache. PA-RISC is the only advanced, general-purpose microprocessor architecture that uses off-chip L1 cache. The AMD K5 is currently the fastest x86 processor, claimed to be at least 30% faster than the Intel PENTIUM at the same clock rate (on integer code—see M. Slater, "AMD's K5 Designed to Outrun PENTIUM," *Microprocessor Report*, Vol. 8, No. 14, pp. 1 and 6–11, 1994). Despite the CISC x86 instruction set, the architecture internally runs RISC instructions, called ROPs (RISC operations). To achieve this, x86 instructions are predecoded as they are fetched from memory to the I-cache. The predecoder adds five bits to each byte, causing an increase of about 50% at the I-cache array. The K5 applies all the superscalar techniques that Johnson believed to be the best, the reservation station for instruction shelving and the reorder buffer for result shelving (see Johnson, 1991).

TABLE 3

Comparisons of Commercial Superscalar Microprocessors

| | IBM RS/6000 | Metaflow THUNDER SPARC | TI SUPERSPARC | DEC ALPHA 21064 | HP PA-7100 | Intel PENTIUM |
|---|---|---|---|---|---|---|
| Integration | Multi-chip | Multi-chip | Single-chip | Single-chip | Multi-chip | Single-chip |
| Clock Speed | 62.5 MHz | 80 MHz (est) | 50 MHZ | 200 MHZ | 99 MHz | 66 MHz |
| SPECint92 | 61.7 | 200 (est) | 68 | 116.5 | 80.0 | 64.5 |
| SPECfp92 | 133.2 | 350 (est) | 85 | 193.6 | 150.6 | 56.9 |
| Superscalar Features | All six | All six | All six, except register renaming | Multi-inst. issue, decoupled dataflow sched., out-of-order exec. | All six, except register renaming and speculative execution. | All six, except register renaming |
| Instruction Shelving | FIFO I-buffers (central, dist. in FXU and FPU) | DCAFs (DRIS) (central, branch, floating-point) | Central win-dow and dist. win-dow (for FP inst.) | Central window (pre-fetch buf-fers) | Central window (prefetch buffers) | Central window (prefetch buffers) |
| Result Shelving | Reg.-mapping table in FPU | DCAFs | None | None | None | None |
| Independent Execution Units | 1 branch unit, 1 FX unit, 1 FP unit (MAF) | 1 branch unit, 3 ALUs, 1 FP add, 1 FP mult | 1 branch unit, 3 ALUs, 1 address add, 1 FP unit (add, mult) | 1 branch unit, 1 address unit, 1 integer unit, 1 FP unit (add, mult, div) | 1 integer unit (ALU, shift, branch add), 1 FP unit (mult, div/sqrt) | 2 ALUs, 1 FP unit (add, muit, div) |
| Decode Size | 4 instructions | 4 instructions | 4 instructions | 2 instructions | 2 instructions | 2 instructions |
| Max Issue | 1 FX or FP load/store inst., 1 FP arith. inst., 1 branch inst., 1 condition-register inst. | 1 branch inst., 2 integer inst., 1 load/store inst, 1 FP add/sub, 1 FP multiply | Triple issue with certain restrictions. | Dual issue of certain integer/floating-point operate, branch, and load/store. | Dual issue of integer and floating-point instructions. | Dual issue of "simple" instructions. |
| Branch Prediction | Static (con-stant pre-dicted-not-taken) | Dynamic | Static (always taken) | Static and dynamic | Static (BTFN) | Dynamic |
| Notes | • FP mult-add in 2 cycles.<br>• This | • Has the most complete dynamic hard- | • Multiple-path fetching into sequential | • Hybrid of superpipelined and superscal- | • Uses off-chip, primary caches for size | • Supports the widely-used x86 inst. set. |

TABLE 3-continued

Comparisons of Commercial Superscalar Microprocessors

| | IBM RS/6000 | Metaflow THUNDER SPARC | TI SUPERSPARC | DEC ALPHA 21064 | HP PA-7100 | Intel PENTIUM |
|---|---|---|---|---|---|---|
| | RS/6000 design is the foundation of follow-on single-chip versions (PowerPC 601, 603, 604, 620)<br>• Precise interrupts only in "synchronize" mode. | ware scheduler with full out-of-order issue.<br>• Low clock speed due to complex out-of-order issue.<br>• Thunder SPARC was a reborn of the unsuccessful Lightning SPARC. | and target inst. queues helps reduce branch misprediction penalty. | lar.<br>• True 64-bit architecture.<br>• Supports cond. move inst.<br>• Supports multiple O/S using PALcode.<br>• Imprecise interrupts. | and speed flexibility<br>• Supports VLIW-like and SIMD-like inst. for path-length reduction. | • The only superscalar processor that is not a register-to-register, 3-address machine.<br>• Inefficient inst. window due to variable - length x86 inst. |

TABLE 4

Comparisons of Upcoming Commercial Superscalar Microprocessors

| | DEC ALPRA 21164 | Sun Microsystems ULTRASPARC | IBM POWKRPC 620 | MIPS Technologies R10000 (T5) | HP PA-8000 | AMD KS |
|---|---|---|---|---|---|---|
| Integration | Single-chip | Single-chip | Single-chip | Single-chip | Multi-chip | Single-chip |
| Clock Speed | 300 MHZ | 167 MHz | 133 MHz | 200 MHZ | n/a | n/a |
| SPECint92 | 330 | 275 (est) | 225 (est) | 300 (est) | n/a | n/a |
| SPECfp92 | 500 | 305 (est) | 300 (est) | 600 (est) | n/a | n/a |
| Superscalar Features | Multi-inst. issue, de-coupled da-taflow sched., out-of-order exec. | All six, except register renaming | All six | All six | All six | All six |
| Instruction Shelving | Central window pre-fetch buffers) | Central window and dist. window (for FP inst.) | Reservation Stations | Central/dist. window (memory, integer, FP queues) | Central window (56 entries) | Reservation Stations |
| Result Shelving | None | None | Rename buffers (reg. map table) | Register-mapping table | Rename buf-fer | Reorder buffer |
| Independent Execution Units | 1 branch unit, 1 address unit (load/store), 2 integer units, 2 FP add/div, 1 FP mult | 1 branch unit, 1 address unit, 2 ALUs, 1 FP add, 1 FP mult, 1 FP div/sqrt, 1 graphics add, 1 graphics mult | 1 branch unit, 1 address unit, 2 ALUs, 1 complex integer unit, 1 FP unit | 1 branch unit, 1 address unit, 2 ALUs, 1 FP add, 1 FP mult/div/sqrt | 1 branch unit, 2 address units, 2 ALUs, 2 FPUs (MAC /div/sqrt) | 1 branch unit, 2 ALUs, 2 load/store, 1 FPU |
| Decode Size | 4 instructions | 4 instructions | 4 instructions | 4 instructions | 4 instruction | 4 instructions |
| Max Issue | Quad issue of 2 integer and 2 | Quad issue | 6 (w/ dist. windows, each exec. | 6 instructions (1 instruction from | 4 instructions (2 to address unit, 2 to | 6 ROP instructions (1 inst from each |

TABLE 4-continued

Comparisons of Upcoming Commercial Superscalar Microprocessors

| | DEC ALPRA 21164 | Sun Microsystems ULTRASPARC | IBM POWKRPC 620 | MIPS Technologies R10000 (T5) | HP PA-8000 | AMD KS |
|---|---|---|---|---|---|---|
| | floating-point instructions | | unit can issue an inst. | each execution unit) | ALUs/ FPUs) | execution unit) |
| Branch Prediction | Static and dynamic | Dynamic | Dynamic | Dynamic | Dynamic | Dynamic |
| Notes | • Towering manufactur-ing cost ($430) leads to an expensive initial price of $2,937 (9/12/94) • Most dense microprocessor to date at 9.3M transistors | • Include a special purpose graphics unit that supports MPEG-2 instructions • First 64-bit V9 instruction-set architecture implementation | • Based on SPECint92, the 620 design does not improve much from 604, particularly if the 604 reaches 133 MHz also. Key advan-tage of 620 is its higher mem-ory band-width. | • Has a "resume" cache to hold sequential alternate-path instructions in case of branch mis-prediction • Handles 4-level speculative execution | • First 64-bit PA-RISC archi-tecture im-plementa-tion • Like its predeces-sors, no on-chip cache, off-setting penalty by having large off-chip L1 cache | • Claimed to deliver at least 30% faster than PEN-TIUM at the same clock rate (on integer code) • On the average 16-bit x86 code produces 1.9 ROPs/ inst., 32-bit x86 code pro-duces 1.3 ROPs/inst. |

Motivation for the Invention

Figure 18:
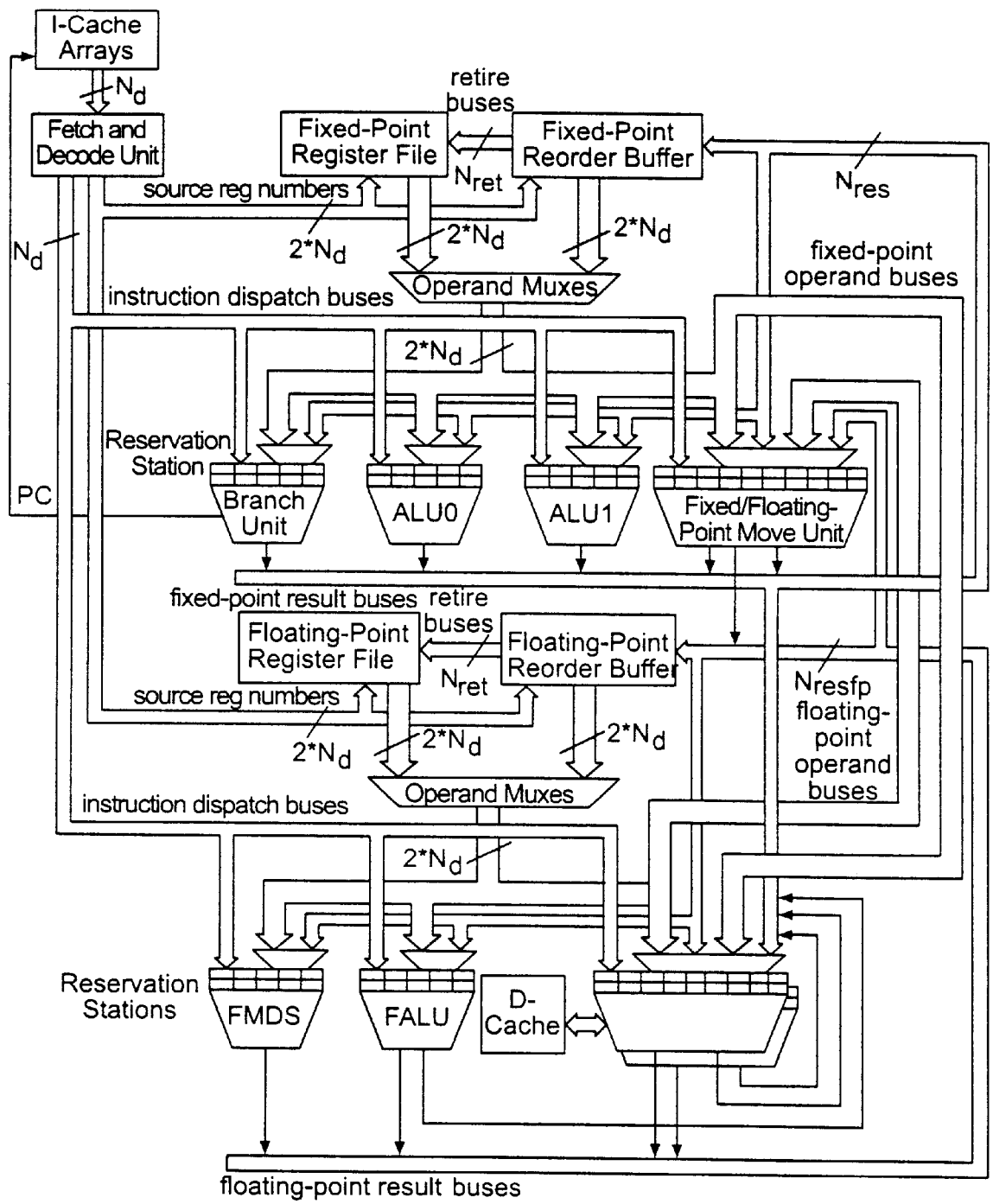
FIG. 18 is a diagram of a superscalar processor with reorder buffer and reservation stations.

The primary objective of the invention is to find a better design alternative to the reorder buffer (considered the most complete, known result shelving technique) and the reservation station (considered the best known instruction shelving technique to give maximum machine parallelism) techniques. Before pointing out to the drawbacks in the two best, existing techniques in result and instruction shelving, let us understand fully how the two operate in a superscalar processor. FIG. 18 illustrates how the RB and the RS techniques can be combined to fully support all six superscalar features.

Assume the processor has eight execution units: a branch unit, two fixed-point ALUs, a floating-point ALU, a floating-point multiply/divide/square-root unit, two load/store units, and a fixed/floating-point move unit. The processor begins by fetching at least one instruction or multiple instructions ($N_d$ instructions in this case, which is the decoder size) from the I-cache. It is to be understood that one or more memories or other storage units may be employed instead of the I-cache for performing the same function as the I-cache. These instructions are decoded in parallel and dispatched to their respective execution unit's reservation station. For each decoded instruction, an entry is allocated at the RB to shelve its result. To read its operand(s), each operand's register number is presented to the RB and register file, in which three situations can occur. First, if there is a matched entry in the RB and the register operand value has been calculated, then the operand value is routed/copied to the instruction's reservation station. Second, if there is a match entry in the RB but the value has not finished calculation, then the operand tag is copied instead to the reservation station. Third, if there is no match entry in the RB then the value from RF is the most recent one and copied to the reservation station.

During the issue/execute stage, one ready instruction (i.e., all of its operand values are available) is issued and executed immediately, even if it is out of order, and independent of other execution units' issues. If there are multiple ready instructions, one is chosen based on the arbitration protocol (aging, random, pseudo-random, small index, etc.).

During the writeback stage, the execution result is written to the RB (not RF) and also forwarded to any reservation station waiting for this result value. In every cycle, each valid reservation station with unavailable operand(s) compares its operand tag(s) with all result tags to determine when to grab certain result value(s). Note that if each execution unit's output port does not have a dedicated result bus ($N_{res}$<fixed-point output ports, or $N_{resfp}$<floating-point output ports), then arbitration logic must be provided to resolve who can use the shared result buses at a given time.

During the retire stage, the bottom entry at the RB FIFO is checked to see if the value can retire to the RF or not. An instruction's RB entry can only retire if: (a) the instruction completed execution without an exception error, (b) all preceding instructions also completed without exception, and (c) the instruction is not speculative (beyond an unresolved conditional branch). To keep up with the input rate at the fetch/decode stage, multiple entries ($N_{ret}$) must be retired, in order, from RB to RF.

Drawbacks in the Reorder Buffer Technique

The major implementation drawback in the RB technique is the slow and expensive prioritized associative lookup. During operand read in the decode stage, a register number is presented to the RB to find the most recent entry that matches the register number. However, the register number is not a unique associative key. Often there are multiple entries in the RB with the same register number, due to register re-uses (multiple updates to the same register of different instructions). In such a case, the associative lookup must be prioritized so that the most recent entry (of the most recent assignment) is selected from the RB and also from preceding instructions in the decode group that are currently in RB allocation ports (about to be written). If the RB is implemented as a circularly addressed register array, then the prioritizing circuit is complicated by the constant change of the head and tail pointer positions with the possibility of a wrap around. The extra delay incurred by the prioritizing logic will slow down operand reads.

Figure 19:
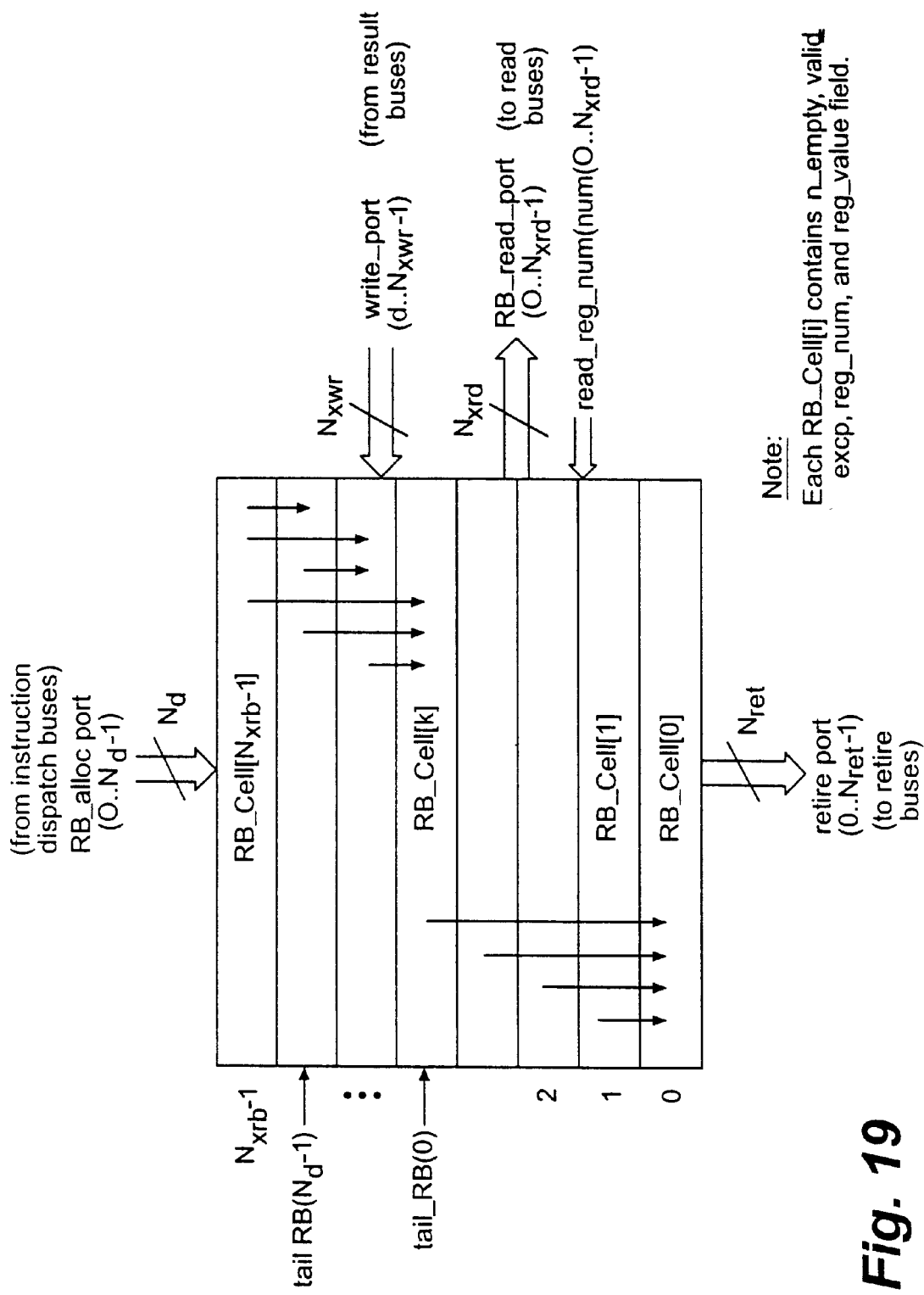
FIG. 19 depicts a reorder buffer (RB) implemented with true FIFO array.

The prioritizing circuit complexity can be reduced by constructing the RB as a true FIFO array. However, the FIFO array implementation has a penalty in supporting multi-entry retire. A FIFO typically shifts out one entry at time. With multiple-instruction fetch and decode, multiple RB entries in the FIFO must be deallocated/freed to keep up with the allocation rate and reduce decode stalls due to RB being full. To shift multiple entries at a time, two things can be done. First is to clock the shift-register array using a frequency that is $N_{ret}$ times the processor clock frequency. This is impractical because reads from and writes to the RB are very difficult and incur more propagation delay due to changing FIFO entry positions in a processor cycle. At the end the processor cycle time will just get longer. Second is to implement the FIFO as a barrel-shift register array with a variable number of shifts from 1 to $N_{ret}$, as shown in FIG. 19. Now each entry at position i must be able to mux in from any entry above it at positions i+1, i+2, . . . , i+$N_{ret}$ or the last FIFO array index. This barrel-shift register array implementation requires a substantial number of multiplexers.

Besides the prioritized associative lookup problem, the RB has two other drawbacks, the need to allocate dummy branch entries (entries without a result/register value) and the substantial use of shared global buses. To support multi-level speculative execution, a typical RB allocates a dummy RB entry for every decoded conditional branch instruction. This increases the usage of RB entries unnecessarily. The RB technique also requires that operand values to be distributed to all participating functional units, resulting in a large amount of global (chip-wide) wire traces that are heavily loaded. The result buses that carry result values to be written back to the RB also require shared-global wires that are heavily loaded with multiple driving sources, which are prone to transmission line noise problem. With the continuing shrinkage of transistor sizes, global wires are becoming more dominant in terms of silicon area consumption, propagation delay, and signal noise.

The complexity of RB circuit implementation is a proven fact. AMD found out in their superscalar 29 K processor (see B. Case, "AMD Unveils First Superscalar 29 K Core," *Microprocessor Report*, Vol. 8, No. 14, pp. 23–26, 1994), an "intellectual predecessor" to the K5, that a mere 10-entry RB plus its operand and result buses consumed a significant chip area, about the same as a 4-Kbyte cache, with the chip fabricated in an advanced 0.5-micron CMOS technology!

Drawbacks in the Reservation Station Technique

There are two major drawbacks in the RS concept; (1) operand value copying and (2) result forwarding. Both result in tremendous amounts of shared (heavy-loading), global (chip-wide) wires. With increasingly smaller transistor sizes, the dominant factors in determining silicon area and propagation delays is not the transistor, but metal wire, especially the ones that run across or all over the chip. Therefore, we should view the global wire as a precious item in designing a circuit, in particular if it is a shared line with many fanouts or loadings.

The wide operand buses required for operand value copying waste a lot of precious data bandwidth in the processor chip. Most of the time only a few of the total operand buses ($2*2*N_d*64$ global wires for a 64-bit architecture) are used. The DLX simulation results show a low bandwidth usage of less than 7% for the operand buses! The waste is due to several factors:

Many decoded instructions have only one register operand (arithmetic instructions with immediate value operand, loads, conditional branches, floating-point convert instructions), or worse, no register operands at all (jumps, traps).

When there is a branch-taken instruction (either predicted-taken conditional branch or unconditional jump) in the decode group, the subsequent instructions are invalidated, resulting in zero operand bus usage.

When a register operand value is not available at the RB (still being calculated), the operand bus only carries a small number of operand tag bits (e.g., a 6-bit tag in a 64-bit data bus uses only 9% of that bus bandwidth).

When the decode stage stalls, zero operand buses are used.

Besides the expensive global wire cost, result forwarding also requires complex circuitry. Each reservation station must have comparators to associatively match any tag in result buses, and wide multiplexers (64-bit, $[2*N_d+N_{res}]:1$ muxes) to receive operand values not only from operand buses, but also result buses.

Figure 20:
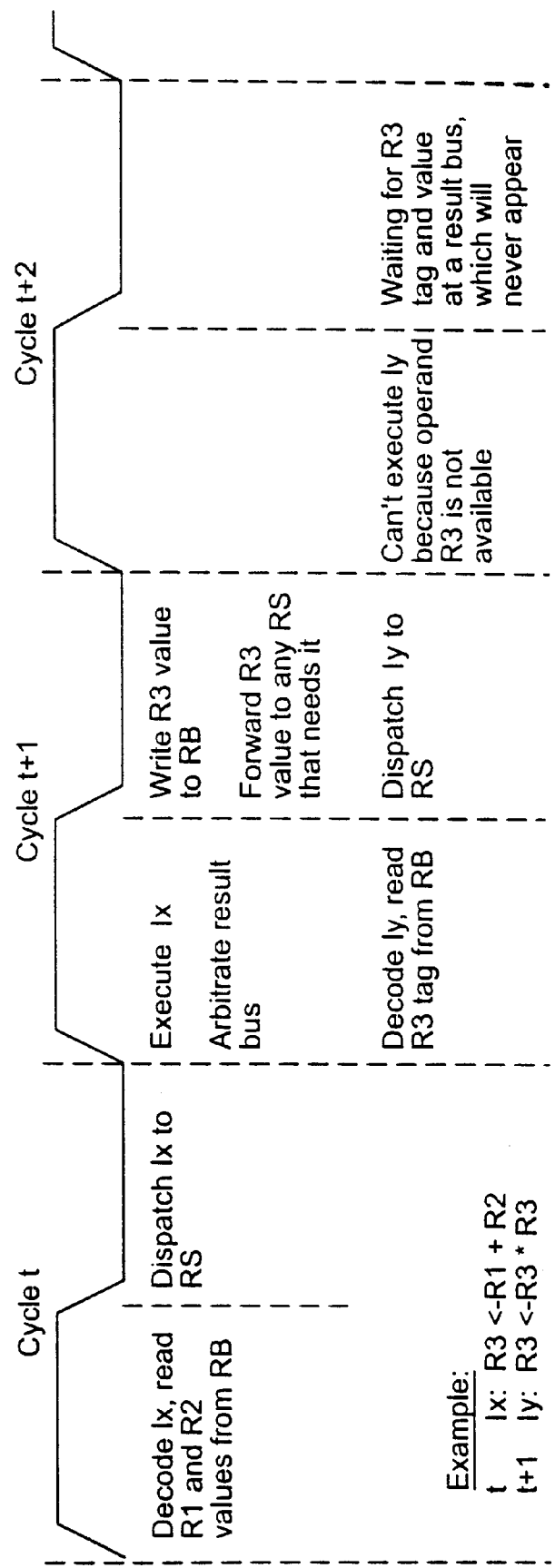
FIG. 20 shows a result-forwarding hazard.

Result value forwarding also requires a set of additional comparators (exactly $2*N_d*N_{res}+2*N_d*N_{resf}$ comparators) to avoid potential pipeline hazards in the forwarding logic (see Weiss and Smith, and Johnson, 1991). The hazard arises when a decoded instruction's operand tag matches with the result tag of a result value that will be forwarded at the same time the decoded instruction is dispatched to a reservation station. Had this hazard not been detected, the instruction will miss the forwarded result and stall in the RS for a long time until the tag has wrapped around, causing an incorrect operation. FIG. 20 illustrates what happens if this result-forwarding hazard is not detected. The example shows that instruction $I_x$ is decoded at cycle t, executed on the first half of cycle t+1, and its result is forwarded or appears at a result bus on the second half of cycle t+1. In the meantime, instruction $I_y$, which has a data dependency with $I_x$ on result R3, is decoded on the first half of cycle t+1 and dispatched to a RS with R3's tag on the second half of cycle t+1, not knowing that the R3 value is being forwarded at this time. At cycle t+2, $I_y$ tries to execute but its R3 operands are unavailable, hopelessly waiting for the missed R3 value to appear at one of the result buses. To overcome this result-forwarding hazard problem, we can simply stall the decode stage with some performance penalty, or provide a set of wide-bus multiplexers to allow operand value bypassing from the result buses. Under normal condition, a RS receives operand values from the register unit. When a result-forwarding hazard is detected, then the RS can receive the correct operand value directly from the corresponding result bus.

Proposed Solution to Drawbacks in the Reorder Buffer and Reservation Station Technicues The invention involves a design alternative that will solve the drawbacks in the reorder buffer and reservation station techniques.

The invention presents new or improved result shelving and instruction shelving techniques that maintain the good characteristics of reservation station and reorder buffer designs, but eliminate or reduce their major implementation disadvantages. By maintaining/improving the good characteristics in the new design, we can reasonably target a performance that is on par or better on a cycle-by-cycle basis (cycle count). By eliminating or reducing the implementation drawbacks we ensure that the hardware cost decreases (smaller circuit/die area) and the actual speed or performance of the processor increases (faster circuit leading to reduced cycle time or more operations done per cycle). However, care must taken not to propose a hardware simplification which could result in some penalty on the cycle count. Intelligent choices must be made to minimize the cycle count penalty such that it can be easily recovered through faster and more efficient circuit implementation.

The following sections describe the invention, the Modified Reorder Buffer (MRB) and the Distributed Instruction Queue (DIQ. An example of how the MRB and DIQ are used together in a superscalar processor is given below.

Modified Reorder Buffer (MRB)

Before the MRB technique is presented, the thinking process that led to the proposed MRB solution is described. Then the MRB circuit structure is explained. To support multi-level speculative execution without the need to enter dummy branch entries in the RB, a new small circuit, the Flush Address Queue (FAQ) is added and described.

Rationale for the MRB

The reorder buffer was originally proposed by Smith and Plezkun to handle precise interrupts in pipelined, scalar processors with out-of-order completion. Conceptually, the RB is a content-addressable, circular buffer with head and tail pointers. To use Smith and Plezkun's RB "as is" in superscalar processors will produce unreasonable hardware cost and seriously limit performance because of the "multiple-bypass check" (prioritized associative lookup) problem (see Smith and Pleszkun), the limited access ports (only 1 allocate port, 2 read ports, 1 write port, and 1 retire port) that impedes machine parallelism, and the inability to support speculative execution. This RB paper design was modified by Johnson to make it more suitable for superscalar processors (see Johnson, 1991), and later realized in the superscalar 29 K and AMD K5 processors (see Slater, Case). The modifications include: (a) providing multiple ports for allocate ($N_d$ ports), read ($2*N_d$ ports), write ($N_{res}$ ports) and retire ($N_{ret}$ ports), (b) allocating a dummy entry for every conditional branch instruction to support speculative execution, and (c) eliminating the unnecessary "result shift register" to reserve a result bus, since the reservation stations already contain an arbitration mechanism for result buses.

Although Johnson's RB is probably considered the most complete result shelving technique, it still has one major implementation drawback, the prioritized associative lookup This problem originates from a flaw in the RB concept, the use of a non-unique associative key (register number) during RB's associative read. This non-unique associative key forces the RB to prioritize the associative lookup, which results in a slow and complex hardware. Therefore it is logical that we need to replace this register number with a unique associative key.

Ideally we want to use the same result register tag, which is used during the result write operation, as the unique associative key for read operation. This tag is written to the RB entry during allocation. Smith and Plezkun use the RB identifier or array index as the result tag. But this tag is not unique with the presence of a second RB (e.g., for a floating-point register file). Moreover, the tag will keep changing as the FIFO queue is advanced during multi-entry retire. Tracking many different register tags plus conditional branch tags can be a nightmare. Weiss and Smith suggested a more flexible way of assigning unique result tags, which was originally proposed to be used in reservation stations (see above section entitled Reservation Stations). When an instruction is decoded, a new tag or identifier (inst_ID) is assigned from a "tag pool" that consists of some finite set of tags. Each destination register is then tagged with the inst_ID of the producer instruction. When the instruction completes, the inst_ID is returned to the pool for reuse. This tag pool, called the Instruction ID Unit (IIU), can be implemented as a circular instruction array (IA). The inst_ ID is composed of (color_bit, IA_index—these are discussed in more detail below), the current "color" bit appended with its IA index (entry address), the same scheme used in the DRIS technique (see above section entitled DRIS). The color bit is used to distinguish the age or order of instructions when the valid entry area wraps around.

Now the question is, how do we get the source operand tag to be used as the unique associative key when reading the RB, without reading the RB first? Remember that each decoded instruction with register operands needs operand tags (or operand values in the case of a reservation station technique) before being dispatched to an instruction window. To accommodate these operand tags at the decode stage, a Register Tag Unit (RTU) is added in the fetch and decode unit. Each decoded instruction presents its source register numbers to the RTU to get the corresponding register tags. The RTU can be viewed as a small register file that maintains the most recent tag (not value) of every register. The most recent tag of a register is the inst_ID of a producer instruction that updates the register last. When an instruction is assigned an inst_ID by the IIU, the destination register entry in the RTU is written with the inst_ID.

With minimal hardware support in the fetch and decode unit (IIU and RTU), we can now construct the modified reorder buffer (MRB) tha uses a unique associative key for read, write, and retire opertions. With this unique associative key we can implement the MRB as a simpler, circularly addressed register array instead of the more expensive true FIFO array, because we do not have to prioritize the associative read/lookup anymore! Moreover, with circular array implementation, multiple-entry retire is simply done by moving the head pointer several locations up. Therefore, we have eliminated one implementation drawback in a typical RB.

MRB Structure

Figure 21:
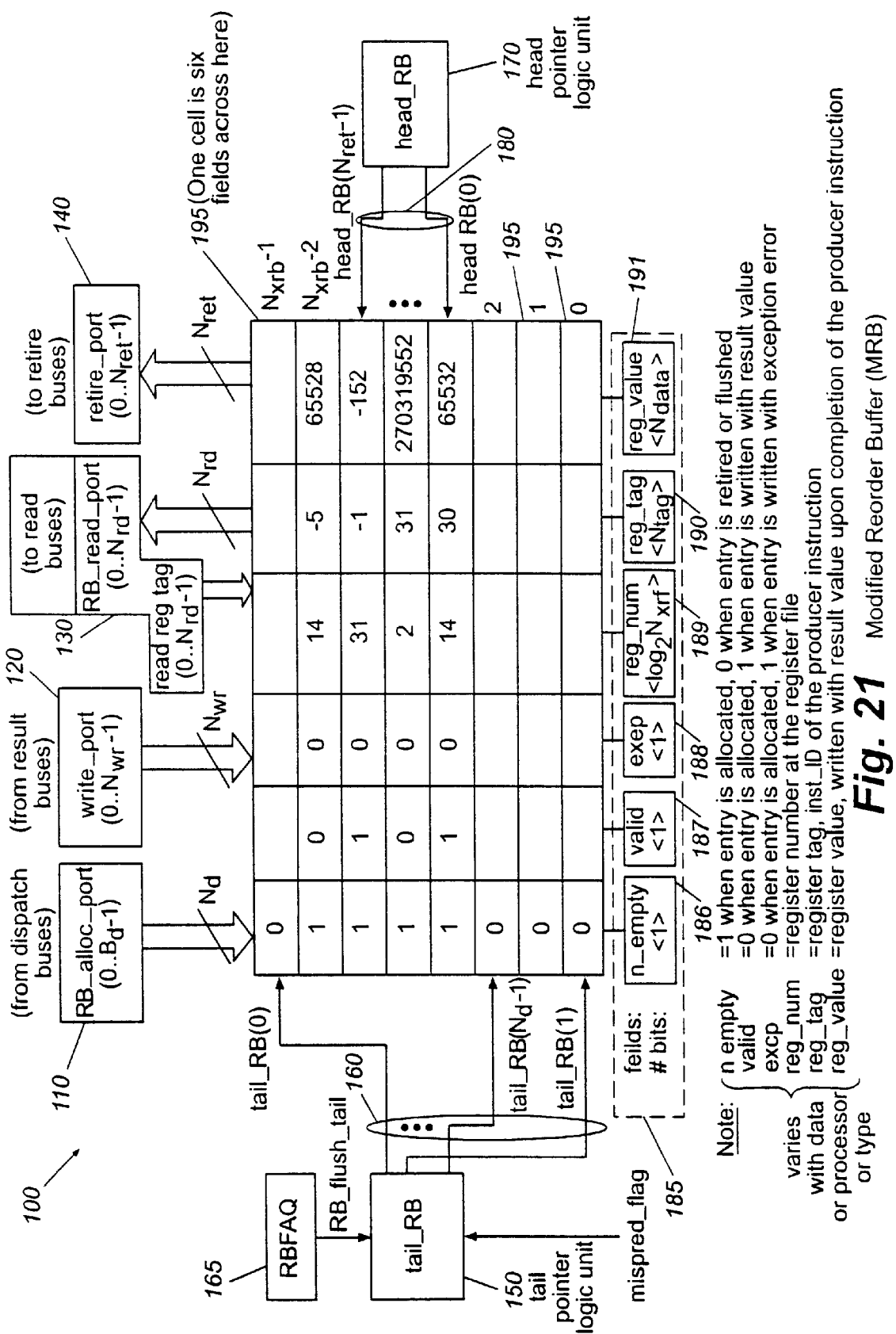
FIG. 21 shows a modified reorder buffer (MRB) according to the invention.

FIG. 21 shows the MRB 100 structure with $N_{xrb}$ entry cells 195, $N_d$ allocate ports 110, $N_{rd}$ read ports 130, $N_{wr}$ write ports 120, and $N_{ret}$ retire ports 140. An MRB entry consists of six fields 185: not empty flag 186 (1 bit), valid flag 187(1 bit), exception error flag 188 (1 bit), register number 189 ($\log_2 N_{xrf}$ bits, $N_{xrf}$ is fixed-point RF size), register tag 190 ($N_{tag}$ bits, $N_{tag}$=1+$\log_2 N_{ia}$, $N_{ia}$=tag pool/ array size), and register value 191 ($N_{dta}$bits) Each MRB entry cell 195 consists of D flip-flops (DFFs) or RS flip-flops (RSFFs) 105 to hold the MRB entry fields 185 and logic circuits for allocate 145, read 125, write 115, and retire operations 135.

During the decode stage, an entry is allocated to MRB 100 for each register assignment (R_alloc_en(i)=1). The setting of a new MRB 100 entry is: n_empty=1, valid=0, excp=0, reg_num=destination register number, and reg_tag=inst_ID assigned to the instruction. There can be up to $N_d$ entries allocated in a cycle. To prevent overlapping/overflowing during allocation, the n_empty flag must be 0 (indicating the MRB cell 195 is empty) before an allocation is made. Overlapping must be prevented because of the circular buffer nature. If MRB 100 overflows, a fetch and decode unit 520 is notified immediately so that the fetch and decode stages are stalled until there is room in MRB 100.

During the issue stage, operand tags are presented to MRB 100 from read ports 130 to read their register values from register value field 191. If a matched entry is found (reg_tag=operand tag), the register value has been calculated (valid=1), and the producer instruction completes without exception (excp=0), then the reg_value is passed to an execution unit (505, 506, 560, 570, 580, 590, 595, or 596—see FIG. 31). If the MRB entry at MRB 100 is found but the register value is not valid (valid=0 or excp=1), then the issue is put on hold or stalled. If no entry is found at MRB 100, then the register value is in RF 515R or 515F. This means RF 515R or 515F contains the most up-to-date value of the operand.

During the writeback stage, as the instruction completes its execution, the result value is written to the reg_value field 191 of the previously allocated MRB entry cell 195. This MRB entry cell 195 can be found because every result is accompanied by its unique producer inst_ID (reg_tag= result tag). If the instruction completes with an exception, the excp bit is set. However, the processor (may be processor 500 in FIG. 31) is not interrupted immediately but delayed until the retire stage. This ensures precise interrupts and prevents the processor from servicing false exceptions caused by: (a) a speculative instruction in a mispredicted path, or (b) an out-of-order instruction that completed early with an exception, but is then followed by a second exception of an older instruction ($2^{nd}$ exception's inst_ID<$1^{st}$ exception's inst_ID). This MRB entry cell 195 with a false exception will eventually be flushed before reaching the bottom of MRB 100, due to branch misprediction's flush or another exception's flush.

During the retire stage, $N_{ret}$ entries at the bottom of MRB 100 are checked to see if some or all can retire to the corresponding RF 515R or 515F. When the retire operation occurs, the reg_value 191 field values are retired from MRB entry cells 195 to the corresponding RF 515R or 515F (see FIG. 31). The conditions for the field 191 value in an MRB entry cell 195 to retire are:

(1) the producer instruction has completed without an exception (excp=0) and the result value has been written (valid=1), (2) instructions preceding the producer instruction also completed without an exception (reg_tag<in_order_point), and (3) the producer instruction is non-speculative (reg_tag<branch_point).

The in_order_point (generated by fetch and decode unit 520) is the inst_ID of the "oldest" instruction that has not completed or completed with an exception. Thus, any instruction with inst_ID<in_order_point, has completed successfully without an exception. The branch_point (generated by the branch unit—not shown) is the inst_ID of the "oldest" unresolved conditional branch. Therefore, all instructions prior to the conditional branch (inst_ID>branch_point) are non-speculative.

The head pointer logic unit or block (head_RB) 170 generates retire locations and adjusts the head pointer 180 positions for the next cycle. Since all $N_{ret}$ entries at the bottom of MRB 100 are simultaneously evaluated to retire, head_RB(i)=(head_RB(0)+i) mod $N_{xrb}$ is generated for each i∈[0,$N_d$-1]. Each valid retirement (valid_ret(i)=1) moves the head pointers 180 "up" by one position. So, the next cycle head pointer 181 is, $$(next)\,head\_RB = \left(head\_RB + \sum_{k=0}^{N_{ret}-1} valid\_ret(k)\right) \mod N_{xrb}. \quad (2)$$

The tail pointer logic unit or block (tail_RB) 150 determines the correct tail pointer 160 position of every allocation port 110:

$$tail\_RB(i) = \left(tail\_RB(0) + \sum_{k=0}^{i-1} R\_alloc\_en(k)\right) \mod N_{xrb}, \quad (3)$$

where i∈[1,$N_d$-1]. The increment from the base tail pointer 160 is determined based on the number of allocations (how many R_alloc_en(k)=1 for k<i) in the previous allocate ports 110. The next cycle's tail_RB(0) is set to (tail_RB ($N_d$-1)+R_alloc_en($N_d$-1)) mod $N_{xrb}$, provided no branch misprediction is detected (mispred flag=0). If mispred_flag=1, then the next cycle tail_RB(0) is set to the RB_flush_tail from the RB Flush Address Queue (RBFAQ) 165.

Figure 22:
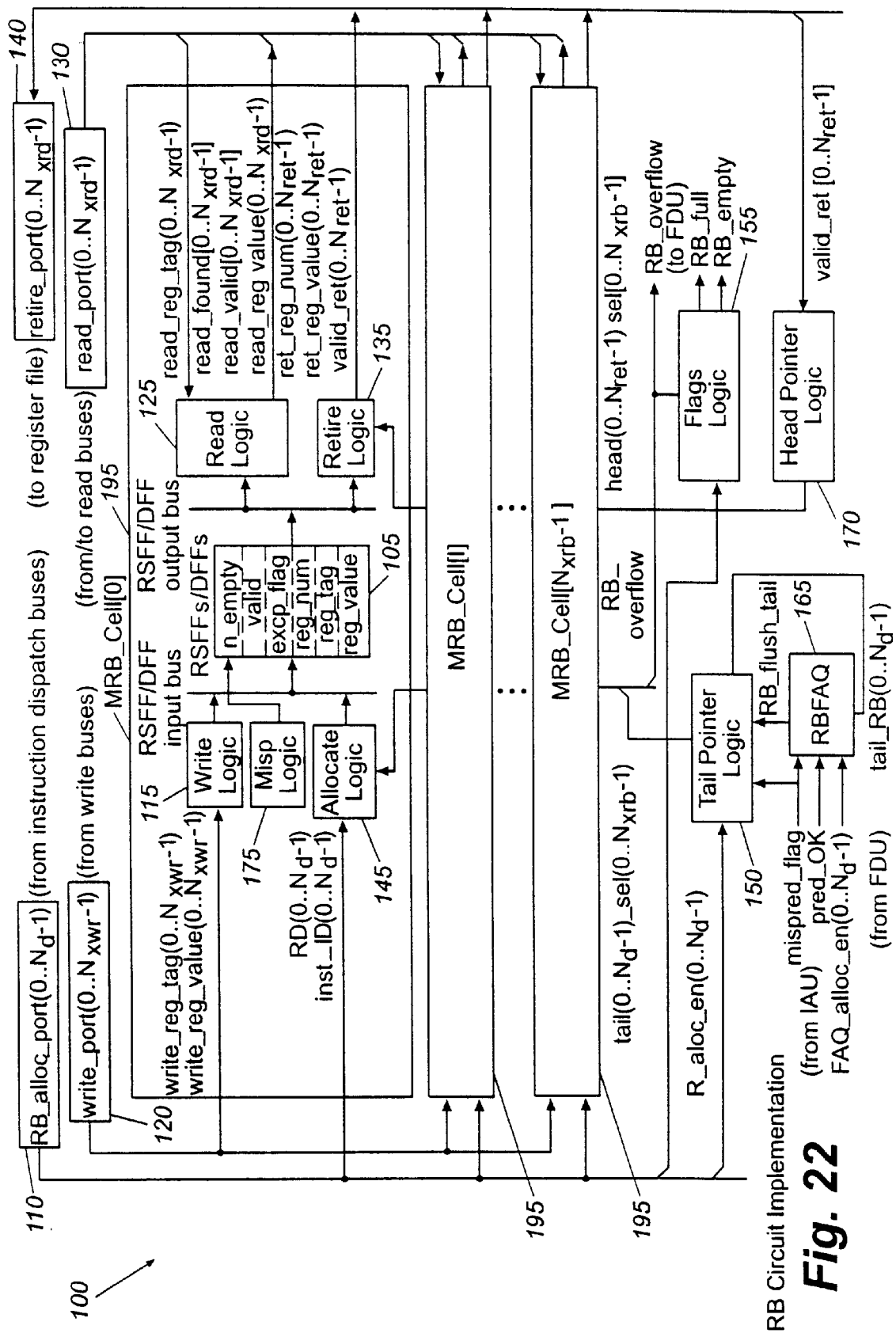
FIG. 22 depicts an MRB circuit implementation.

FIG. 22 shows a circuit implementation of MRB 100, with the cell circuitry shown in FIG. 23 and the support logic (tail pointer logic 150, head pointer logic 170, and flags logic 155) shown in FIG. 24. As shown in FIG. 22, each MRB cell 195 comprises RSFFs or DFFs 105, write logic 115, read logic 125, retire logic 135, allocate logic 145, and misprediction logic 175. In FIG. 23 Retire logic 135 has comparison unit 152 which may be a comparator or other device capable of comparing inputs as is well-known to those of ordinary skill in the art for checking to see if it is safe to retire and misprediction logic 175 has comparison unit 151 which may also be a comparator or other device capable of comparing inputs as is well-known to those of ordinary skill in the art for flushing misspeculative MRB 100 entries. Throughout all schematics, a thick line indicates a multi-bit bus (multiple wires), while a thin line indicates a single-bit wire. For notational consistency, the following signal name conventions are made. A signal named "X(i)" indicates that the signal is the $i^{th}$ bus in a group of buses named X. A signal named "Y[k]" indicates that the signal is the $k^{th}$ bit of bus Y. A signal named "Z(i)_z[k]" means that the signal is the $k^{th}$ bit of bus Z_z, which is the $i^{th}$ bus in the group bus Z. A signal name "X[k]" can also denote a register output name (at position k) if it is part of a register array.

The following section describes how multi-level speculative execution can be supported efficiently with the addition of RBFAQ 165.

Flush Address Queue (FAQ)

To support speculative execution, a mechanism to recover and restart must exist so that correct results can still be produced in the event of branch misprediction. Recovery cancels the effect of instructions under false predictions, and restart re-establishes the correct instruction sequence. When a branch misprediction is detected, speculative RB entries (that turn out to be mis-speculated) must be flushed to nullify the effect of wrong updates. The main difficulty is to quickly locate the starting speculative entry (reset point) for flushing, so that recovery and restart can be done with minimum delay. Johnson suggests allocating a "dummy" branch entry in the RB for every conditional branch instruction decoded (see Johnson, 1991). The branch entry is dummy because there will be no register update or result value produced. When the conditional branch is detected to be mispredicted, processor searches the corresponding branch entry in the RB. This entry becomes the reset point; all entries subsequent to it are flushed by setting the tail pointer to the branch entry number. Or alternatively, we can let the "branch" entry reach the bottom (head) of the RB. However, this adds delay to the recovery and restart from a branch misprediction. The main disadvantage with the dummy-branch-entry method is the increase in RB usage. There can easily be multiple unresolved branch entries in the RB that increases the number of decode stalls due to RB full/overflow, or forces more entries in the RB.

As a solution to this problem, a small RB Flush Address Queue (RBFAQ) 165 is added to MRB 100 to hold the starting flush tail/address of each unresolved conditional branch. RBFAQ 165 can be implemented as a true FIFO, or better, a circular array. Each RBFAQ 165 entry in entry cells 295 consists of only $log_2 N_{xrb}$-bits of MRB tail pointer 160 (flush_addr). When a conditional branch instruction is decoded (e.g., at decode slot i), an entry is allocated at the tail of RBFAQ 165, with the entry's flush_addr set to the current tail_RB position, tail_RB(i). Up to $N_d$ entries can be allocated per cycle. When the "oldest" conditional branch instruction completes at the branch unit, the misprediction flag (mispred_flag) is checked. If mispred_flag=0 (no misprediction), then the corresponding entry in RBFAQ 165, which is obviously at the bottom entry cell 295, is simply discarded/popped. If mispred_flag=1 (misprediction), all speculative entries in MRB 100 are flushed by simply setting tail_RB(0) to the old tail position when the conditional branch was decoded (RB_flush_tail=entry's flush_addr). RBFAQ 165 is then reset (completely flushed) because all subsequent entries belong to branches in the mispredicted path. The number of entries in RBFAQ 165 ($N_{faq}$) defines the maximum levels of speculative execution (total unresolved conditional branches) supported.

The FAQ tail pointer determined by tail pointer logic 250 (FIG. 25) for an allocation at decode slot i (FAQ_alloc_en(i)=1 if there is a valid conditional branch instruction) is calculated as follows:

$$tail\_FAQ(i) = \left( tail\_FAQ(0) + \sum_{k=0}^{i-1} FAQ\_alloc\_en(k) \right) \mod N_{faq}, \quad (4)$$

where $i \in [1, N_d-1]$. The increment from the base tail pointer is determined based on the number of allocations in the previous ports. The next cycle tail_FAQ(0) is set to (tail_FAQ($N_d$-1)+FAQ_alloc_en($N_d$-1)) mod $N_{faq}$. However, if a branch misprediction is detected, the tail_FAQ(0) is set back to zero. There is only one head pointer determined by head pointer logic 270 which is updated as follows:

$$head\_FAQ = \begin{cases} 0, & \text{if branch completes} \\ & \text{w/ mispred\_flag} = 1 \\ (head\_FAQ + 1) \bmod N_{faq}, & \text{if branch completes} \\ & \text{w/ mispred\_flag} = 0 \\ head\_FAQ, & \text{otherwise (unchanged)} \end{cases} \quad (5)$$

Figure 25:
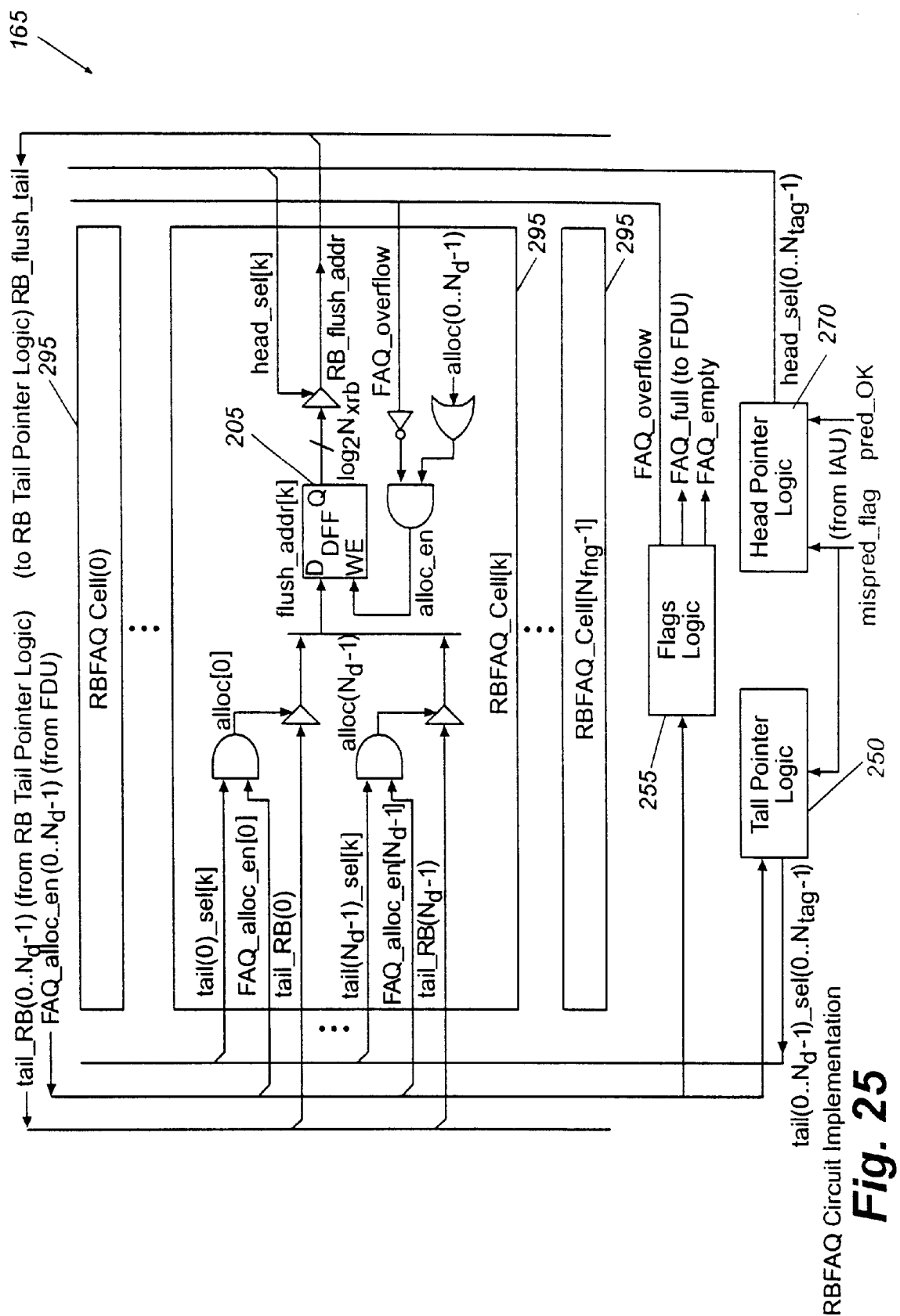
FIG. 25 shows an RBFAQ circuit implementation.
Figure 26:
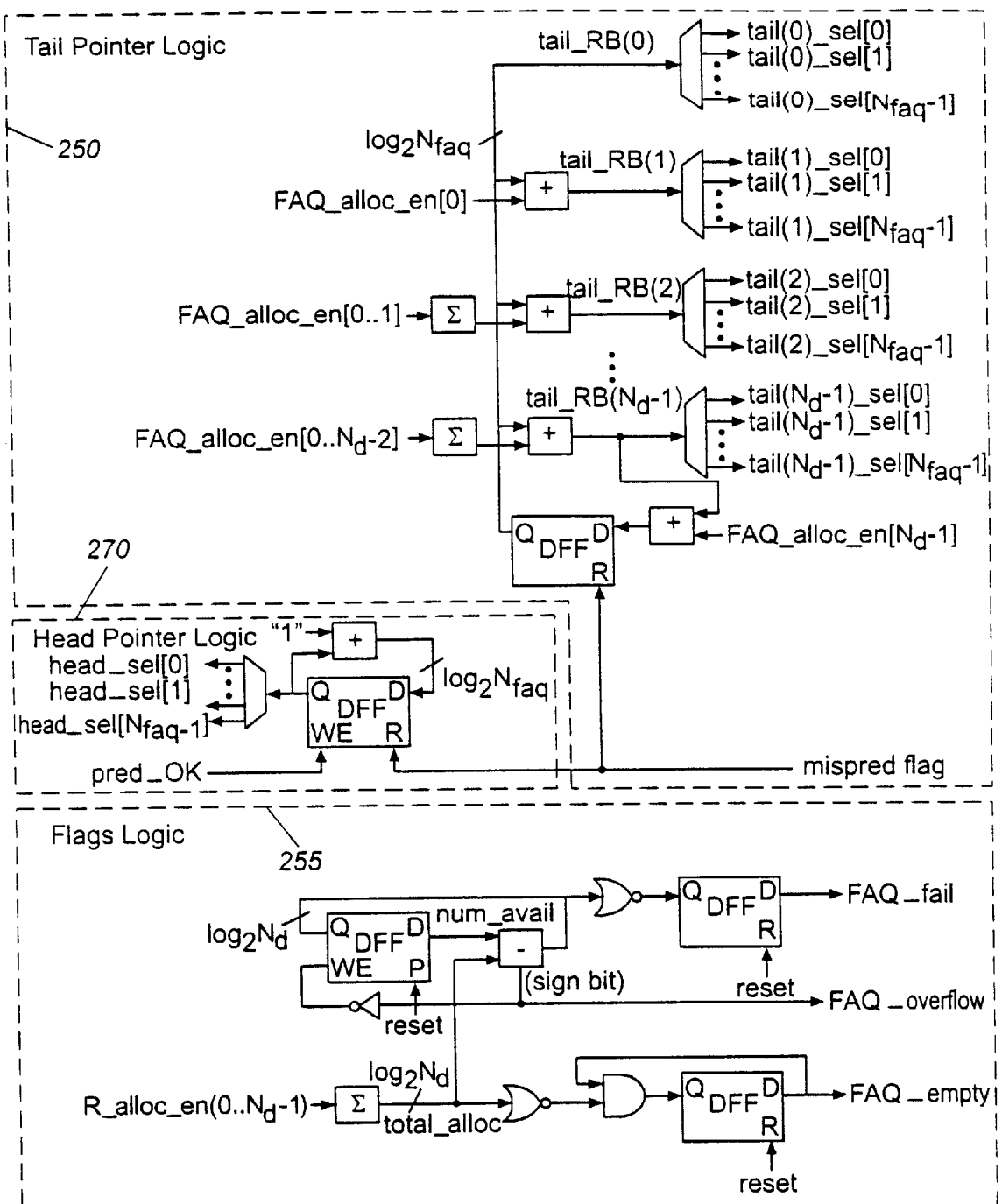
FIG. 26 depicts a support logic for the RBFAQ.

An example of the RB flush address queue (RBFAQ) 165 circuit implementation, comprising DFFs 205 or other equivalent devices, is shown in FIG. 25, with supporting logic in FIG. 26. Supporting logic for RBFAQ 165 also includes flags logic 255 for determining the state of RBFAQ 165.

Distributed Instruction Queue (DIQ)

The DIQ is a new distributed instruction shelving technique that offers a solution to drawbacks in the reservation station (RS) technique. First, a rationale that led to the DIQ solution is described. Then, the in-order DIQ 300 circuit structure is explained. Finally, an enhancement to the DIQ, the out-of-order DIQ 400 that will allow full out-of-order issue is described.

Rationale for the DIQ

First, based on comparisons of the DRIS central window and RS distributed window, it was decided early that the proposed instruction shelving should be a distributed window technique. A distributed window implementation has advantages over a central window implementation because of its:

maximum machine parallelism (all execution units can issue an instruction simultaneously), simpler, independent issue logic (issue only one instruction locally from a relatively small group of instructions, independent of other windows' issues), simpler instruction issue routing (many-to-one instead of many-to-many routing paths), simpler deallocation logic (free only one window entry at a time), and more efficient use of the window (deallocate issued entry immediately).

To compensate for the implementation complexity of a central window, most commercial processors with a central window method have to split the large central window into smaller sub-central windows (see Table 4 and 5). This half-way solution still has most of the central window drawbacks.

The reservation station (RS) technique, currently considered the best technique, was originally introduced by Tomasulo in 1967 in the floating-point section of the IBM 360/91 (see Tomasulo). The main objective was to permit simultaneous execution of independent instructions while preserving the precedence (data dependency) constraints in the instruction stream. Tomasulo's RS technique was essentially ahead of its time. It actually accomplishes several superscalar objectives; multi-instruction issue, decoupled dataflow scheduling, out-of-order execution, and register renaming (eliminating anti and output dependencies). Anti dependencies (write-after-read hazards) are avoided by tagging registers, copying operands to reservation stations, and forwarding results directly to reservation stations. Output dependencies (write-after-write hazards) are avoided by comparing tags at the FLR (floating-point register unit in the IBM 360/91) on every register write, to ensure that only the most recent instruction changes the register. However, Tomasulo's algorithm lacks a mechanism to handle speculative execution. Only the most recent updates of registers are maintained, regardless of whether they are speculative updates or not. To support multi-level speculative execution, the register file can be accompanied by a reorder buffer (RB) as seen in the AMD superscalar 29 K (see Case) and K5 (see Slater), or multiple copies of register-mapping tables (RMT) as seen in IBM POWERPCs and MIPS R10000 (see Gwennap, Oct. 24, 1994).

As we can see above, there is an overlap of task since both the RS and RB/RMT support register renaming. And we know that RS's efforts to support register renaming by operand value copying and result value forwarding actually penalize the RS implementation, due to excessive shared-global wires, comparators, and multiplexers. Therefore, if we already have RB or RMT or MRB result shelving, it seems logical to eliminate the expensive operand value copying and result value forwarding concept. The key concept is that no register values are stored in the DIQ, only their register tags. This eliminates large amount of global buses and wide-bus multiplexers or tristate buffers for data routing. Operand values are read directly during the issue/execute stage from the reorder buffer or register file, when they are available. Unlike the RS technique which reads operand values during decode stage, the DIQ technique does not have the result forwarding hazard problem. Therefore, we save a substantial number of comparators and wide-bus multiplexers (no operand value bypassing).

Ready instructions can be issued from the DIQ in different fashions. First, the simplest way, is to allow only in-order issue within a functional unit. Out-of-order executions can still be achieved amongst execution units (partial out-of-order issue with out-of-order completion). Second is to allow some form of limited out-of-order issue such as checking the next entry if the bottom entry has waited for some time (could be as short as one cycle), or to read operands of the bottom two entries simultaneously. Third is to allow full out-of-order issue by keeping track of the ready operand tags. The selection of the issue logic protocol can vary from one functional unit to another. For example, the branch unit's DIQ which stores all pending conditional branch instructions may be better off to use in-order issue logic. But the fixed-point ALU's DIQ could benefit from the out-of-order issue logic. Extensive simulations must be performed across a good set of benchmark programs that represent the intended applications. The quality of the compiler and its optimization options will significantly influence the simulation results.

In general, the in-order issue (simplest way) may be good enough due to several reasons. First, the performance loss could be recovered through faster circuit implementation by the simplicity of in-order versus out-of-order issue logic. Second, this problem could be easily solved in software by reordering instructions using list scheduling, control dependence analysis, software pipelining, etc. If instructions were ordered or entered properly in the distributed instruction window, issuing instructions out of order within an execution unit does not increase performance significantly. Third, even without software scheduling, Johnson's extensive trace-driven simulations show that the performance loss of in-order issue versus out-of-order issue reservation stations is negligible in most cases. Across the entire range of reservation-station sizes, the biggest loss in average performance is 0.6% for a two-instruction decoder ($N_d$=2) and 2% for a four-instruction decoder ($N_d$=4) (see Johnson, 1991). (The real-application benchmark programs used were ccom—optimizing C compiler), irsim—delay simulator for VLSI layouts, troff—text formatter for typesetting device, and yacc—compiles a context-free grammar into LR(1) parser tables. These programs were compiled into MIPS instructions.) The analogy is that, when a dependency stalls instruction issue at a particular execution unit, it is more important to issue instructions at other execution units (which will free the stall) than to issue a newer instruction at the stalled execution unit (see Johnson, 1991).

With DIQs, we can efficiently construct distributed instruction windows that gives maximum machine parallelism, but eliminates completely both implementation drawbacks in the RS concept, operand value copying and result value forwarding. The DIQ technique reduces the number of shared-global wires, comparators, and multiplexers significantly.

In-Order Issue DIQ Structure

Figure 27:
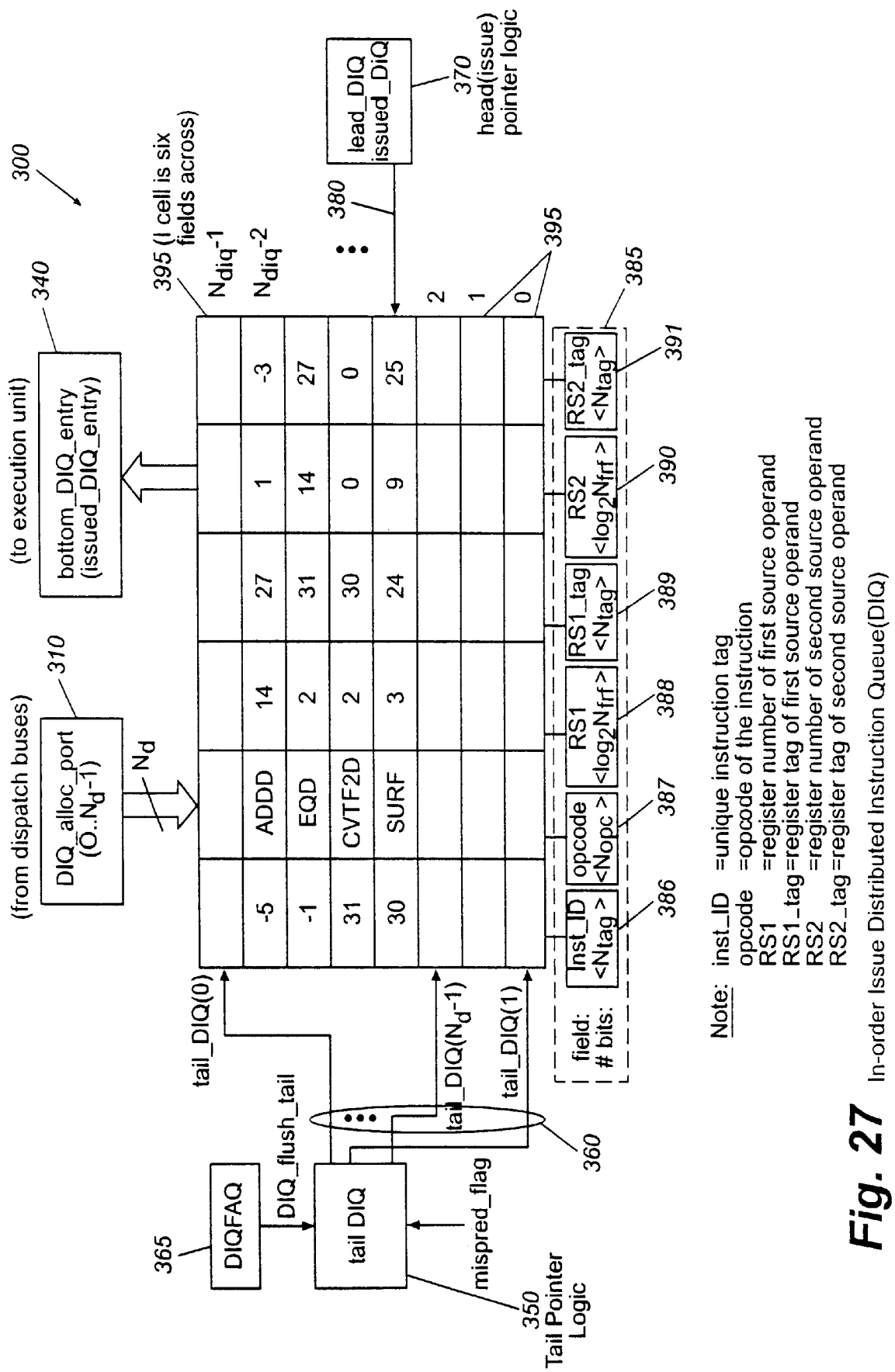
FIG. 27 shows an in-order issue distributed instruction queue (DIQ) according to the invention.

FIG. 27 shows in-order issue DIQ 300 structure with $N_{diq}$ entry cells 395 and $N_d$ allocate ports 310, implemented as a circularly addressed register array. It has multiple allocate ports 310 and a single issue port 340. The DIQ 300 entry fields 385 vary from one execution unit to another with the first two fields, 386 and 387 (inst_ID and opcode) always present. The example shown is of a floating-point ALU which consists of: instruction tag 386 ($N_{tag}$ bits), opcode 387 ($N_{opc}$ bits), source 1 register number 388 ($\log_2 N_{frf}$ bits, $N_{frf}$ is floating-point RF size), source 1 register tag 389 ($N_{tag}$ bits), source 2 register number 390 ($\log_2 N_{frf}$ bits), and source 2 register tag 391 5($N_{tag}$ bits). Note that in contrast to MRB 100 which only retires field values in field 191 of appropriate cells 195 in the retire operation, DIQ 300 issues all field values of fields 386, 387, 388, 389, 390, and 391 of a single cell 395 in order during the issue operation to instruction issue register 516 (see FIG. 33). Each DIQ entry cell 395 consists of D flip-flops (DFFs) or other storage units 305 (FIG. 28) to hold these DIQ entry fields and logic for the allocate operation as determined by allocate logic in DIQ cell 395.

Figure 31:
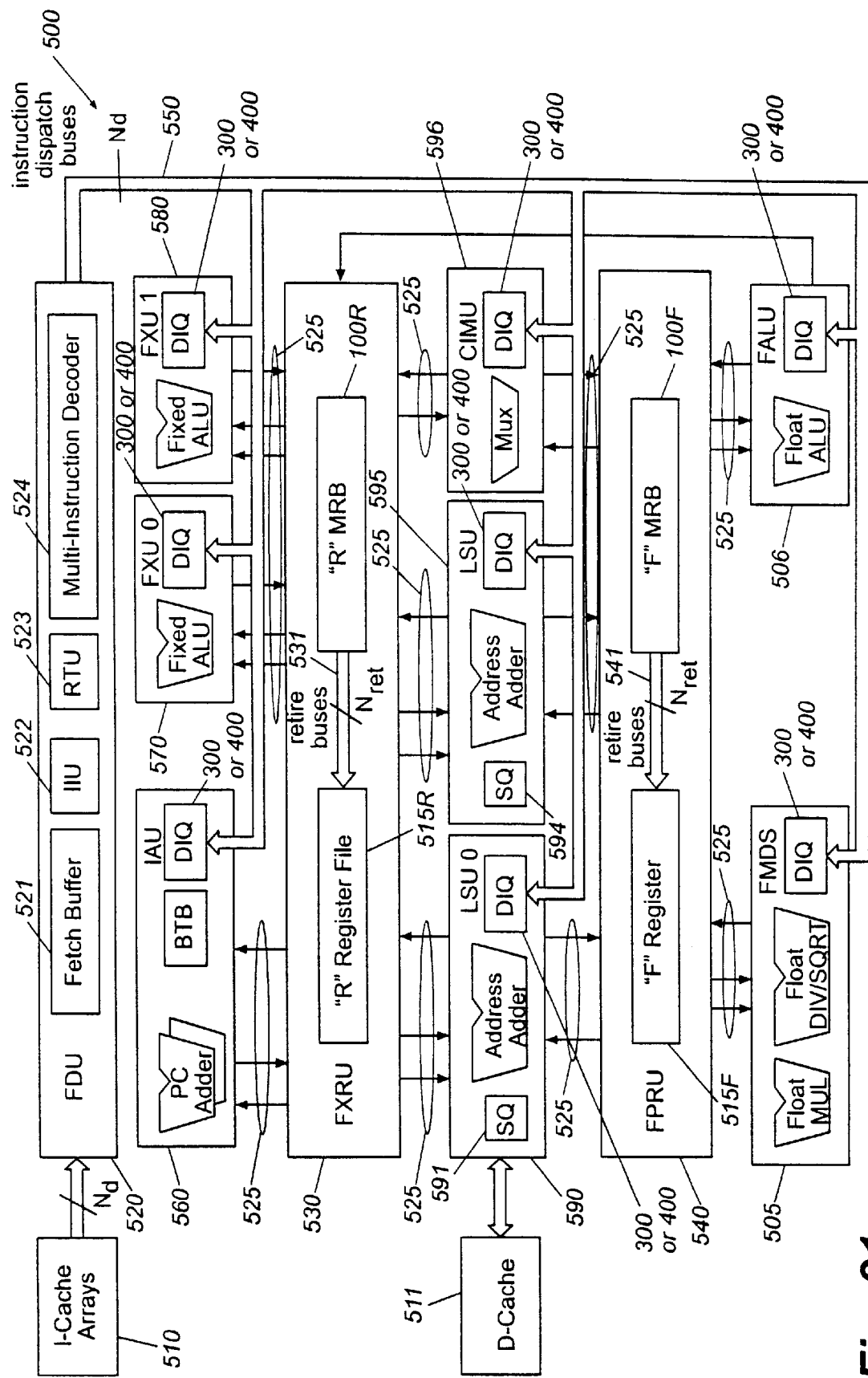
FIG. 31 shows a superscalar processor with MRB and DIQ according to the invention.

At the end of the decode stage, the fetch and decode unit (may be 520—see FIG. 31) dispatches the decoded instructions to all execution units (may be 560, 570, 580, 590, 595, 596, 505, or 506 in FIG. 31). Each execution unit monitors the FU_num field (execution/functional unit number) in all dispatch buses (may be 550 in FIG. 31). If the FU_num matches with the execution unit's assigned FU_num, it allocates a DIQ entry for that decoded instruction. The allocate logic 345 generates the control signal to enable the DIQ 300 allocation, $$DIQ\_alloc\_en(i) = \begin{cases} 1, & \text{if } FU\_num(i) = \text{execution unit's } FU\_num \\ 0, & \text{otherwise} \end{cases} \quad (6)$$

where i∈[0,$N_d$−1]. Up to $N_d$ entries can be simultaneously allocated to DIQ (300). If DIQ 300 overflows, the fetch and decode unit is notified immediately so that the fetch and decode stage are stalled until there is room in DIQ 300. The tail pointer logic unit or block (tail_DIQ) 350 determines the correct tail pointer 360 position of every allocation port 310:

$$tail\_DIQ(i) = \left(tail\_DIQ(0) + \sum_{k=0}^{i-1} DIQ\_alloc\_en(k)\right) \bmod N_{diq}, \quad (7)$$

where i∈[1,$N_d$−1]. The increment from the base tail pointer 360 is determined based on the number of allocations in the previous ports. The next cycle tail_DIQ(0) 361 is set to (tail_DIQ($N_d$−1)+DIQ_alloc_en($N_d$−1)) mod $N_{diq}$, provided no branch misprediction is detected (mispred_flag= 0). If mispred_flag=1, then the next cycle tail_DIQ(0) 361 is set to the DIQ_flush_tail from the DIQ Flush Address Queue (DIQFAQ) 365. This essentially flushes instructions in the mispredicted branch path (if any). DIQFAQ 365 is identical to the one used MRB 100, providing multi-level speculative execution. Instructions are issued in order from the bottom of DIQ 300, pointed by issue pointer 380 as determined by head (issue) pointer logic 370. Issue pointer 380 is equivalent to a head pointer (issue_DIQ=head_DIQ) and therefore may also be designated as head pointer 380. If there is an instruction (DIQ_empty=0), its register operands are read from the result shelf or directly from the register file. If both reads are successful (valid_read(L)=1 and valid_read(R)=1) then the instruction is issued for execution, and DIQ 300 is popped. The DIQ head pointer 380 is then advanced by one position, $$head\_DIQ = \begin{cases} (head\_DIQ + 1) \bmod N_{diq}, & \text{if } (! DIQ\_empty \ \& \\ & valid\_read(L) \ \& \ valid\_read\ (R) \\ head\_DIQ, & \text{otherwise (wait, no issue)} \end{cases}$$

Figure 28:
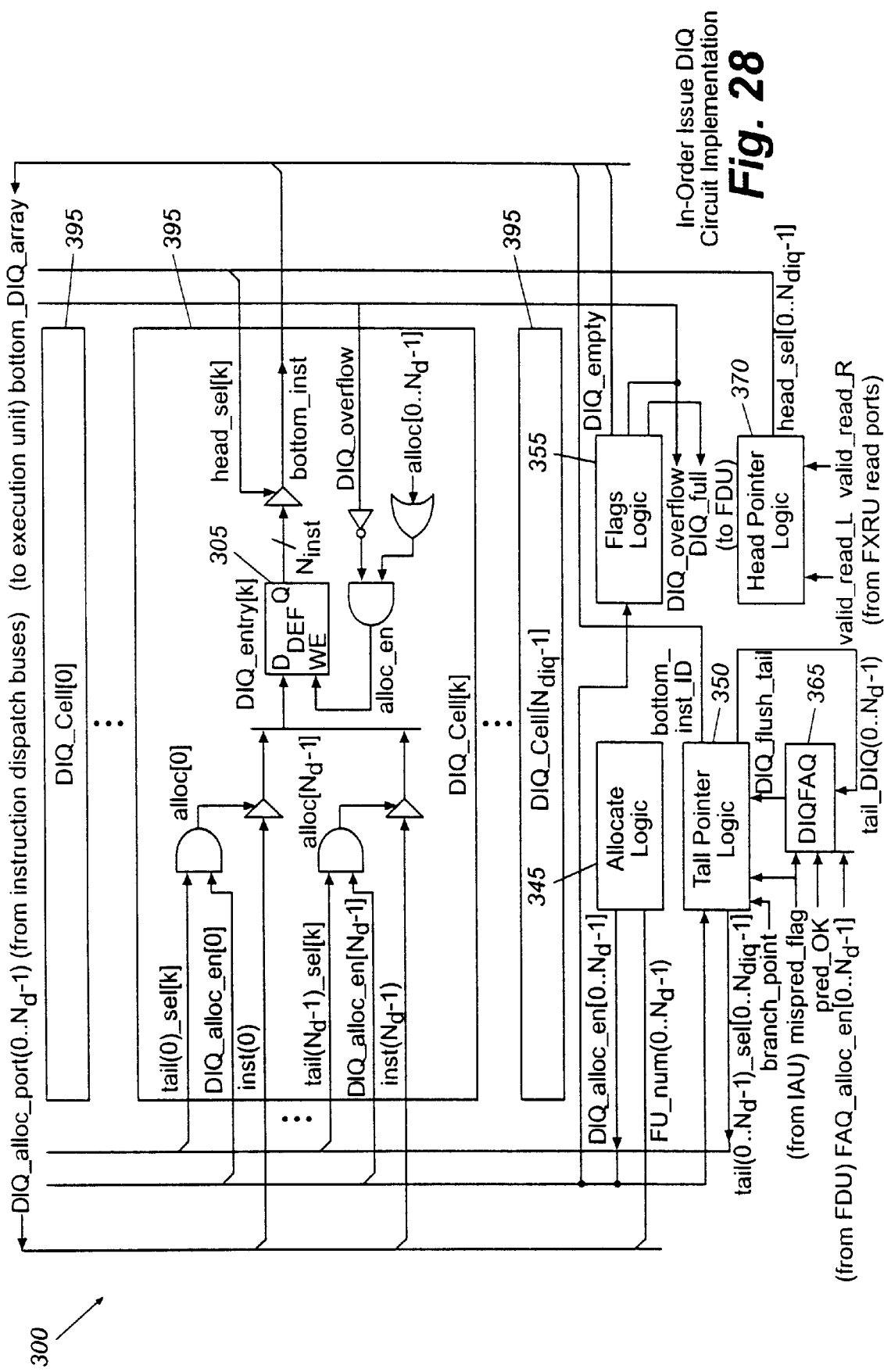
FIG. 28 illustrates an in-order issue DIQ circuit implementation.
Figure 29:
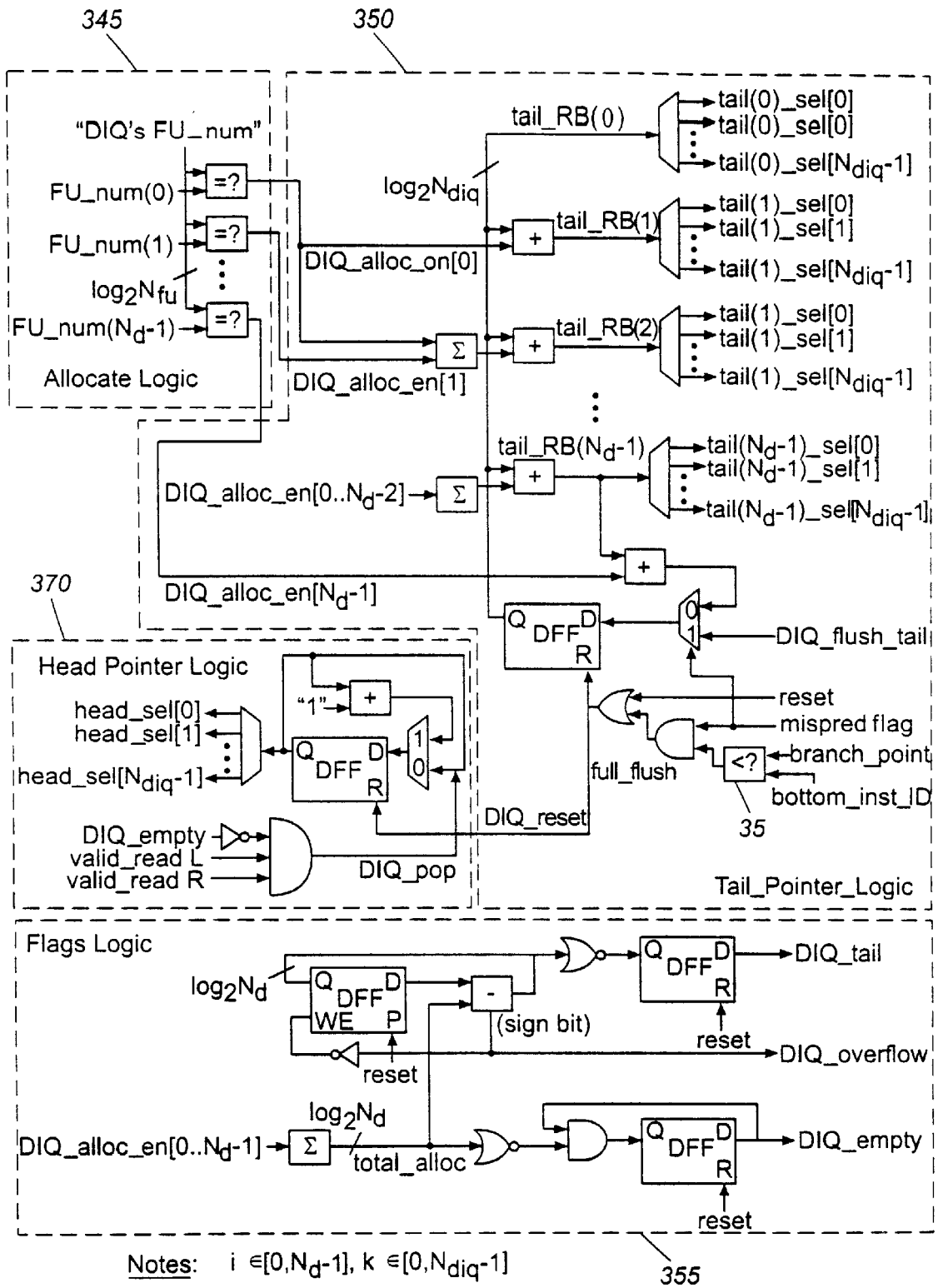
FIG. 29 shows a support logic for the DIQ.

FIG. 28 shows an example of a DIQ 300 circuit implementation according to the preferred embodiment, with the supporting logic (allocate logic 345, flags logic 355, tail pointer logic 350, and head pointer logic 370) shown in FIG. 29. The DIQFAQ 365 circuit is identical to the RBFAQ 165, except the role of tail_RB is replaced by tail_DIQ. Note that in FIG. 29 tail pointer logic 350 comprises comparison unit 351 which may be a comparator or equivalents thereof as would be understood by those of ordinary skill in the art. Comparison unit 351 is used for flushing misspeculative DIQ entries.

Out-of-order Issue DIQ Structure

Figure 30:
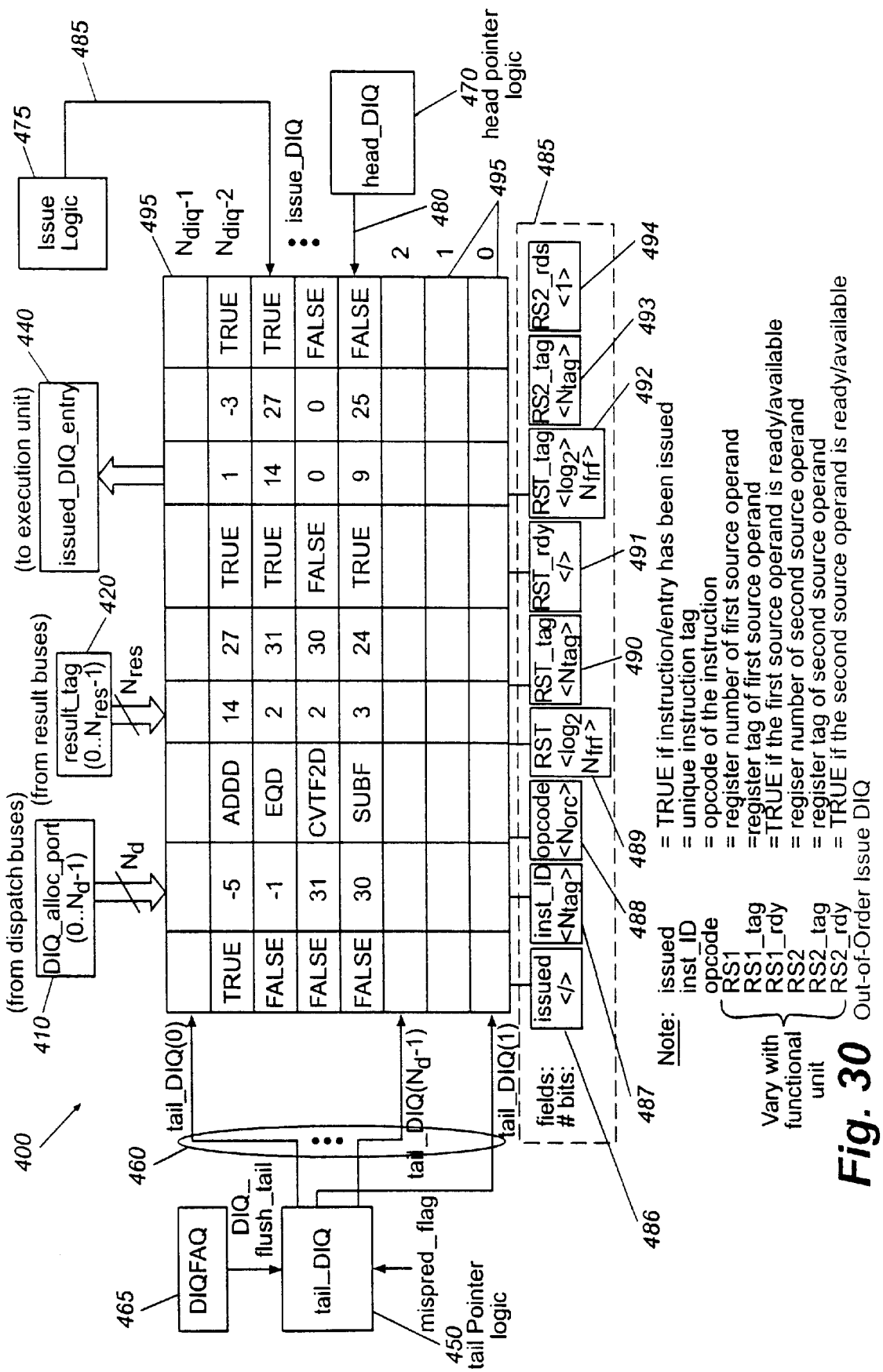
FIG. 30 shows an out-of-order issue DIQ according to the invention.

FIG. 30 shows an enhanced DIQ 400 structure of the same floating-point ALU's DIQ 300 example in FIG. 27 to allow full out-of-order issue, although a DIQ for any functional unit could be used. Note, as shown in FIG. 30 (and FIG. 27), some of fields 485 (385 in FIG. 27) vary with the type of functional unit. The enhancements in the DIQ 400 comprise the additions of: (1) "issued" 486, "RS1_rdy" 491, and "RS2_rdy" 494 flags or fields in each entry (fields 487, 488, 489, 490, 492, and 493 are identical to fields 386, 387, 388, 389, 390, and 391, respectively, of FIG. 27), (2) comparators (not shown) to match a result tag with all operand tags (RS1_tag and RS2_tag) to update their ready flags (RS1_rdy and RS2_rdy), and (3) an issue logic 475 circuitry to determine which instruction entry should be issued next.

In the out-of-order issue DIQ 400 structure, an entry is still allocated from the tail side. Multiple tail pointers 460 are provided to handle multiple entry allocations in entry cells 495 per cycle. A newly allocated entry has its RS1_rdy 491 and RS2_rdy 493 fields initially set based on the operand value availability at decode time. These flags are updated during the writeback stage, by forwarding result tags 420 (NOT the result values as in the RS technique) to the appropriate functional units (for example, tags of floating-point results go only to selected functional units that use floating-point operands). These result tags 420 are compared to each entry's operand tags. A match will set the corresponding ready flag (RS1_rdy 491 or RS2_rdy 493) to TRUE.

Issue logic 475 selects an unissued instruction entry with both operands ready (RS1_rdy 491=RS2_rdy 493=TRUE). If there are multiple ready entries than the oldest one (the one closest to head pointer 480) is selected. The entry's issued flag is then set to TRUE. This entry will be popped from DIQ 400 when it reaches the bottom of DIQ 400. This simplification is necessary to reduce the complexity of issue logic 475 and allocate logic (not shown, but can be the same as allocate logic 345 in FIG. 29). If an issued entry is immediately freed then, a new entry can potentially be allocated in the middle of DIQ 400's "queue". Consequently, the age or order of instructions inside DIQ 400 is no longer easily determined by issue logic 475. Multiple entry allocations from allocation ports 410 also become more complicated since they are not sequentially pushed at the tail side, but rather at random locations with possible contentions to resolve. Note that in contrast to DIQ 300 which issues all field values of fields 385 of a single cell 395 in-order during the issue operation to instruction issue register 516 (see FIG. 33), DIQ 400 issues all field 485 values during the issue operation (field values for fields 487, 488, 489, 490, 492, and 493 of a single cell 495) out-of-order to instruction issue register 516, except newly added field values 486, 491, and 494, which are discarded.

Combining MRB and DIQ

FIG. 31 shows superscalar processor 500 that utilizes DIQ 300 or 400 instruction shelving and MRB 100R or 100F (both have identical structure to MRB 100, but MRB 100R buffers fixed-point register values, while MRB 100F buffers floating-point register values) result shelving techniques. Processor 500 has execution units 560, 570, 580, 590, 595, 596, 505, and 506 analogous to the execution units shown in FIG. 18. Superscalar processor 500 as shown in FIG. 31 clearly reveals a significant reduction in global buses and multiplexers compared to the processor of FIG. 18. By eliminating operand value copying and result value forwarding, shared-global operand buses and both shared-global result buses and wide-bus multiplexers are avoided, replaced by private-local (module-to-module) read buses and write buses 525, respectively. The only shared-global buses left are the required instruction dispatch buses 550 to deliver decoded instructions to every execution unit's DIQ 300 or 400. In the case of out-of-order issue DIQs 400 a small number of global wires to carry result tags are added (not shown in FIG. 31).

In processor 500, separate register units 530 and 540 are provided for fixed-point and floating-point register results. (It is also possible to combine both types of register results in a single register unit.) With two register units, the processor 500 core area is basically segmented by Fixed-Point Register Unit (FXRU) 530 to hold general-purpose "R" registers, and the Floating-Point Register Unit (FPRU) 540 to hold floating-point "F" registers. Special purpose registers for condition codes can use any of the "R" registers, following the "no-single copy of any resource" philosophy of the DEC ALPHA architecture. A single-copy of any resource can become a point of resource contention. The "R" and "F" registers (which may be contained in either register units 530 and 540 in 515R and 515F or in MRB 100R and MRB 100F) are also used to hold fixed- and floating-point exception conditions and status/control information, respectively.

Figure 32:
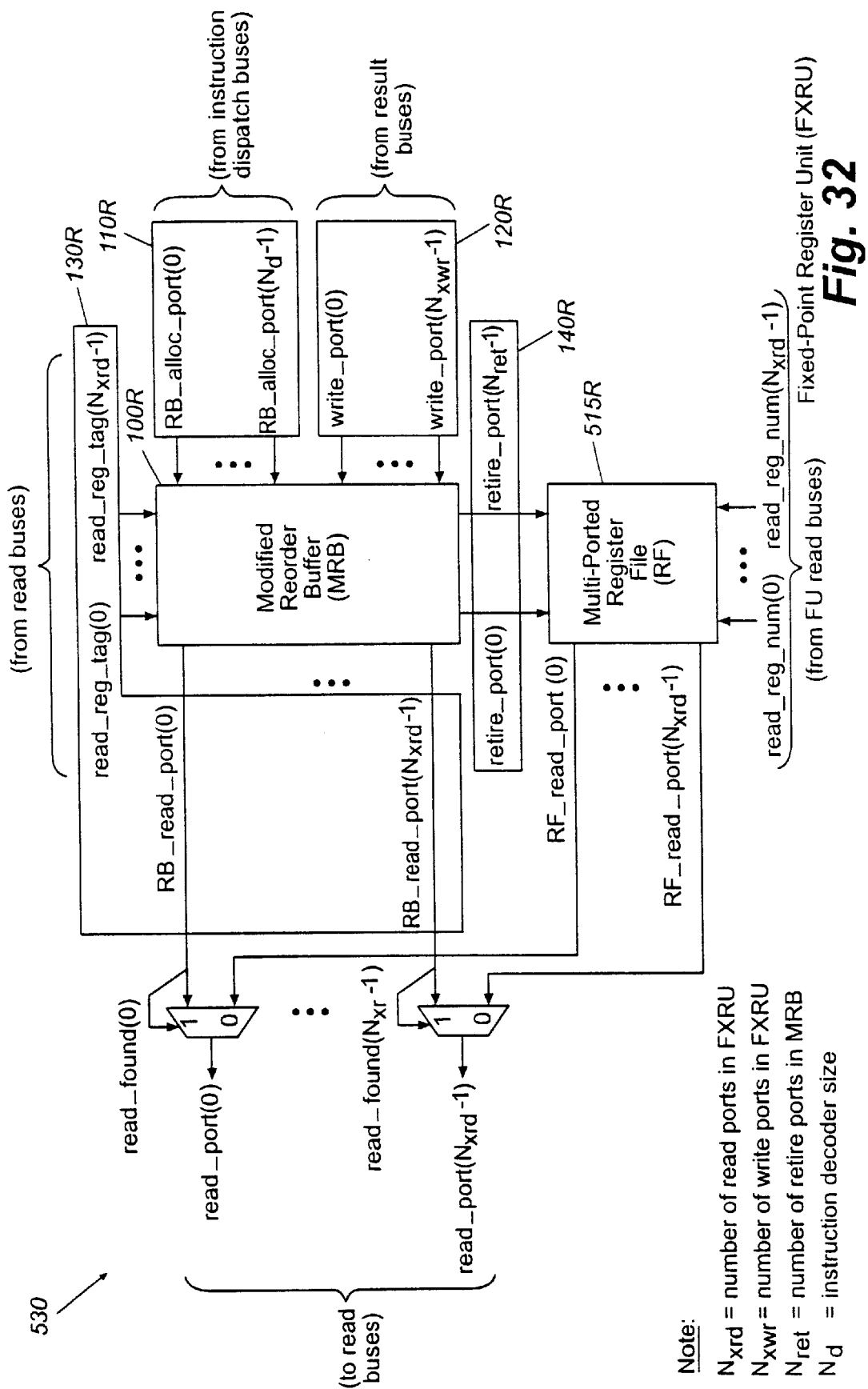
FIG. 32 depicts a fixed-point register unit (FXRU).

Each of register units 530 and 540 contain register files 515R and 515F accompanied by MRBs 100R and 100F, respectively, to support register renaming, out-of-order execution, multi-level speculative execution, and precise interrupts. FIG. 32 shows the organization of a FXRU 530 (FPRU 540 is similar). RF 515R contains the in-order state, while MRB 100R contains the look-ahead state. An MRB 100R entry is retired to RF 515R only if it is safe. To read an operand, the register tag (reg_tag, a unique associative search key) is presented to MRB 100R and the register number (reg_num) is presented to RF 515R, thus performing the read on both RF 515R and MRB 100R. If a match entry is found in MRB 100R (read_found=1), then the register content in RF 515R is considered old and ignored. However, if the register is not found in MRB 100R then the RF 515R's read gives the correct register value. Note that finding a matched entry in MRB 100R does not guarantee that the register value has been found. The register value may still be computed in one of the execution units (560, 570, 580, 590, 595, 596, or 506) and has not been written to MRB 100R. MRB 100R includes allocate ports 110R, write ports 120R, read ports 130R, and retire ports 140R similar to MRB 100.

Fixed-point arithmetic instructions are executed in the Fixed-Point Units (FXU 0 and FXU 1) 570 and 580. Floating-point arithmetic instructions are executed in the Floating-Point Arithmetic Logic Unit (FALU) 506 and Floating-Point Multiply/Divide/Sguare-Root Unit (FMDS) 505. Note that FALU 506 also performs floating-point compare/set instructions and writes its condition code directly to FXRU 530. Conditional/Immediate Move Unit (CIMU) 596 performs register move instructions between FXRU 530 and FPRU 540, as well as within FXRU 530/ FPRU 540 itself. CIMU 596 can also be dedicated to handle conditional move instructions as seen in the SPARC-64 (version 9) instruction set. Load & Store Units (LSU 0 and LSU 1) 590 and 595 perform all load and store operations and include store queues (SQ) 591 and 594, respectively, to queue the store instructions until they can be committed/ executed safely, with load bypassing and two simultaneous data accesses to D-cache 511 allowed. It is to be understood that one or more memories or other storage units may be employed instead of a cache for D-cache 511 for performing an equivalent function as D-cache 511. Branch instructions and PC address calculations are executed in the Instruction Address Unit (IAU) 560. A BTB (branch target buffer), which is a combination of a branch-target address cache (or other memory or storage unit) and branch history table, is provided in IAU 560 to help eliminate some branch delays and predict branch direction dynamically. During processor 500 implementation, it is best to physically layout circuit modules/blocks such that execution units 560, 570, 580, 590, 595, 596, 505, and 506 surround their corresponding register unit 530 or 540. Execution units that access both register units 530 and 540, such as LSUs 590 and 595 and CIMU 596, can be placed between the two. In this way, local bus 525 wiring is more direct and shorter.

Figure 33:
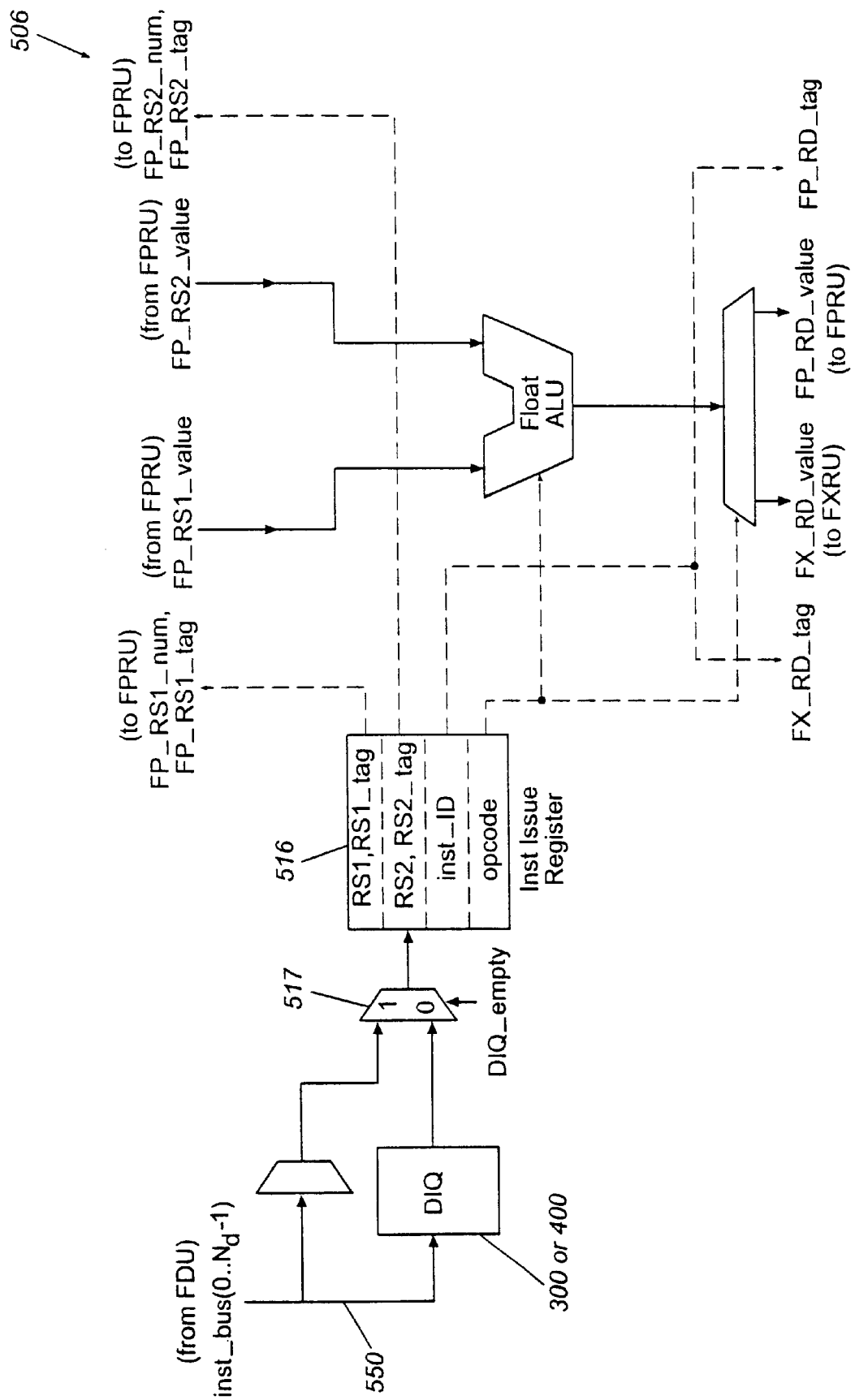
FIG. 33 illustrates a floating-point arithmetic logic unit (FALU).

DIQ 300 or 400 resides in each execution unit (560, 570, 580, 590, 595, 596, 505, and 506). FIG. 33 shows FALU 506 organization, which gives an example how DIQ 300 or 400 is connected. An instruction issue register can be added to reduce the operation delays in the issue/execute pipeline. To allow immediate instruction execution following an instruction allocation to an empty DIQ 300 or 400, a bypass route from the instruction dispatch buses 550 to instruction issue register 516 is provided through multiplexer 517.

Figure 34:
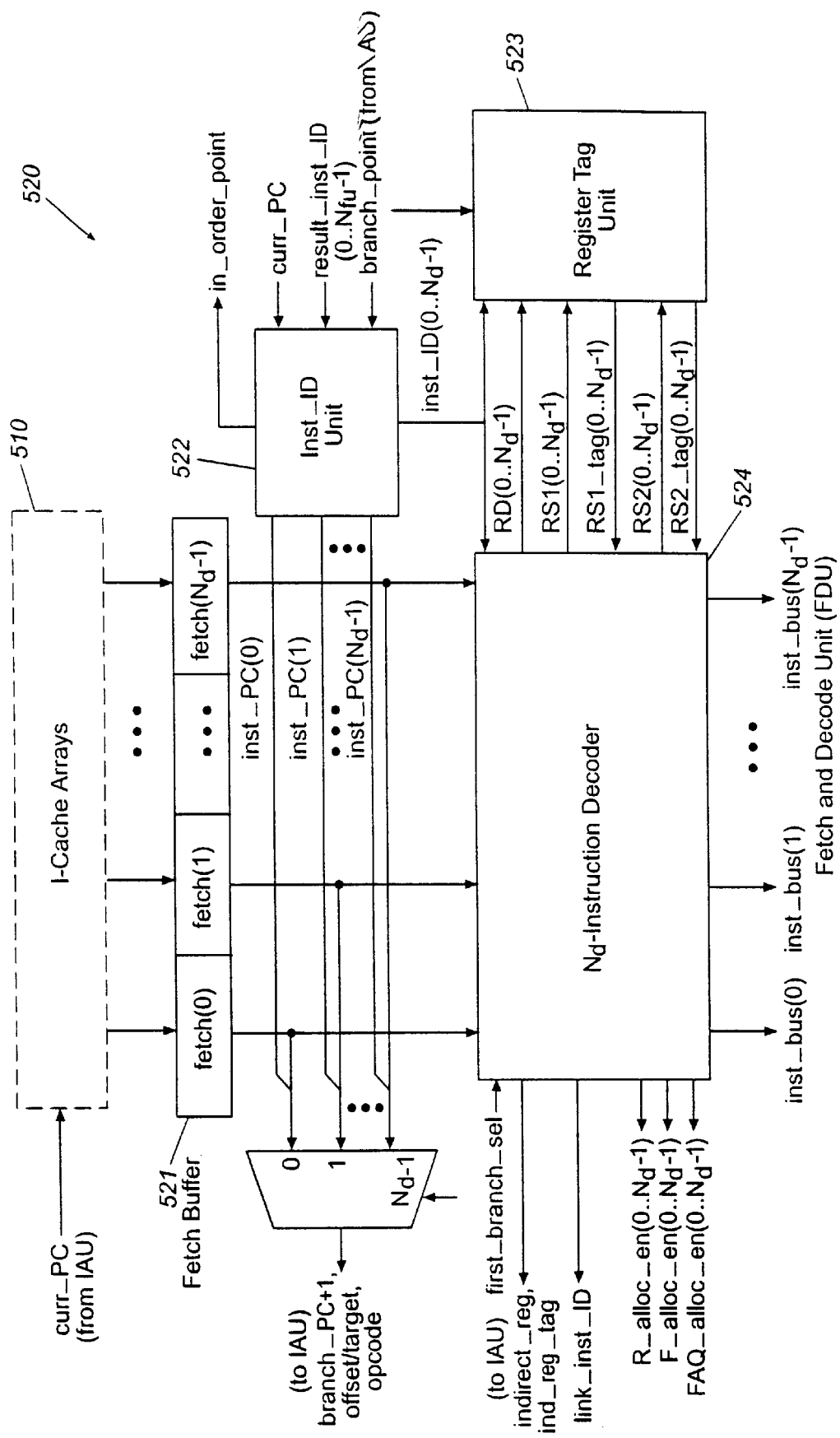
FIG. 34 shows a fetch and decode unit (FDU).
Figure 35:
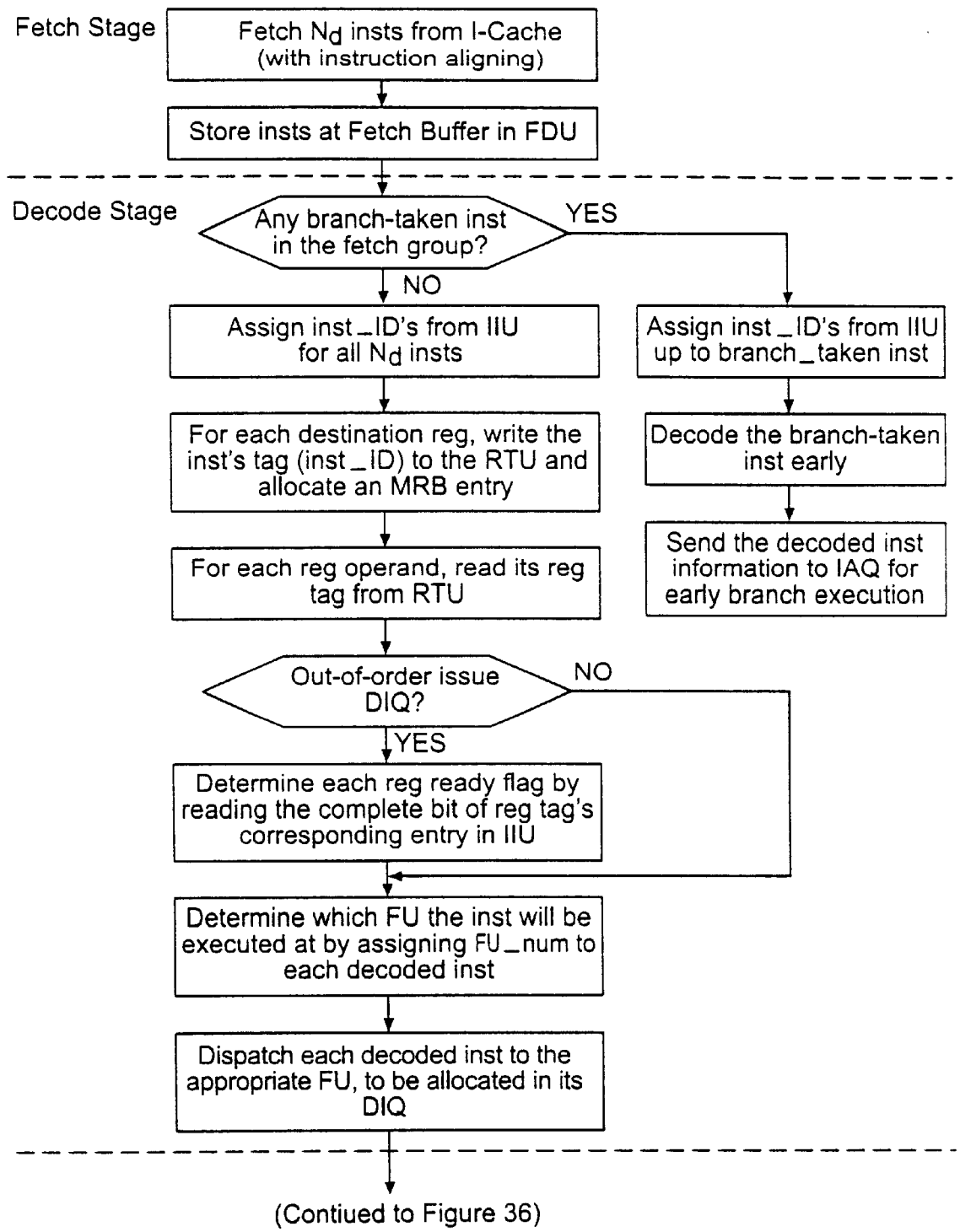
FIG. 35 shows a flowchart of operations (processes) in fetch and decode stages.
Figure 36:
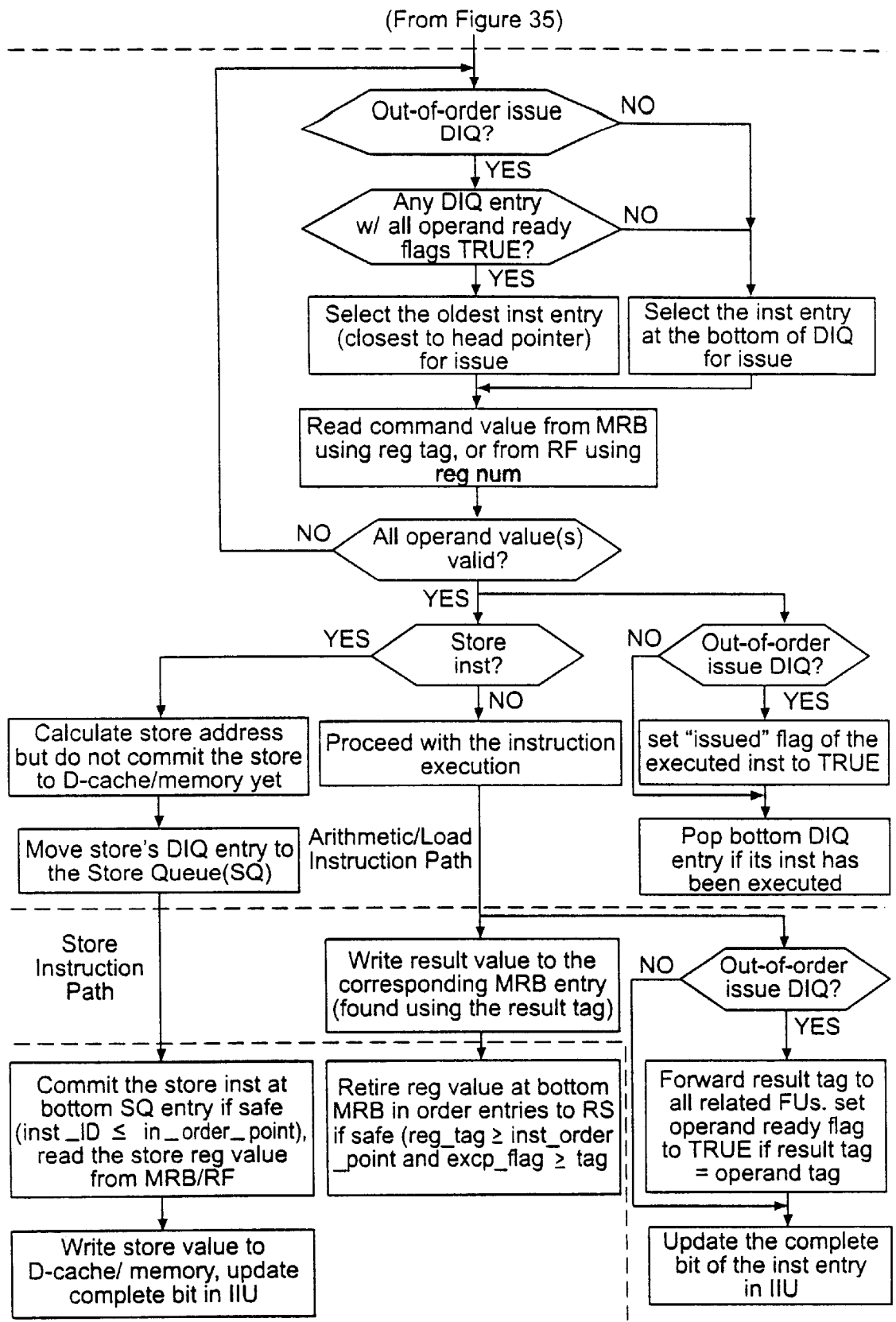
FIG. 36 continues from FIG. 35 and shows a flowchart of operations in issue/execute, writeback, and retire stages.

During normal operations, arithmetic and load/store instructions proceed through five processing steps/stages; fetch, decode, issue/execute, writeback, and retire. (Note that a stage does not necessarily represent a single hardware pipeline stage that can be performed in one clock cycle.) At the fetch stage, multiple instructions ($N_d$) are fetched through fetch buffer 521 simultaneously from I-cache arrays (or other memory or storage unit) 510 (see FIG. 34). With instruction aligning done in I-cache arrays (or other memory or storage unit) 510 (as in the IBM RS/6000 processor—see Grohoski), $N_d$ instructions can be fetched each cycle, without wasted slots, as long as they reside in the same cache (or other memory or storage unit) 510 line. At the decode stage, multiple fetched instructions are decoded by instruction decoder 524 simultaneously. Each valid instruction is assigned a tag by IIU (Instruction ID Unit) 522, which is also used to tag the destination register of the instructions. An entry is allocated at the "R" (100R) or "F" (100F) MRB for each new register assignment. Register tags of an instruction's operands are acquired from the RTU (Register Tag Unit) 523. Finally, at least one valid decoded instruction or all (or multiple) valid decoded instructions are dispatched to the appropriate execution unit's (560, 570, 580, 590, 595, 596, 505, or 506) DIQ 300 or 400 Decoded instructions are shelved by DIQs 300 or 400 to allow more time to resolve data dependencies. Each DIQ 300 or 400 includes dependency check logic that automatically issues an instruction at the bottom of DIQ 300 or 400 as soon as its operands become available, independent of other DIQs 300 or 400. Unlike typical von Neumann processors, no centralized control unit is required to explicitly and rigidly sequence every instruction, deciding when it can execute. This is the essence of dynamic, dataflow scheduling. At burst situations, all execution units 560, 570, 580, 590, 595, 596, 505, and 506 simultaneously issue an instruction, achieving maximum machine parallelism. Results are not directly written back to their register file 515R or 515F, but shelved first at MRB 100R or 100F. Retiring of an instruction's result from MRB 100R or 100F to register file 515R or 515F is done when safe, i.e., (a) there is no exception in the execution of the instruction and instructions preceding it, and (b) there is no prior conditional branch instruction that is outstanding or unresolved. This ensures correct execution of a program, giving the same results as if the program was run sequentially. Retiring of a store instruction, which involves a permanent write to D-cache (or memory, I/O device, or other storage unit) 511, follows the same procedure. A summary of the flow of operations involved in each processing stage is depicted in a flowchart shown in FIGS. 35 and 36.

A unique retire process, using the branch_point and in_order_point, has been introduced. The branch_point (generated by IAU 560) is the inst_ID of the "oldest" unresolved conditional branch (inst_ID of IAU 560's bottom DIQ 300 or 400 entry). Therefore, all instructions prior to the conditional branch (inst_ID<branch_point) are non-speculative. The in_order_point (generated by IIU 522) is the inst_ID of the "oldest" instruction that has not completed or completed with an exception. Thus, if an instruction has inst_ID <in_order_point, then its preceding instructions completed without an exception. Unlike Johnson's RB and the Metaflow THUNDER SPARC's central DCAF, this retire process using the branch_point and in_order_point eliminates the need for allocating "dummy entries" to the result shelf for branches, stores, or any other instructions that do not write to a register file. It also eases synchronization in multiple result shelves and store buffers.

Cost and Performance Analysis

In Sections 5 and 6, respectively, of Chamdani dissertation, the subject of which is incorporated herein by reference, cost and performance analyses are addressed for MRB 100 and DIQ 300. The cost DIQ 400 is slightly higher in number of comparators and global wires, however performance is also increased slightly. For MRB 100, the cost analysis suggests a major reduction in the MRB 100's usage of multiplexers and global wires, relative to the RB's usage. MRB 100's cost complexity/growth for multiplexers is $O(n^2)$ while the RB's is $O(n^3)$, where O is interpreted to mean the order-of-magnitude of what is contained between parentheses and n is the number of individual units of the particular item being referred to. The complexity of existing RB techniques (Unlike the RB, the number of global wires used via the MRB 100 is unaffected by the data size $N_{data}$.) is a proven fact. AMD found out in their superscalar 29 K processor (see Case), an "intellectual predecessor" to the K5, that a mere 10-entry RB plus its operand and result buses consumed a significant chip area, about the same as 4-Kbyte cache! And this is with the chip fabricated in an advanced 0.5-micron CMOS technology.

The performance analysis confirms that the MRB 100 technique does work, and retains all of RB's good performance characteristics. Based on the benchmarking done on a 4-way superscalar model, the performance was observed to saturate at a relatively low number of 12 to 16 MRB 100 entries. With dummy branch entry allocation in the RB for conditional branches, the RB's performance is expected to saturate at a higher number. Or, if the number of entries in the RB is set based on MRB 100's saturation number, then the RB's performance could be lower due to the additional decode stalls from RB full.

For DIQ 300 or 400, the cost analysis suggests an improvement in almost every hardware component, with major reductions in the use of comparators, multiplexers, and global wires with respect to the reservation station technique. The expensive shared-global wires are mostly replaced by private-local wires 525 that are easier to route, have less propagation delay, and occupy much smaller silicon area. DIQ 300's or 400's number of global wires remain the same as the number of DIQ 300 or 400 entries and data size increase. DIQ 300's or 400's cost complexity/growth for comparators is $O(n\log_2 n)$ or $O(n^2)$ compared to $O(n^3)$ for RS. For multiplexers, DIQ 300 cost grows as $O(\log_2 n)$ while the RS cost grows as $O(n^2)$. Also, DIQ 300's or 400's number of comparators is not affected by increases in entry size or data size. This makes the DIQ 300 or 400 technique more adaptable to future 64-bit superscalar architectures.

On the performance side, the good characteristics of the RS technique in achieving maximum machine parallelism have been maintained in the DIQ 300 or 400 technique. The only sacrifice made in DIQ 300 technique is the use of in-order issue with an instruction window. This may penalize performance slightly on the cycle count, which can be easily recovered through faster and simpler circuit implementation. In the end, the actual speed or performance of the processor is faster due to reduced cycle time or more operations executed per cycle. (The out-of-order issue DIQ 400 technique is at par with the RS technique in terms of cycle-count performance, but higher in terms of overall performance if the improved clock frequency is factored in.) The performance analysis confirms that a good performance speedup, on the cycle count basis, is still achieved. Based on the benchmark set used, a speedup between 2.6× to 3.3× was realized in a 4-way superscalar model over its scalar counterpart. Moreover, the performance saturates at a relatively low number of 4 DIQ 300 or 400 entries. These results can be compared to 4-way superscalar processors which typically gain less than 2.0× over scalar designs on the SPECint92 benchmarks (see L. Gwennap, "Architects Debate VLIW, Single Chip MP," *Microprocessor Report*, Vol. 8, No. 16, pp. 20–21, Dec. 5, 1994).

The following sections give a more detailed description of the IIU 522 and RTU 523 blocks in Fetch & Decode Unit (FDU) 520 shown in FIG. 31.

Inst$_{13}$ ID Unit (IIU)

Inst_ID Unit (IIU) 522 has several responsibilities; (a) assign inst_ID to every decoded instruction, (b) record the PC address of every decoded instruction, (c) give the PC address of an exception instruction, and (d) determine the oldest instruction that has not completed or completed with an exception (its inst_ID is called in_order_point). The main component of IIU 522 is an Instruction Array (IA), which stores the PC address and status of every active instruction currently in a processor (for example, processor 500). The IA is implemented as a circular FIFO buffer with head and tail pointers (head_IA and tail_IA). During normal instruction run, the next tail_IA is incremented based on the number of valid instructions in the decode group. However, when a branch misprediction is detected, the tail_IA must be adjusted. All IA 522 entries following the mispredicted branch entry are flushed. Thus, next tail_IA is set to the IA 522 address of the mispredicted branch entry, which is the branch_point less its color_bit. Note that the branch_point (generated by IAU 522) is the inst_ID of the current "oldest" unresolved conditional branch.

A tag or active instruction identifier, inst_ID, is composed of (color_bit, IA_addr), where IA_addr is the address/index of an entry in the IA (color_bit is defined below). It provides the "age/order" information during instruction-order comparisons. An instruction with a smaller inst_ID indicates that the instruction is "older", because it appeared earlier in the decode sequence. NULL inst_IDS with IA_addr=0, (0,0) and (1,0), are reserved to indicate non-existence or no-value. This is important to indicate no pending conditional branch instruction, branch_point=(0,0) or (1,0). It can also mean no register operand (e.g., replaced by immediate value, does not have second operand, default zero register value in R0, etc.) when register tag is (0,0) or (1,0).

The color_bit (as used in the Metaflow architecture—see Popescu, et al.) is a single binary bit that is appended to distinguish instruction order when the IA address starts to wrap around. It is toggled at each wrap around. For example, consider an inst_ID with 7-bit IA_addr (array size of 128). If an instruction has inst_ID of (0,127), its next decoded instruction has inst_ID of (1,1). When the two inst_IDs are compared, (0,127)<(1,1). In the next wrap around (now the color_bit is toggled from 1 to 0), (1,127)<(0,1). The rule for comparing two inst_IDs (inst_ID$_A$ and inst_ID$_B$) is:

if (color_bit$_A \neq$ color_bit$_B$) then
  /* reverse compare result */compare(inst_ID$_A$,inst_ID$_B$)=NOT compare (IA_addr$_A$, IA_addr$_B$) else
  /* same color_bit */compare(inst_ID$_A$,inst_ID$_B$)= compare(IA_addr$_A$, IA_addr$_B$).

Thus the sense of comparison is reversed when the color bits are different.

Another responsibility of IIU 522 is to determine the in_order_point, the inst_ID of oldest instruction that has not completed or completed with an exception. The in_order_point will be used during instruction retirings. The in_order_point less its color_bit is actually the IA address of oldest IA entry with "complete" bit=0 (the one closest to head_IA). The ideal way of computing in_order_point is to check the "complete" bits of all IA entries between head_IA and tail_IA. However, this is not efficient for hardware implementation. Instead, the checking can be limited to within a window of $N_{iw}$ entries. This "in_order_point" window starts from the IA address of current in_order_point (called iop_IA_addr) to (iop_IA_addr+$N_{iw}$) mod $N_{1a}$. This simplification will not alter program correctness. The only potential penalty is a postponement in instruction retiring, if the in_order_point moves "up" (toward tail_IA) too slow. This should be infrequent if the size of "in_order_point" window ($N_{iw}$) is not too small.

Register Tag Unit

Figure 37:
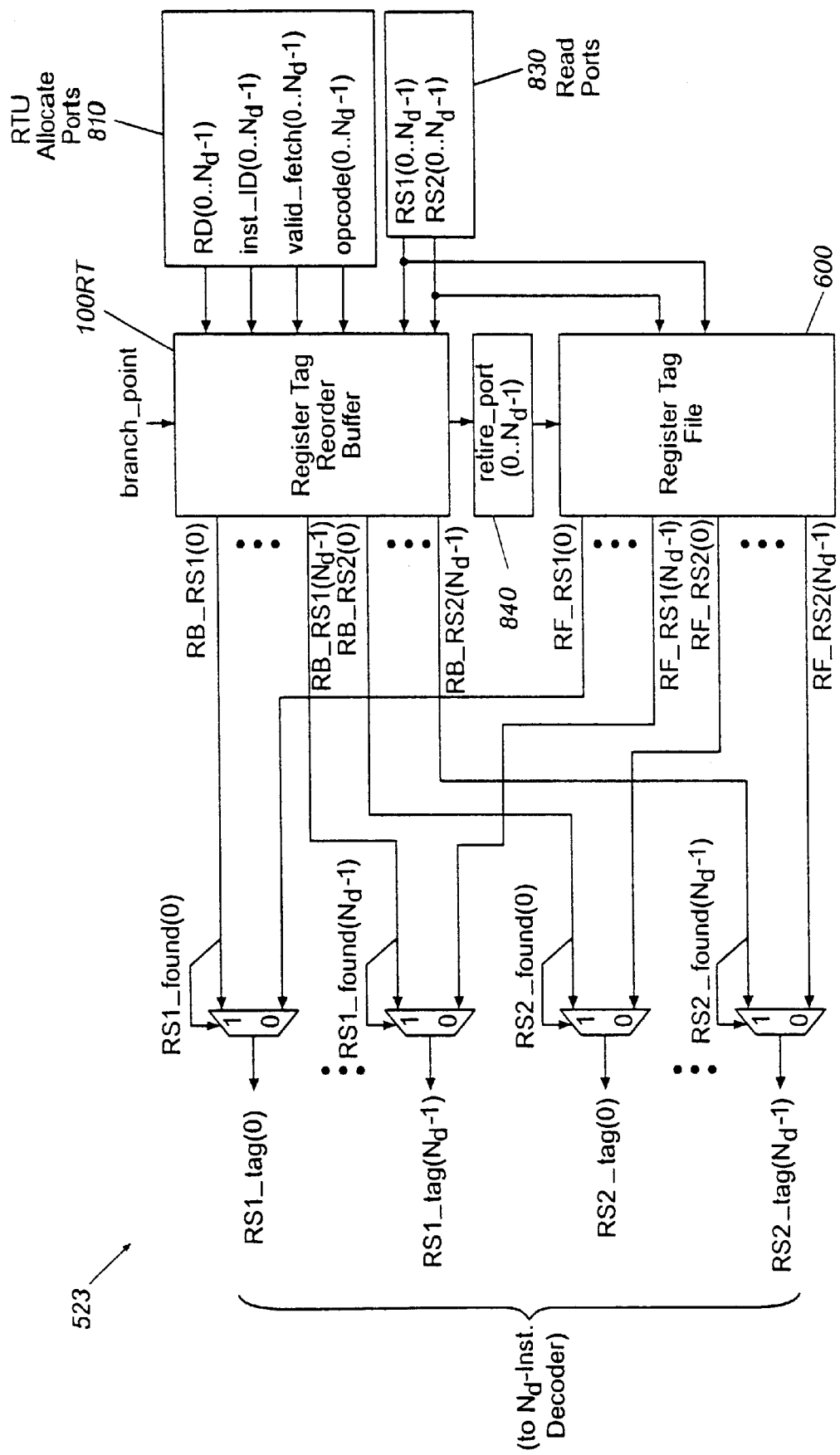
FIG. 37 depicts a register tag unit (RTU).

FIG. 37 shows the organization of Register Tag Unit (RTU) 523. RTU 523 maintains the most recent tag of every "R" and "F" register (which may be in 515R and 515F or in MRBs 100R and 100F). The most recent tag of a register is the inst_ID of producer instruction that updates the register last. To store tags of all "R" and "F" registers (may be in 515R and 515F or in MRB 100R and 100F), Register Tag File (RTF) 600 is used. RTF 600 has the structure of a register file, except the register content is not a value, but rather a tag. To support speculative execution, Register Tag Reorder Buffer (RTRB) 100RT accompanies RTF 600. RTF 600 are similar to 515R or 515F except that it holds to register values, only register tags, and it was in_order_point to clear the stale/old register tag. (Note that RTRB is not similar to MRB 100.) RTRB 100RT has RTU allocate ports 810, both RTRB 100RT and RTF 600 share read ports 830, and tags are updated from RTRB 100RT to RTF 600 through RTRB retire ports 840. Register tags of source operands RS1(0 ... $N_d$-1) and RS2(0 ... $N_d$-1) are read from both RTF 600 and RTRB 100RT (see left side of FIG. 37). If a match is found in RTRB, then it contains the most updated register tag, and the tag in RTF is considered old.

Figure 38:
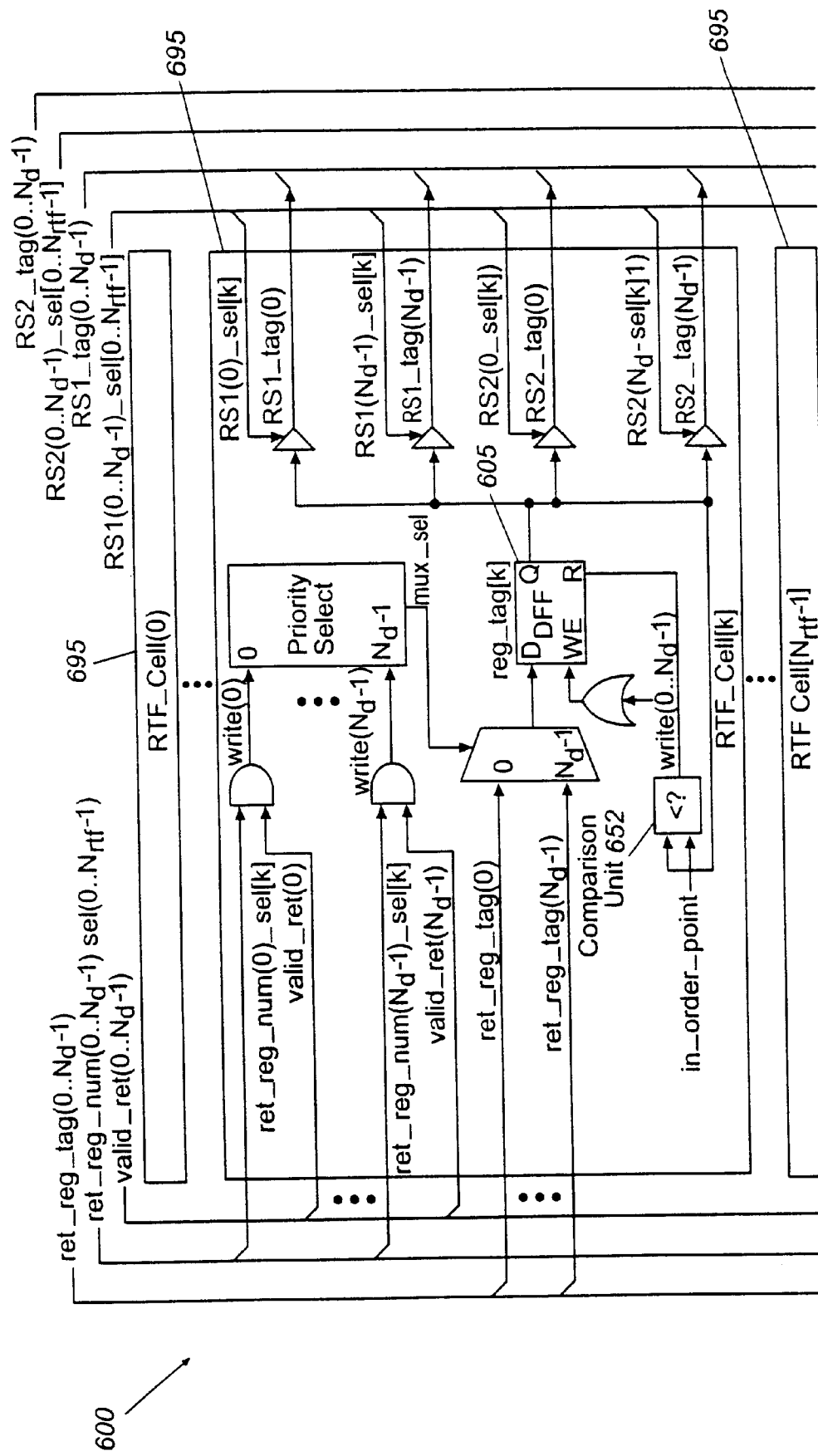
FIG. 38 shows a register tag file (RTF).

Tags in RTRB 100RT are updated to RTF 600 as quickly as possible, provided that all previous conditional branches have been resolved. Thus, RTRB 100RT will mostly contain "speculative" register tags. These tags are flushed when the conditional branch is found to be mispredicted. To keep up with the instruction fetch rate, up to $N_d$ entries at the bottom of RTRB 100RT can be simultaneously retired to RTF 600. FIG. 38 shows the structure of RTF 600. RTF cells 695 which include DFFs 605 (or equivalents thereof) are shown in FIG. 38. Also shown in cell 695 is comparison unit 652 (may be an equivalent device to perform the same function as would be understood to those of ordinary skill in the art) for clearing the stale/old register tag. Note that Since there can be multiple updates to the same register location among $N_d$ retirees, a priority selector is accommodated to make sure only the last update is written. Also note that a difference between RTRB 100RT and RTF 600 with regard to speculative tags is that RTRB 100RT holds speculative register tags while RTF 600 holds nonspeculative tags of active instructions (not stale).

Figure 39:
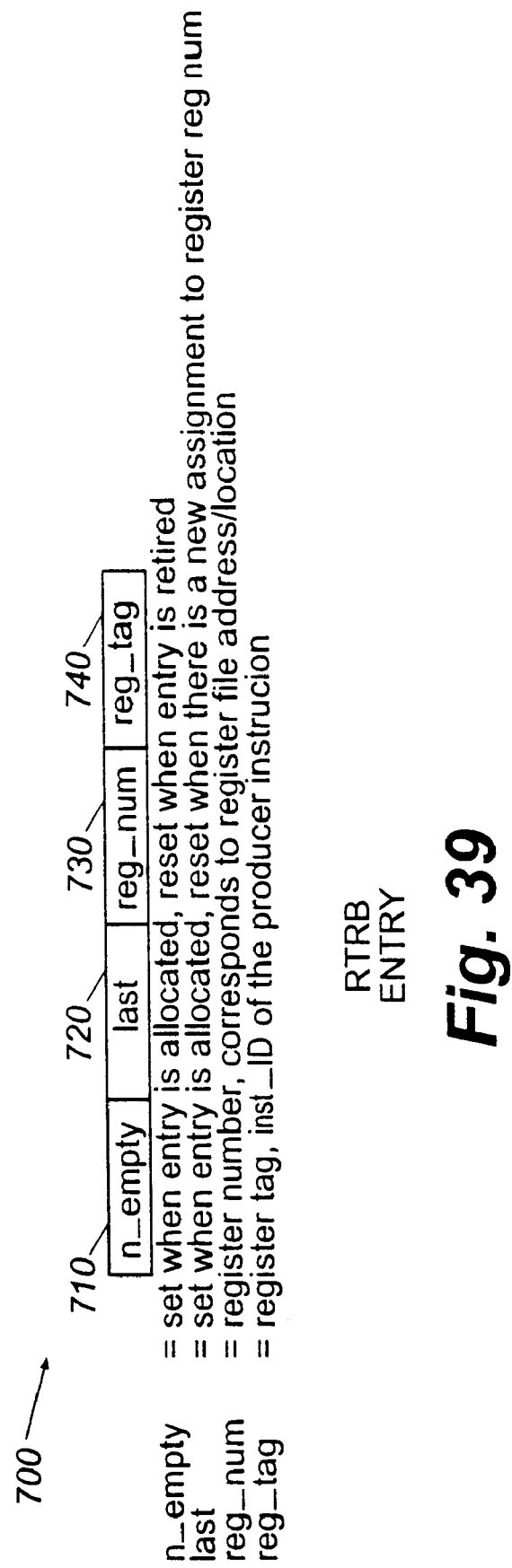
FIG. 39 shows an RTRB entry.

RTRB 100RT is implemented as a multi-ported, content-addressable, circular FIFO buffer with the register number (reg_num 730—see below) used as the associative search key during read operations. The circular FIFO control is implemented by a set of head and tail pointers (head_RTRB and tail_RTRB) which are not shown, but are analogous to head pointers 180 and tail pointers 160 of FIG. 21. The content of an RTRB entry 700 for RTRB 100RT is shown in FIG. 39 with fields n_empty 710, "last" 720, reg_num 730, and reg_tag 740. To avoid prioritized associative lookup, "last" bit 720 is provided for each RTRB entry 700. Thus, the most recent tag (740) of a register number (730) is read from the matched RTRB entry 700 with "last" bit 720=1. "Last" bit 720 is set during entry allocation if its register number 730 is the most recent one within the decode group. Each entry's "last" bit 720 is reset when a more recent entry allocation "overwrites" its register number 730.

The structure of RTRB 100RT is shown in FIG. 40. Each RTRB cell 895 consists of D flip-flops (DFFs) or RS flip-flops (or other storage devices) 805 to hold RTRB entry 700, and logic circuits for allocate 845, read 825, and retire 835 operations. RTRB 100RT is a simplified reorder buffer with the following modifications; (1) buffer only register tags 740, no register values or program counters, (2) no write port, (3) multiple allocate and retire ports, and (4) allow read bypassing from allocate ports.

The fourth modification, read bypassing, is necessary because the most recent tag 740 of a register may still be in allocate ports 810, not yet written to RTRB 100RT. Consider the following example where $((x-y)^2+z)^2$ computation is about to take place. Assume all calculations are performed in single-precision floating point arithmetics; variables x, y, z were already loaded into register F1, F2, F3, respectively; and the result is written to register F4. Suppose the current decode group is as follows: ($N_d$=4)

| i | inst_ID(i) | opcode(i) | RD(i) | RS1(i) | RS1_tag(i) | RS2(i) | RS2_tag(i) | Operation |
|---|---|---|---|---|---|---|---|---|
| 0 | (0,126) | sub.e | F4 | F1 | n/a | F2 | n/a | F4 <- F1 - F2 |
| 1 | (0,127) | mul.s | F4 | F4 | (0,126) | F4 | (0,126) | F4 <- F4 * F4 |
| 2 | (1,0) | add.a | F4 | F4 | (0,127) | F3 | n/a | F4 <- F4 + F3 |
| 3 | (1,1) | mul.s | F4 | F4 | (1,0) | F4 | (1,0) | F4 <- F4 * F4 |

Consider the register tag reading of the third instruction (i=2) in the decode group. When RS1(2) is presented to RTRB cells 895, it is also checked for possible bypassing at the RS1 Bypass Logic unit or block 875 (see FIG. 40). Because allocations and reads occur in the same cycle, RTRB 100RT does not have the current decode group's register tags available for reading. The register tag read must be satisfied directly from one of allocate ports 810. In general, bypassing at RS1 read ports 830 are enabled with the following condition:

$$RS1\_bypass\_en(i) = \begin{cases} 1, & \text{if } \bigcup_{k=0}^{i-1} (RS1(i) = ? \ RD(k)) \\ 0, & \text{otherwise,} \end{cases} \quad (9)$$

where i∈[1,$N_d$-1]. In this case, RS1_bypass_en(2)=1 because RS1(2)=RD(1) and/or RS1(2)=RD(0). Despite two match ups, the RS1_bypass (2) must come from the second allocate port (inst_ID (1)) of allocate ports 810 with inst_ID=(0,127) because it updates F4 last. With RS1_ypass_en(2)=1, the RS1_tag(2) is satisfied from RS1_bypass(2) and not from RTRB 100RT. Read bypassing at RS2 ports (of read ports 830) follows the same analogy using RS2 Bypass Logic unit or block 865. Obviously, RS1_bypass_en(0) and RS2 bypass_en(0) are always 0 because the register tags of the first instruction's source operands would have been updated to RTU 523 in the previous cycle(s).

The entry allocation at the tail (determined by tail pointer logic 850) of RTRB 100RT involves setting n_empty 710= 1, last 720=1 (if the register assignment is the last update—controlled by last update logic 855—among instructions in the decode group), reg_num 730=RD, and reg_tag 740= inst_ID. There can be up to $N_d$ RTRB 100RT entries allocated in a cycle. An allocation of an RTRB 100RT entry is enabled (RTRB_alloc_en(i)=1) if the fetched instruction at position i is not following a branch-taken instruction and writes to an "R" or "F" register (R_alloc_en(i) or F_alloc_en(i) is set), which may be in 515R and 515F, or in MRB 100R and MRB 100F. The Tail Pointer Logic unit or block 850 determines the correct tail pointer position for every allocation port 810:

$$tail\_RTRB(i) = \left(tail\_RTRB + \sum_{k=0}^{i-1} RTRB\_alloc\_en(k)\right) \mod N_{rtrb}, \quad (10)$$

where i∈[1,$N_d$−1]. The increment from the base tail pointer is determined based on the number of allocations in the previous ports. Note that the next cycle tail_RTRB is simply (tail_RTRB($N_d$−1)+RTRB_alloc en($N_d$−1)) mod $N_{rtrb}$. The Tail Pointer Logic 850 also activates the RTRB_full flag if an allocation is about to overwrite the head entry. Thus, $$RTRB\_full = \begin{cases} 1, & \text{if } (head\_RTRB \neq tail_{RB}) \cap \\ & \left(\bigcup_{k=1}^{N_d-1} (head\_RTRB = ?\ tail\_RTRB(k))\right) \\ 0, & \text{otherwise} \end{cases} \quad (11)$$

If RTRB_full=1, the fetch and decode stage are stalled until there is room in RTRB 100RT.

The Last Update Logic block 855 determines whether a register assignment is the last update within the decode group, so that the "last" bit can be set properly during allocation. For a register assignment to be the last update, there must be no subsequent assignment to the same register within the decode group. Thus, in general, $$last\_update(i) = \begin{cases} 1, & \text{if } \bigcup_{k=i+1}^{N_d-1}(RD(i) = ?\ RD(k)) \\ 0, & \text{otherwise,} \end{cases} \quad (12)$$

where i∈[0,$N_d$−2]. Obviously, last_update($N_d$−1) is always 1 because the last instruction (of the decode group) updates the last.

Finally, register tags 740 in the bottom RTRB cells/entries 895 are retired to RTF 600 if all its previous conditional branch instructions have been resolved. No "speculative" register tag may be updated to RTF 600. Thus, a retiree at retire_port(i) is green-lighted (valid_ret(i)=1) if its reg_tag(i)<branch_point. The branch_point (generated by IAU 560) is the inst_ID of the current "oldest" unresolved conditional branch. Since all $N_d$ entries at the bottom (cells/entries 895) are simultaneously evaluated to retire, head_RB(i)=(head_RB+i) mod $N_{rtrb}$ is generated for i=0 . . $N_d$−1. Each valid retirement moves the head pointer "up" by one position as determined by head pointer logic unit or block 870. So, the next cycle head pointer is, $$(next)\,head\_RTRB = \left(head\_RTRB + \sum_{i=0}^{N_d-1} valid\_ret(i)\right) \mod N_{rtrb}. \quad (13)$$

Retiring is done as quickly as possible by providing $N_d$ retire ports 840. Only "non-speculative" entries (reg_tag<branch_point) can be retired from RTRB 100RT to RTF 600. When a branch misprediction is detected, any "non-speculative" entries left in RTRB 100RT are retired immediately, if any usually within a cycle. Then, RTRB 100RT is simply reset to repair from any misprediction side effects.

Another condition that causes flushing is when an exception error is detected. In this case, both RTRB 100RT and RTF 600 are flushed. No register tags are needed when resuming from an exception, because all register values in FXRU 530's MRB 100R and FPRU 540's MRB 100F would have been retired to RFs 515R and 515F, respectively, before going to the exception handler. To read register operands from RFs 515R and 515F, register number is used instead of register tag.

Finally, stale register tags in RTF 600 must also be cleared/reset to 0. The condition to reset is reg_tag<in_order_point, which means that the reg_tag has been deallocated from IIU 522.

Numerous and additional modifications and variations of the present invention are possible in light of the above teachings. It is therefore to be understood that within the scope of the appended claims, the invention may be practiced otherwise than as specifically claimed.

What is claimed is:

1. An improved reorder buffer system having a reorder buffer, said reorder buffer including a plurality of entry cells, a plurality of ports connected to said entry cells, and a pointer logic for adjusting a pointer to point to said entry cells, the improvement comprising:

logic for associating each of said entry cells with a unique associative key;

logic for storing data in one of said entry cells based on said pointer;

logic for correlating a particular register with said unique associative key associated with said one entry cell by said associating logic, said correlating logic configured to indicate whether said unique associative key is associated with the entry cell that is storing the most recent data value destined for said particular register;

logic for locating said data stored in said one entry cell based on the unique associative key associated with said one entry cell by said associating logic and based on said correlating logic; and logic for reading said data located by said locating logic in response to an instruction for reading from said particular register.

2. The improved reorder buffer system as claimed in claim 1, wherein said improved reorder buffer system comprises a circularly addressed register array.

3. The improved reorder buffer system as claimed in claim 1, wherein said data is produced from an instruction for writing to said particular register, wherein another entry cell in said reorder buffer system is associated, by said associating logic, with another unique associative key while storing data produced from another instruction for writing to said particular register, wherein said indicating logic further includes logic for indicating, based on said other unique associative key, that said particular register is associated with said data stored in said other entry, and wherein said locating logic further includes logic for locating said data stored in said other entry based on said other unique associative key.

4. A reorder buffer system, comprising:

a plurality of entry cells, each of said entry cells for storing register values, each of said register values associated with a register identifier identifying a register to which said each register value is destined;

a write port connected to said one entry cell, said write port for writing said one register value to said one entry cell;

a read port connected to said one entry cell, said read port for reading said one register value from said one entry cell;

a retire port connected to said one entry cell, said retire port for retiring said one register value;

a head pointer logic unit to adjust the position of a head pointer;

a tail pointer logic unit to adjust the position of a tail pointer, said positions of said head pointer and said tail pointer indicative of whether said allocate port may allocate a data value to said one entry cell;

logic to correlate said one entry cell with a unique associative key;

logic to indicate whether said unique associative key is correlated with the entry cell, of said reorder buffer system, that is storing the most recently stored register value of said register values that are destined for a particular register;

logic to determine, based on said unique associative key, whether said one entry includes the most recently stored register value of said register values that are destined for said particular register; and logic to transmit, in response to a read operation for reading said particular register, said one register value from said entry cell though said read port when said one register value is the most recently stored register value of said register values that are destined for said particular register.

5. The reorder buffer system as claimed in claim 4, wherein said reorder buffer system comprises a circularly addressed register array.

6. The reorder buffer system as claimed in claim 4, wherein operation of said reorder buffer system is timed by cycles of a clock.

7. The reorder buffer system as claimed in claim 4, wherein said reorder buffer system is connected to a register file by a retire bus, and wherein said reorder buffer system retires information to said register file over said retire bus.

8. The reorder buffer system as claimed in claim 4, further comprising:

additional write ports, said additional write ports respectively connected to said other ones of said entry cells, said additional write ports for writing said other ones of said register values to said other ones of said entry cells;

additional read ports, said additional read ports respectively connected to said other ones of said entry cells, said additional read ports for reading said other ones of said register values from said other ones of said entry cells;

additional retire ports, said additional retire ports respectively connected to said other ones of said entry cells, said additional retire ports for retiring said other ones of said register values;

logic to correlate one of said additional entries with another unique associative key, wherein a plurality of said entry cells include a register value destined for said particular register.

9. A method, comprising the steps of:

executing instructions of a computer program;

respectively storing register values produced in said executing step into a plurality of entries of a reorder buffer;

respectively associating each of said register values with a register identifier identifying a register to which said each register value is destined;

correlating each of said entries with a unique associative key;

maintaining data indicative of which unique associative key is correlated, via said correlating step, with one of said entries storing the most recently stored register value that is destined for a particular register;

analyzing said data in response to a read instruction for reading said particular register;

identifying, based on said analyzing step, one of said unique associative keys correlated with said one entry;

searching for said one unique associative key correlated with said one entry in response to said read instruction and based on said identifying step; and reading said most recently stored register value from said one entry based on said searching step.

10. The method as claimed in claim 9, wherein another of said entries simultaneously storing another register value destined for said particular register is correlated with another of said unique associative keys in said correlating step.

11. The method as claimed in claim 10, wherein said correlating step includes the step of storing said unique associative keys in said entries.

12. The method as claimed in claim 9, further comprising the step of updating said data when another data value destined for said particular register is stored in said reorder buffer.

13. A method for reading from a reorder buffer having a plurality of entry cells, comprising the steps of:

associating each of said entry cells with a unique associative key;

locating data stored in one of said entry cells based on the unique associative key associated with said one entry cell in said associating step;

indicating, based on said unique associative key associated with said one entry cell, that a particular register is associated with said data; and reading said data located in said locating step in response to an instruction for reading from said particular register.

14. The method of claim 13, wherein said associating step includes the step of associating another of said entry cells with another unique associative key, said method further comprising the steps of:

producing said data based on an instruction for writing to said particular register;

producing other data based on another instruction for writing to said particular register;

indicating, based on said other unique associative key, that said particular register is associated with said other data; and locating said other data stored in said other entry cell based on said other unique associative key.

* * * * *